(12) United States Patent
Mather et al.

(10) Patent No.: US 9,492,883 B2
(45) Date of Patent: *Nov. 15, 2016

(54) ELECTRODE FOR A CONTACT START PLASMA ARC TORCH AND CONTACT START PLASMA ARC TORCH EMPLOYING SUCH ELECTRODES

(75) Inventors: Jonathan P. Mather, Cornish Flat, NH (US); Nicholas A. Sanders, Norwich, VT (US); Jon W. Lindsay, Hanover, NH (US); Peter Twarog, West Lebanon, NH (US);
(Continued)

(73) Assignee: Hypertherm, Inc., Hanover, NH (US)

( * ) Notice: Subject to any disclaimer, the term of this patent is extended or adjusted under 35 U.S.C. 154(b) by 1042 days.

This patent is subject to a terminal disclaimer.

(21) Appl. No.: 13/344,860

(22) Filed: Jan. 6, 2012

(65) Prior Publication Data

US 2012/0181257 A1 Jul. 19, 2012

Related U.S. Application Data

(63) Continuation-in-part of application No. 11/709,315, filed on Feb. 20, 2007, now Pat. No. 8,115,136.
(Continued)

(51) Int. Cl.
*B23K 10/00* (2006.01)
*H05H 1/34* (2006.01)

(52) U.S. Cl.
CPC ............ *B23K 10/006* (2013.01); *H05H 1/34* (2013.01); *H05H 2001/3426* (2013.01); *H05H 2001/3489* (2013.01)

(58) Field of Classification Search
CPC ............ H05H 1/34; H05H 2001/3426; H05H 2201/3489; H05H 1/26; H05H 1/36
(Continued)

(56) References Cited

U.S. PATENT DOCUMENTS 3,207,881 A 9/1965 Pagan
3,210,586 A 10/1965 Clevett
(Continued)

FOREIGN PATENT DOCUMENTS

| JP | 3-106572 | 5/1991 |
| JP | 3-118980 | 5/1991 |
| WO | 88/05704 | 8/1988 |

OTHER PUBLICATIONS

European Search Report to related European Application No. 11189048.9 issued by European Patent Office on Nov. 18, 2015, 10 pages.

*Primary Examiner* — Mark Paschall
(74) *Attorney, Agent, or Firm* — Proskauer Rose LLP

(57) ABSTRACT

A component for a contact start plasma arc torch is provided. The component includes a hollow body defining a channel with a longitudinal axis. The channel is capable of slideably receiving an electrode body along the longitudinal axis. The component includes a contact element disposed in the hollow body and includes a first surface and a second surface. The first surface is adapted to facilitate electrical communication with a power supply and the second surface is adapted to physically contact a surface of the electrode body when the plasma arc torch is operated in a transferred arc mode. In addition, the second surface is characterized by the absence of physical contact with the surface of the electrode body when the torch is operated in a pilot arc mode.

28 Claims, 27 Drawing Sheets

(75) Inventors: E. Michael Shipulski, Etna, NH (US);
Zheng Duan, Hanover, NH (US);
David Jonathan Cook, Bradford, VT (US)

Related U.S. Application Data

(60) Provisional application No. 60/774,451, filed on Feb. 17, 2006.

(58) Field of Classification Search
USPC ........ 219/121.54, 121.57, 121.5, 121.52, 75, 219/121.51, 121.48, 121.39
See application file for complete search history.

(56) References Cited

U.S. PATENT DOCUMENTS

| | | |
|---|---|---|
| 3,242,305 A | 3/1966 | Kane et al. |
| 4,791,268 A | 12/1988 | Sanders et al. |
| 4,902,871 A | 2/1990 | Sanders et al. |
| 5,796,067 A | 8/1998 | Enyedy et al. |
| 5,897,795 A | 4/1999 | Lu et al. |
| 5,961,855 A * | 10/1999 | Hewett et al. ............ 219/121.39 |
| 5,994,663 A | 11/1999 | Lu |
| 6,084,199 A * | 7/2000 | Lindsay et al. .......... 219/121.52 |
| 6,368,451 B1 | 4/2002 | Goulette et al. |
| 6,403,915 B1 | 6/2002 | Cook et al. |
| 6,703,581 B2 | 3/2004 | Jones et al. |
| 6,717,096 B2 | 4/2004 | Hewett et al. |
| 6,903,301 B2 | 6/2005 | Jones et al. |
| 6,946,616 B2 | 9/2005 | Kinerson et al. |
| 7,202,440 B2 | 4/2007 | Hewett et al. |
| 7,435,925 B2 | 10/2008 | Griffin |
| 8,115,136 B2 * | 2/2012 | Mather et al. ............ 219/121.57 |
| 2002/0117482 A1 | 8/2002 | Hewett et al. |
| 2002/0117483 A1* | 8/2002 | Jones et al. .............. 219/121.57 |
| 2002/0117484 A1 | 8/2002 | Jones et al. |
| 2004/0232118 A1 | 11/2004 | Horner-Richardson et al. |
| 2005/0082263 A1 | 4/2005 | Koike et al. |
| 2006/0037945 A1 | 2/2006 | Schneider |
| 2007/0210035 A1 | 9/2007 | Twarog et al. |
| 2008/0217305 A1 | 9/2008 | Sanders |

* cited by examiner

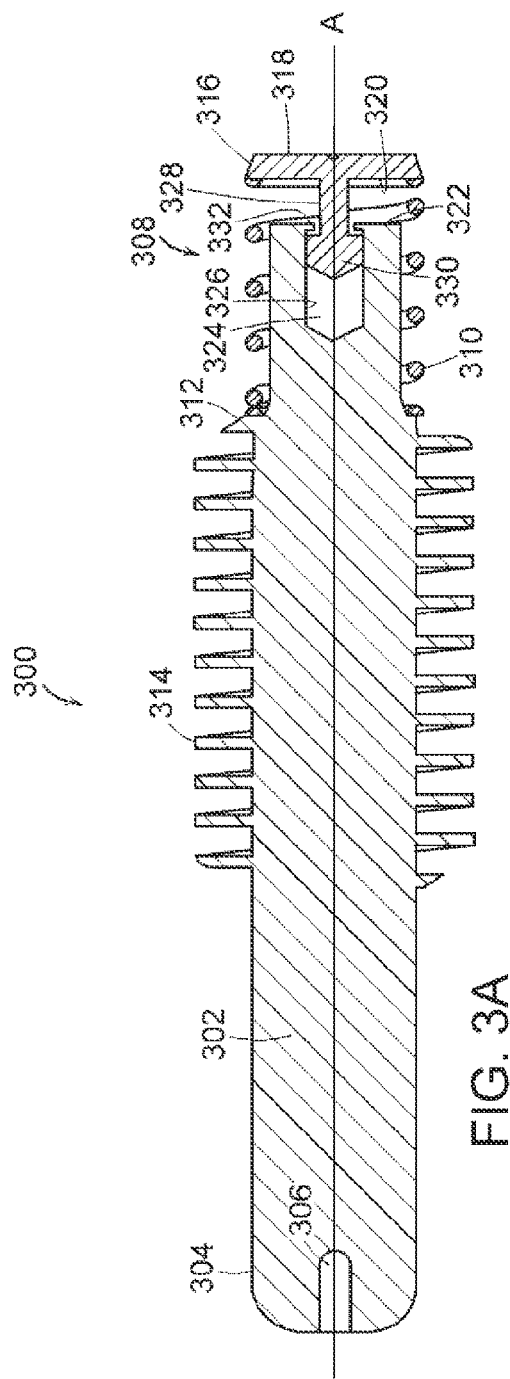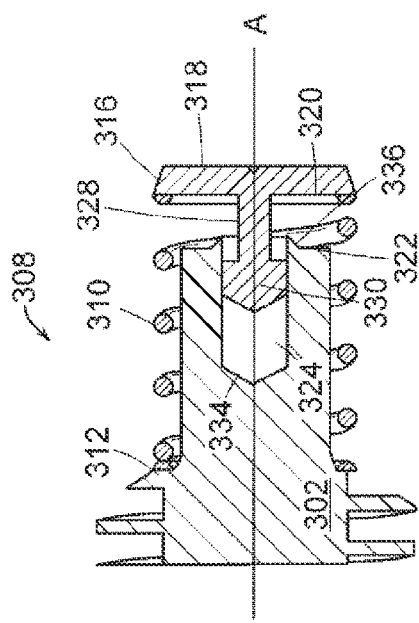
FIG. 3A
FIG. 3B

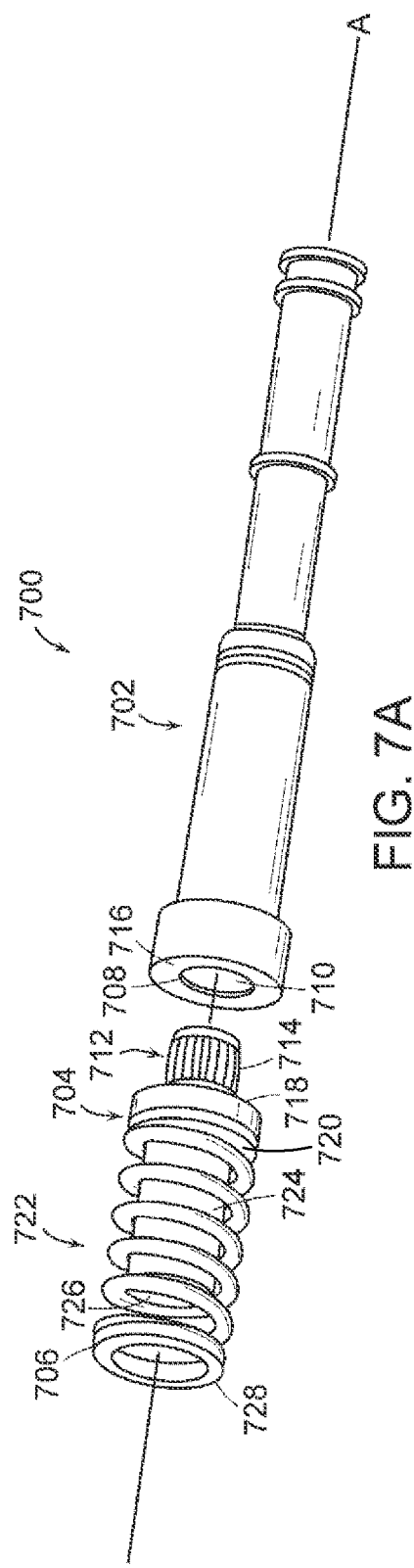
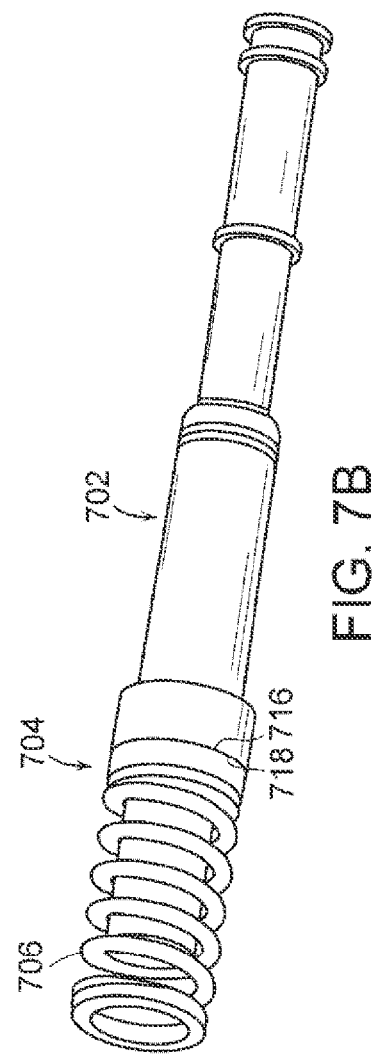

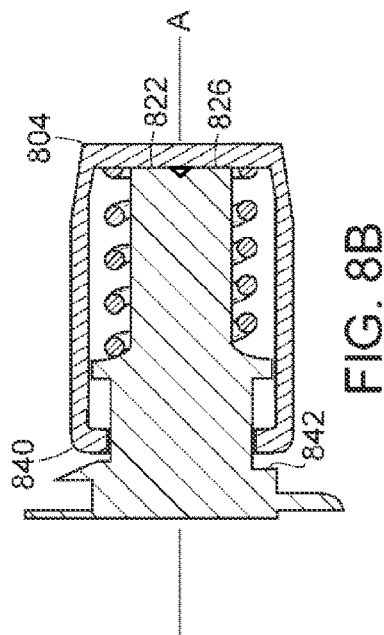
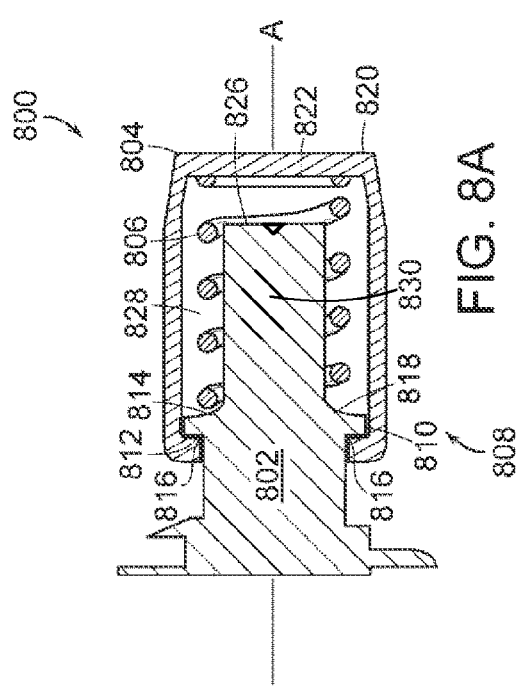
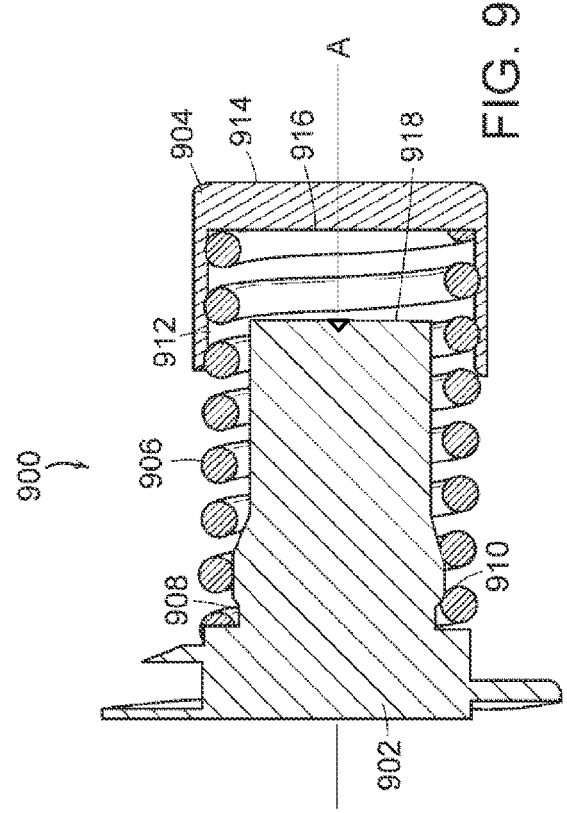

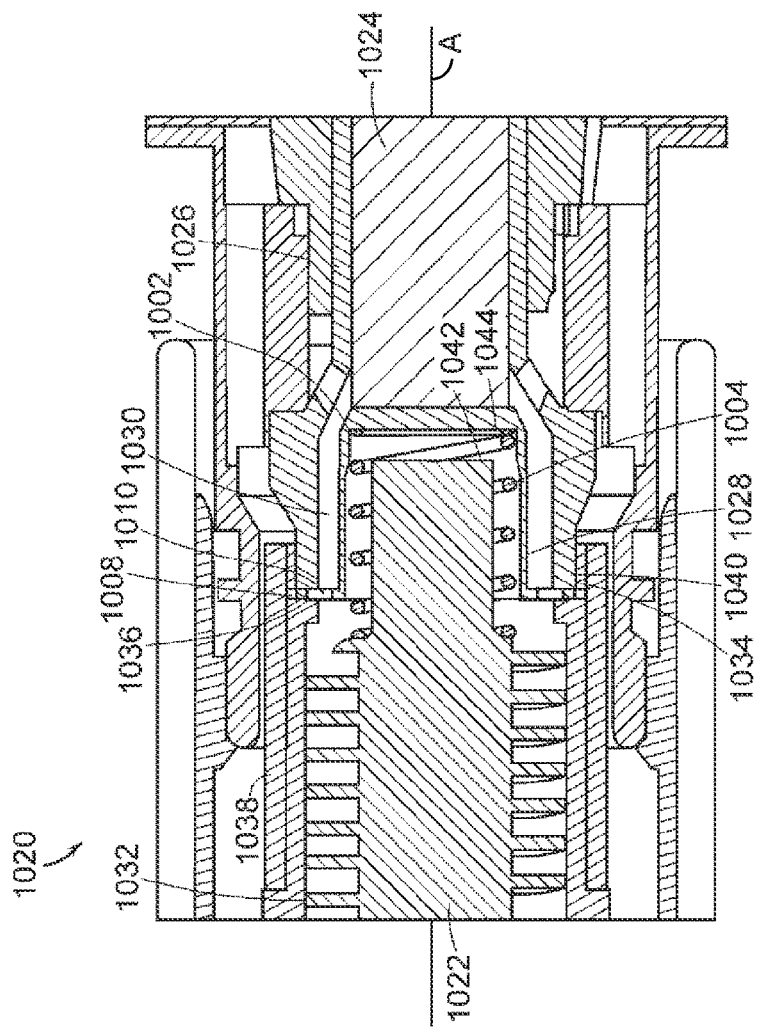
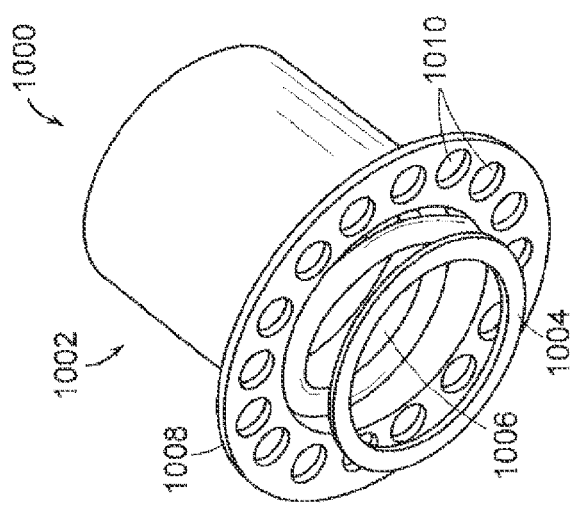
FIG. 10B
FIG. 10A

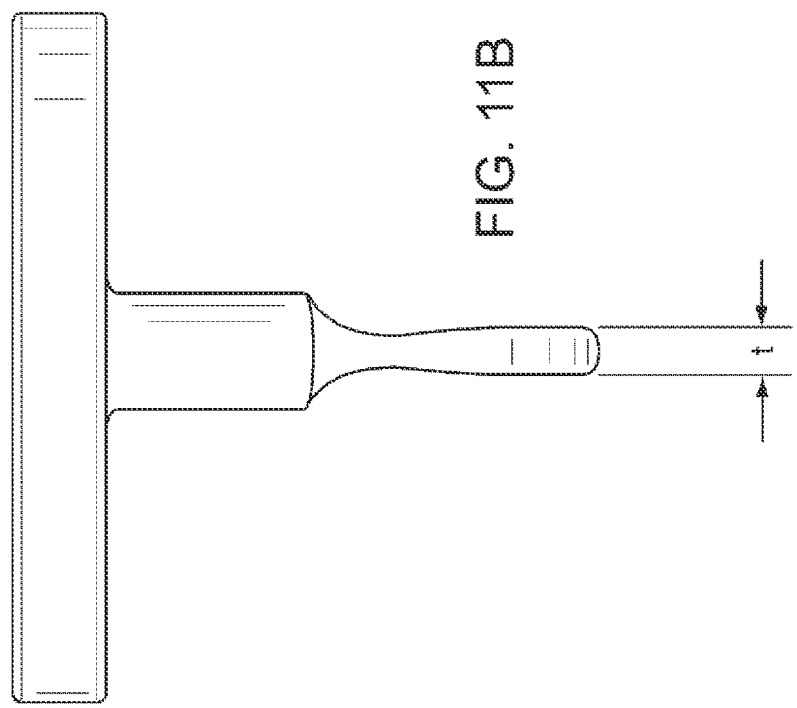
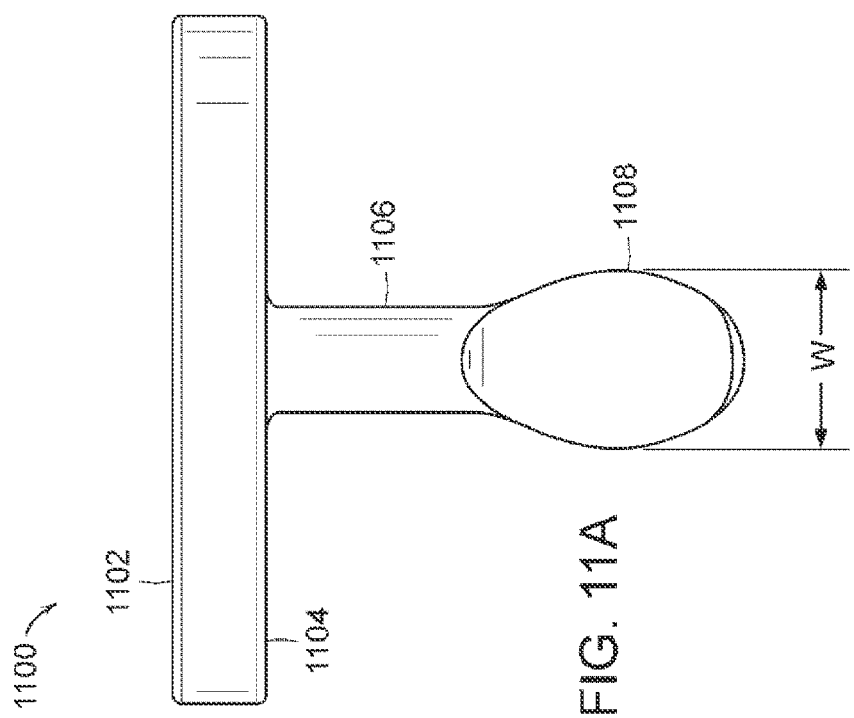

ELECTRODE FOR A CONTACT START PLASMA ARC TORCH AND CONTACT START PLASMA ARC TORCH EMPLOYING SUCH ELECTRODES

CROSS REFERENCE TO RELATED APPLICATIONS

This application is a continuation-in-part of U.S. Ser. No. 11/709,315 filed Feb. 20, 2007, which claims priority to and benefit of U.S. Ser. No. 60/774,451 filed Feb. 17, 2006, both of which are owned by the assignee of the instant application and the disclosures of which are incorporated herein by reference in their entireties.

TECHNICAL FIELD

The invention relates generally to plasma arc torches and more particularly to electrodes and torches for contact start plasma arc torch applications.

BACKGROUND

Material processing apparatus, such as plasma arc torches and lasers are widely used in the cutting and marking of metallic materials known as workpieces. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

One method for producing a plasma arc in a plasma arc torch is the contact start method. The contact start method involves establishing physical contact and electrical communication between the electrode and the nozzle to create a current path between them. The electrode and the nozzle can cooperate to create a plasma chamber within the torch body. An electrical current is provided to the electrode and the nozzle, and a gas is introduced to the plasma chamber. Gas pressure builds up until the pressure is sufficient to separate the electrode and the nozzle. The separation causes an arc to be formed between the electrode and the nozzle in the plasma chamber. The arc ionizes the introduced gas to produce a plasma jet that can be transferred to the workpiece for material processing. In some applications, the power supply is adapted to provide a first electrical current known as a pilot current during generation of the arc and a second current known as a transferred arc current when the plasma jet has been transferred to the workpiece.

Various configurations are possible for generating the arc. For example, the electrode can move within the torch body away from the stationary nozzle. Such a configuration is referred to as the "blow-back" contact start method because the gas pressure causes the electrode to move away from the workpiece. In another configuration, the nozzle can move away from the relatively stationary electrode. Such a configuration is referred to as the "blow-forward" contact start method because the gas pressure causes the nozzle to move toward the workpiece. In still another configuration, other torch components (e.g., the swirl ring) can be moved between the stationary electrode and nozzle.

Certain components of the material processing apparatus deteriorate over time from use. These "consumable" components include, in the case of a plasma arc torch, the electrode, swirl ring, nozzle, and shield. Furthermore, in the process of starting the torch using the contact start method, various consumable components can become misaligned, which reduces the useful life of the components as well as the accuracy and repeatability of plasma jet location. Ideally, these components are easily replaceable in the field. Nevertheless, replacing consumable components can result in down time and reduced productivity.

In the blow-back method of contact starting a plasma arc torch, the electrode is moved away from the nozzle to initiate a pilot arc between the electrode and the nozzle. A proximal end of the electrode (e.g., remote from the workpiece) engages a power contact that forms a part of the torch body. Movement of the electrode away from the nozzle also moves the power contact. Repeated use of the torch results in wear on both the power contact and on the electrode. Replacing the electrode is routine in plasma arc torch operation and the process is routinely performed. However, replacing the power contact involves disassembling the torch body and can be time-consuming and expensive because the power contact is not designed to be a consumable component. Some blow-back torches involve moving the power contact with respect to the relatively stationary torch body. Movement of such a power contact and the effectiveness of the torch can be affected by the stiffness or rigidity of the power cable that connects the power contact to the power supply.

For example, FIG. 1 is a cross section of a known contact start plasma arc torch. The system 100 includes a power supply (not shown) in electrical communication over a current-carrying cable 104 with a power contact 108 that provides current to the torch 112. The torch 112 includes a cathode block 116 electrically insulated from and surrounding the power contact 108. The power contact 108 abuts a proximal end 120 of an electrically conductive electrode 124. A spring 128 disposed within the cathode block 116 reacts against a surface 132 of the cathode block 116 to urge the power contact 108 and electrode 124 toward an electrically conductive nozzle 136. The electrode 124 is urged into contact with the nozzle 136 by the spring prior to initiation of an arc for processing a workpiece (not shown).

A current path is established from the cable 104 to the power contact 108, the electrode 124, and the nozzle 136. Electrical current can be passed along the current path. The electrode 124 cooperates with the nozzle 136 to form a portion of a plasma chamber 140. A plasma gas can be supplied to the plasma chamber 140 to increase pressure within the plasma chamber 140 and overcome the force provided by the spring 128. The pressure forces the electrode 124 and the power contact 108 away from the nozzle 136. A potential difference develops between the electrode 124 (e.g., the cathode) and the nozzle 136 (e.g., the anode) as the gap 144 between the electrode 124 and the nozzle 136 increases. An arc (not shown) ionizes gas particles and is initiated across the gap 144 for workpiece processing.

One drawback of the system 100 is that the power contact 108 is required to move as the electrode 124 moves to initiate an arc. As the current carrying capacity of the cable 104 increases, the size of the cable 104 increases, but the flexibility of the cable 104 decreases. The decreased flexibility of the cable 104 reduces the versatility and maneuverability of the torch 112. Additionally, the power contact 108 and the cathode block 116 require relatively tight tolerances (e.g., with relatively small clearance between the power contact 108 and the cathode block 116). The relatively tight tolerances position and guide the power contact

108 during motion of the power contact 108, for example, during initiation of a pilot arc.

SUMMARY

There is a need for an electrode for use in a contact start plasma arc torch that optimizes operation of the torch without prematurely failing. Further, there is a need for a contact start torch that employs the concepts herein to maximize component lifetime within existing torch designs. It is therefore an object of the invention to provide a longer-lasting electrode and components for use with an electrode in a plasma arc torch. Another object is to provide a configuration that reduces wear on components of the torch that are not designed as consumables. Yet another object is to provide aligning features with respect to torch components during torch operation (e.g., pilot arc and transferred arc mode).

In one aspect, a component for a contact start plasma arc torch is provided. The component includes a hollow body defining a channel with a longitudinal axis. The channel is capable of slideably receiving an electrode body along the longitudinal axis. The component also includes a contact element disposed in the hollow body. The contact element includes a first surface and a second surface. The first surface facilitates electrical communication with a power supply and the second surface physically contacts a surface of the electrode body when the plasma arc torch is operated in a transferred arc mode. The second surface is characterized by the absence of physical contact with the surface of the electrode body when the torch is operated in a pilot arc mode.

In some embodiments, the component includes a swirl ring portion defining an exterior portion, an interior portion and one or more holes passing from the exterior portion to the interior portion for imparting a swirling motion to a fluid. The swirl ring portion can be formed integrally with the hollow body. In some embodiments, the hollow body includes a swirl ring portion.

In some embodiments, the component includes a resilient element contacting the electrode body when the electrode body is inserted into the channel. The resilient element is configured to impart a separation force upon the electrode body. In some embodiments, the resilient element is secured to the channel by a diametral interference fit. The resilient element can be coupled to the contact element. In some embodiments, the component includes a power contact in electrical communication with the power supply and the first surface of the contact element.

In some embodiments, the contact element is stationary. In some embodiments, the channel includes a shoulder for retraining a longitudinal movement of the contact element. In some embodiments, an interior surface of the channel comprises an insulating material.

In another aspect, a method of operating a contact start plasma arc torch is provided. The method includes slideably receiving an electrode body in a channel along a longitudinal axis. The channel is defined by a hollow body of a component of the plasma arc torch. The method includes facilitating, when the plasma arc torch is operated in a transferred arc mode, i) electrical communication between a power supply and a first surface of a contact element disposed in the channel, and ii) physical contact between a second surface of the contact element and a surface of the electrode body. The method further includes maintaining the absence of physical contact between the second surface of the contact element and the surface of the electrode body when the plasma arc torch is operated in a pilot arc mode.

In some embodiments, the method includes imparting a swirling motion to a fluid by passing the fluid over one or more holes from an exterior surface to an interior surface of the component. In some embodiments, the method includes imparting a separation force upon the electrode body via a resilient element disposed between the second surface of the contact element and the surface of the electrode body. In some embodiments, the method includes coupling the resilient element to the contact element. In some embodiments, the method includes restraining a longitudinal movement of the contact element in the channel.

In some embodiments, the method includes insulating an interior surface of the channel. In some embodiments, the method includes facilitating electrical communication between a power contact and the first surface of the contact element. The power contact can be in electrical communication with the power supply.

In another aspect, a component for a contact start plasma arc torch is provided. The component includes a hollow body defining a channel with a longitudinal axis. The channel is capable of slideably receiving an electrode body along the longitudinal axis. The component includes a first contact element disposed in the hollow body. The first contact element includes a first contact element surface and a second contact element surface. The first contact element surface facilitates electrical communication with a power supply. The component also includes a supplemental contact element disposed in the hollow body. The supplemental contact element includes a first supplemental contact element surface and a second supplemental contact element surface. The first supplemental contact element surface physically contacts the second contact element surface and the second supplemental contact element surface physically contacts a surface of the electrode body when the plasma arc torch is operated in a transferred arc mode.

In some embodiments, the component includes a swirl ring portion defining an exterior portion, an interior portion and one or more holes passing from the exterior portion to the interior portion for imparting a swirling motion to a fluid. In some embodiments, the swirl ring portion is formed integrally with the hollow body.

In some embodiments, the component includes a resilient element disposed between the second contact element surface and the first supplemental contact element surface in the channel. The resilient element is configured to impart a separation force upon the supplemental contact element. The resilient element can be secured to the channel by a diametral interference fit. In some embodiments, the resilient element is coupled to at least one of the first contact element or the supplemental contact element.

In some embodiments, the first contact element is stationary. In some embodiments, the supplemental contact element is translatable relative to the first contact element. In some embodiments, an interior surface of the channel includes an insulating material.

In some embodiments, the component includes a power contact in electrical communication with the power supply and the first contact element surface of the first contact element.

In another aspect, a method of operating a contact start plasma arc torch is provided. The method includes slideably receiving an electrode body in a channel along a longitudinal axis. The channel can be defined by a hollow body of a component for the plasma arc torch. The method includes facilitating electrical communication between a power supply and a first contact element surface of a first contact element disposed within the channel. The method further includes facilitating, when the plasma arc torch is operated in a transferred arc mode, i) physical contact between a second contact element surface of the first contact element and a first supplemental contact element surface of a supplemental contact element disposed within the channel, and ii) physical contact between a second supplemental contact element surface of the supplemental contact element and a surface of the electrode body.

In some embodiments, the method includes imparting a swirling motion to a fluid in the component by passing the fluid over one or more holes from an exterior surface to an interior surface of the component. In some embodiments, the method includes imparting a separation force upon the supplemental contact element via a resilient element disposed between the second contact element surface and the first supplemental contact element surface.

In some embodiments, the method includes attaching the resilient element to at least one of the first contact element or the supplemental contact element. In some embodiments, the method includes translating the supplemental contact element relative to the first contact element during the transferred arc mode. In some embodiments, the method includes insulating an interior surface of the channel.

In some embodiments, the method includes facilitating electrical communication between a power contact and the first contact element surface of the first contact element. The power contact is in electrical communication with the power supply.

In another aspect, an assembly for a contact start plasma arc torch is provided. The assembly includes a hollow body defining a longitudinal axis. The hollow body is capable of slideably receiving an electrode body along the longitudinal axis. The assembly includes a contact element disposed in the hollow body. The contact element includes a first surface and a second surface. The first surface is capable of facilitating electrical communication with a power supply and the second surface physically contacts a surface of the electrode body when the electrode body is inserted into the hollow body. The assembly includes a resilient element connected to the contact element in the hollow body. The resilient element physically contacts the electrode body and imparts a separation force upon a surface of the electrode body when the electrode body is inserted into the hollow body.

In some embodiments, the resilient element passes substantially all of a pilot arc current to the electrode body when the torch is operated in a pilot arc mode. In some embodiments, the assembly includes a conductive element for passing substantially all of a pilot arc current to the electrode body when the torch is operated in a pilot arc mode.

In some embodiments, the assembly is a consumable component of the plasma arc torch. In some embodiments, the assembly includes a nozzle, a shield, a swirl ring or a retaining cap, or a combination thereof.

In some embodiments, the resilient element is in physical contact with the contact element.

In another aspect, an electrode for a contact start plasma arc torch is provided. The electrode includes an elongated electrode body formed of an electrically conductive material. The electrode body defines a longitudinal axis. The electrode also includes a contact element, which includes a first surface and a second surface. The first surface facilitating electrical communication with a power supply and the second surface physically contacts a surface of the electrode body when the torch is operated in a transferred arc mode. The electrode includes a resilient element between a proximal end of the electrode body and the contact element. The resilient element imparts a separation force between the second surface of the contact element and a surface of the electrode body. The electrode further includes a conductive element for: i) passing at least substantially all of a pilot arc current to the electrode body when the torch is operated in a pilot arc mode, or ii) passing at least substantially all of a transferred arc current to the electrode body when the torch is operated in a transferred arc mode, or a combination thereof.

In some embodiments, the electrode includes an insulating material between the resilient element and the electrode body, or between the contact element and the resilient element, or a combination thereof, for preventing the resilient element from passing at least one of the pilot arc current or the transferred arc current to the electrode body. In some embodiments, the resilient element is made of a non-conductive material.

In some embodiments, the conductive element is a wire in electrical communication with the contact element and the electrode body. In some embodiments, the conductive element is a probe at least partially embedded in the electrode body. The probe is adapted to maintain physical contact with the contact element. In some embodiments, the conductive element is a second resilient element coupled to at least a portion of the electrode body and in physical contact with the contact element. In some embodiments, the conductive element is configured to pass substantially all of the pilot arc current and the transferred arc current.

In some embodiments, the electrode includes an insulating material between the second surface of the contact element and the surface of the electrode body for preventing the transferred arc current from being passed from the contact element to the electrode body during the transferred arc mode.

In another aspect, an electrode for a contact start plasma arc torch is provided. The electrode is in electrical communication with a power supply. The electrode includes an elongated electrode body formed of an electrically conductive material. The electrode body defines a longitudinal axis. The electrode includes a resilient element adjacent to a proximal end of the electrode body. The resilient element is capable of i) passing at least substantially all of a pilot arc current to the electrode body when the torch is operated in a pilot arc mode, and ii) passing at least substantially all of a transferred arc current to the electrode body when the torch is operated in a transferred arc mode.

In another aspect, a method of operating a contact start plasma arc torch is provided. The method includes providing an electrode for the plasma torch. The electrode includes an electrode body defining a longitudinal axis. The electrode body includes a proximal end adjacent to a resilient element. The method includes passing at least substantially all of a pilot arc current generated by a power supply to the electrode body via the resilient element during a pilot arc operation of the torch. The method further includes passing at least substantially all of a transferred arc current generated by the power supply to the electrode body via the resilient element during a transferred arc operations of the torch.

In other embodiments of the invention, any of the aspects above can include one or more of the above features. One embodiment of the invention can provide all of the above features and advantages. These and other features will be more fully understood by reference to the following description and drawings, which are illustrative and not necessarily to scale.

It should also be understood that various aspects and embodiments of the invention can be combined in various ways. Based on the teachings of this specification, a person of ordinary skill in the art can readily determine how to combine these various embodiments.

BRIEF DESCRIPTION OF THE DRAWINGS

FIG. 3A is a cross section of an exemplary embodiment of an electrode for use in a contact start plasma arc torch.

FIG. 3B is a more detailed illustration of the components of the electrode of FIG. 3A prior to assembly of an embodiment of the electrode.

FIG. 7A depicts a partially exploded view of an exemplary contact element, resilient element, and power contact that embody principles of the invention.

FIG. 7B depicts the components of FIG. 7A disposed in a plasma arc torch operation.

FIG. 8A depicts a cross section of another embodiment of an electrode body, resilient conductive element, and contact element prior to installation within a plasma arc torch.

FIG. 8B illustrates the configuration of the components of FIG. 8A during transferred arc mode.

FIG. 9 depicts a cross section of another embodiment of an electrode that embodies the invention.

FIG. 10A is a perspective view of an exemplary contact element and resilient conductive element.

FIG. 10B is a cross-sectional view of a portion of a plasma arc torch employing the components of FIG. 10A during pilot arc operation.

FIG. 11A depicts an exemplary contact element for use in a contact start plasma arc torch.

FIG. 11B depicts the contact element of FIG. 11A rotated 90° about a vertical axis.

DETAILED DESCRIPTION

Figure 1:
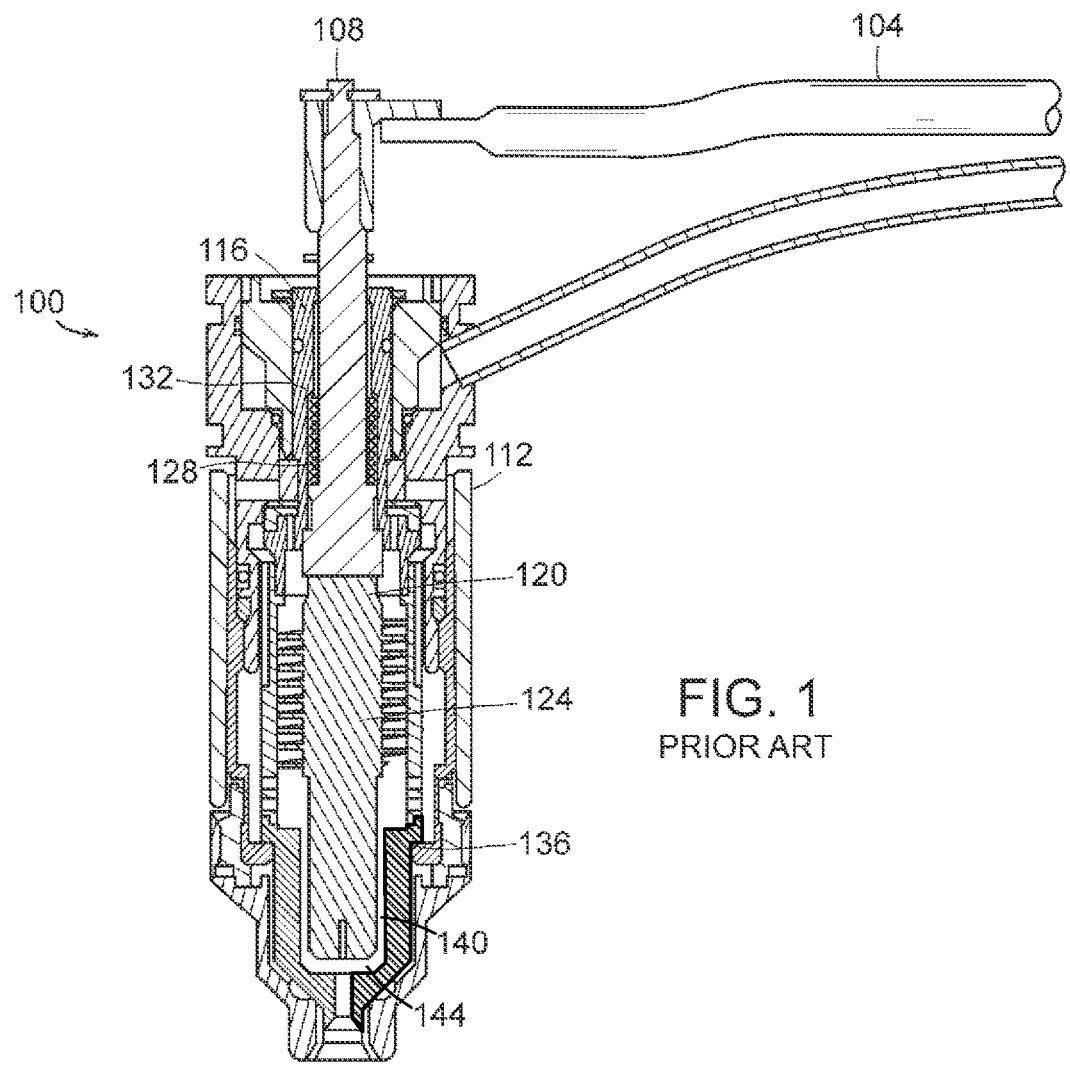
FIG. 1 is a cross section of a known contact start plasma arc torch.
Figure 2A:
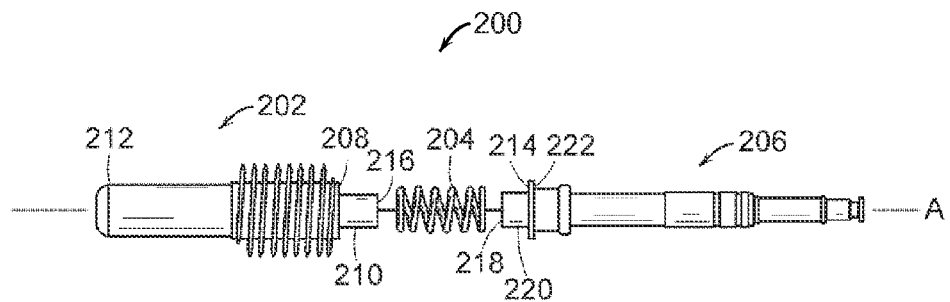
FIG. 2A is an exploded view of an electrode body, a conductive resilient element, and a power contact, featured in embodiments of the invention.

FIG. 2A is an exploded view of an electrode body, a resilient element, and a power contact, featured in embodiments of the invention. The system 200 includes an electrode body 202, a resilient element 204, and a power contact 206 (also referred to as a power connection). The power contact 206 is in electrical communication with a power supply (not shown), for example, by a power cable (e.g., the power cable 104 of FIG. 1). The power supply provides to the power contact 206 the electrical current used to operate a plasma arc torch, similar to the torch 112 of FIG. 1. The electrode body 202 includes a reaction surface 208 that is configured for electrical communication with the resilient element 204. The reaction surface 208 is disposed in a spaced relationship with a proximal end 210 of the electrode body 202. In some embodiments, the reaction surface 208 defines a flange extending radially from the longitudinal axis A. In some embodiments, the reaction surface 208 is formed integrally with the electrode body 202. For example, the reaction surface 208 can be fabricated from the same material as the electrode body 202 or fabricated from a different material but bonded or secured to the electrode body 202.

The proximal end 210 of the electrode body 202 is disposed oppositely from the distal end 212. In the illustrated embodiment, the diameter of the distal end 212 is greater than the diameter of the proximal end 210 to allow the resilient element 204 to surround the proximal end 210 when installed in the torch. Stated differently, the diameter of the proximal end 210 is less than the inside diameter of the resilient element 204. In other embodiments, the proximal end 210 has a diameter equal to or greater than that of the distal end 212.

The power contact 206 includes a surface 214 for reacting against the resilient element 204. The resilient element 204 reacts against the relatively stationary surface 214 and against the reaction surface 208 of the relatively moveable electrode body 202 to bias the electrode body away from the power contact 206 during pilot arc operation. The electrode body 202 defines a contact surface 216 that is configured for physical contact and electrical communication with a corresponding surface 218 of the power contact 206. During the latter portion of pilot arc operation and during transferred arc mode, the contact surface 216 is in an abutting relationship with the corresponding surface 218. The portion 220 of the power contact 206 adjacent the surface 218 and extending to the surface 214 defines a diameter such that the resilient element 204 surrounds the portion 220.

In some embodiments, the power contact 206 can be fabricated as a part of the power contact 108 of FIG. 1 (e.g., by machining the power contact 108 to include the features of the power contact 206). Such embodiments allow a user to employ the concepts described with respect to FIG. 2A in the existing torch system 112 of FIG. 1. In some embodiments, the power contact 108 can be positioned in the blown-back position of FIG. 1 by machining a groove in the power contact 108 and securing the power contact 108 with respect to the torch 112 with a clip or a retaining ring (not shown). In this way, the power contact 108 remains stationary relative to the torch 112 during both pilot arc operation and transferred arc operation. In general, any of the embodiments described herein can be used with the torch system 112 of FIG. 1 by modifying the power contact 108 in accord with the principles described herein.

The relatively stationary power contact 108 requires less flexibility from the power cable. An exemplary current suitable for use as a pilot arc current is between about 10 and about 31 amps. The electrical current during transferred arc operation can be up to about 200 amps. However, electrical currents greater than about 200 amps are within the scope of the invention, e.g., 400 amps. In some embodiments, the power contact 108 is fabricated from tellurium copper, brass, copper, or other materials suitable for passing current both during pilot arc operation and transferred arc operation.

In general, pilot arc operation refers to a duration of time between the provision of electric current to the electrode body 202 and the transfer of the plasma arc to the workpiece. More specifically, pilot arc operation can include initiation of the pilot arc and some duration of time after initiation of the pilot arc but prior to the transfer of the arc to the workpiece. Some torch designs include a safety mechanism to terminate pilot arc operation after a predetermined amount of time irrespective of whether the plasma arc has been transferred to the workpiece. Such mechanisms are designed to prolong the operational life of torch components and promote safety by limiting the amount of time the torch is operated without a specific application (e.., processing a workpiece).

In some embodiments, the resilient element 204 is secured to either the electrode body 202 or the power contact 206. In other embodiments, the resilient element 204 is secured to both the electrode body 202 and the power contact 206. For example, the resilient element 204 can be secured by welding, soldering, bonding, or otherwise fastening to the electrode body 202 or the power contact 206. In some embodiments, the resilient element 204 is secured to the proximal end 208 of the electrode body 202 by a diametral interference fit or other type of friction fit. For example, an outer diameter of the proximal end 208 of the electrode body may be slightly larger than an inner diameter of the resilient element 204. In some embodiments, the proximal end 208 of the electrode body 202 features an extension portion (not shown) having an inner diameter that is smaller than the inner diameter of the resilient element 204. The extension portion can be formed integrally with electrode body 202 or otherwise secured to the electrode body 202. Such a configuration permits the electrode body 124 of FIG. 1 to be used, for example, in the torch 240 of FIG. 2B.

In some embodiments, the portion 220 of the power contact 206 is tapered or in a frustoconical shape along the longitudinal axis A. In some embodiments, the electrode body 202 can include a radially extensive shoulder (not shown) having a diameter that is greater than the inside diameter of the resilient element 204 such that advancing the resilient element 204 toward the distal end 212 of the electrode body 202 past (e.g., over) the radially extensive shoulder hinders the resilient element 204 from disengaging the electrode body 202 axially towards the proximal end 210.

In some embodiments, a distal face (not shown) of the shoulder is the reaction surface of the electrode body 202. A similar diametral interference fit can be used with respect to the power contact 206. For example, the resilient element 204 can be advanced axially away from the electrode body 202 past the surface 214 of the power contact such that the face 222 of the surface 214 opposite the portion 220 hinders disengagement of the resilient element 204 from the power contact. In some embodiments, the resilient element 204 is conductive and the interface between the face 222 and the resilient element 204 establishes a current path from the power contact 206.

In some embodiments, the resilient element 204 is disposed in a spaced relationship with the distal end 212 of the electrode body 202 instead of the proximal end 210. The distal end 212 generally includes an emissive element (not shown) such as hafnium for more efficient plasma arc generation and workpiece processing. In some embodiments, the resilient element 204 is formed integrally with the electrode body 202 or the power contact 206. For example, the resilient element 204 can be formed from the same material as the electrode body 202. In other embodiments, the resilient element 204 is bonded or secured to the electrode body 202 to hinder disengagement from the electrode body 202 under normal operational conditions (e.g., gas pressure and/or the influence of gravitational or other forces).

Figures 2B, 2C:
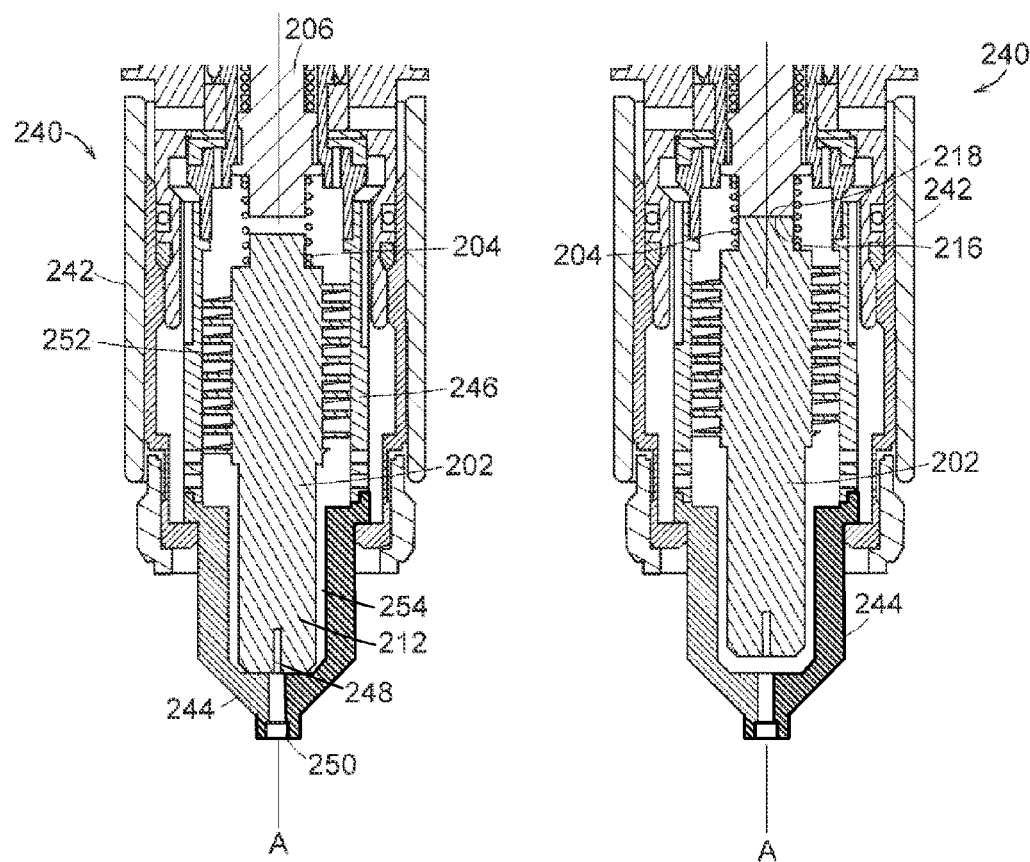
FIG. 2B illustrates a cross section of an exemplary contact start plasma arc torch employing the components of FIG. 2A prior to pilot arc operation.
FIG. 2C illustrates a cross section of the plasma arc torch of FIG. 2B during transferred arc mode.

FIG. 2B illustrates a cross section of an exemplary contact start plasma arc torch employing the components and concepts of FIG. 2A. The configuration of FIG. 2B illustrates the torch 240 prior to pilot arc operation. The torch 240 includes the electrode body 202, the resilient element 204, and the power contact 206 of FIG. 2A, mounted within a torch body 242. A nozzle 244 and a swirl ring 246 are also mounted to the torch body 242. The power contact 206 is positioned relatively stationary with respect to the moveable electrode body 202. The power contact 206 is positioned oppositely from the distal end 212 of the electrode body 202 (e.g., at the back end of the torch 240). The distal end 212 of the electrode body 202 includes an emissive element 248 substantially aligned with an exit orifice 250 of the nozzle 244. In some embodiments, the emissive element 248 and the exit orifice 250 are substantially centered about the longitudinal axis A. The swirl ring 246 is positioned to in part restrain radial motion of the electrode body 202 within the torch body 242. For example, the swirl ring 246 can be manufactured to permit a relatively small gap between the swirl ring 246 and one or more radial fins 252 of the electrode body 202.

The resilient element 204 reacts against the reaction surface 208 of the electrode body 202 and against the surface 214 of the power contact 206 to urge the electrode body 202 into abutting relation with the nozzle 244. Gas flows into a plasma chamber 254 formed between the electrode body 202 and the nozzle 244, and a pilot current is passed from the power supply (not shown) to the power contact 206.

Gas pressure builds within the plasma chamber 254 until the pressure is sufficient to overcome the force provided by the resilient element 204. The gas pressure moves the electrode body 202 away from the nozzle 244 and into an abutting relationship with the power contact 206. The electrode body 202 moves substantially along the longitudinal axis A. As the electrode body 202 is moved away from the nozzle 244 by gas pressure, an arc is generated or initiated in the plasma chamber 254. The arc ionizes the gas within the plasma chamber 254 to form a plasma arc or jet that exits the orifice 250 of the nozzle 244 and is transferred to the workpiece (not shown).

In some embodiments, the resilient element 204 is conductive and is configured or designed to pass substantially all of the pilot current between the power contact 206 and the electrode body 202. The resilient element 204 can be formed from a material that facilitates both carrying the electrical current or load associated with initiating a pilot arc and dissipating thermal heat associated with the current to prevent the resilient element from melting during pilot arc operation. In some embodiments, the material of the resilient element 204 is selected, for example, based on the current rating of the material. In some embodiments, the resilient element 204 is the path of least resistance and/or highest conductance between the power contact 206 and the electrode body 202. Additionally, the mechanical properties of the resilient element 206 facilitate movement of the electrode body for contact starting the plasma arc torch. In some embodiments, the resilient element aids in aligning the electrode body relative to the torch.

The resilient element 204 can be an electrically conductive spring capable of reliably conducting about 31 amps of electric current for up to about 5 seconds or longer for pilot arc operation without melting or otherwise changing the mechanical properties of the spring. In some embodiments, the resilient element 204 is fabricated from an alloy of inconel® X-750. In some embodiments, the resilient element 204 is fabricated from stainless steel. For example, the resilient element 204 can be formed of 17/4 precipitation hardening stainless steel wire (conforming to AMS 5604 specifications) or Type 302 stainless steel wire (conforming to AMS 5866 or ASTM A 313 specifications). In some embodiments, the resilient element 204 is formed from a wire of diameter about 0.762 mm (about 0.03 inches) and defines an outside diameter of about 7.62 mm (about 0.3 inches) 300/1000 and a length along the longitudinal axis A of about 12.7 mm (e.., about 0.5 inches). In some embodiments, the resilient element 204 is coated or plated with silver or a silver alloy to reduce electrical resistance and/or improve or provide electrical conductance.

While depicted herein as a helical compression spring, the resilient element 204 can include other configurations, for example, a wave spring washer, a finger spring washer, curved spring washer, flat wire compression spring of the crest-to-crest variety, or a slotted conical disk. For example, these types of springs are illustrated in U.S. Pat. No. 5,994,663 assigned to Hypertherm, Inc., of Hanover, N.H., the contents of which are hereby incorporated herein by reference. Other spring configurations are also within the scope of the invention.

In some embodiments, the resilient element 204 is a wire disposed at the proximal end 210 of the electrode body 202, and a second resilient element (not shown) is disposed at the distal end 212 of the electrode body 202. The second resilient element biases the electrode body toward the distal end 204 during pilot arc operation and restrains radial motion of the electrode body 202 during torch operation (e.g., during pilot arc operation and during workpiece processing). In this way, the second resilient element aligns the electrode body 202 during torch operation.

In some embodiments, the resilient element 204 conducts minimal or no pilot arc current between the power contact 206 and the electrode body 202. For example, the resilient element 204 can be manufactured from a material with no or relatively low electrical conductivity. Alternatively, the resilient element 204 can be coated with an insulating material to prevent conduction of electrical current. In some embodiments, one or more conductive components are employed to conduct the pilot arc current between the power contact 206 and the electrode body 202. For example, a wire can be used for supplying pilot arc current from the power contact 206 to the electrode body 202.

FIG. 2C illustrates a cross section of the plasma arc torch of FIG. 2B during transferred arc mode. The contact surface 216 of the electrode body 202 engages in substantially planar physical contact with the corresponding surface 218 of the power contact 206 to establish electrical communication (e.g., electrical current passes between the electrode body 202 and the power contact 206 at the interface of the contact surface 216 and the corresponding surface 218). When the contact surface 216 of the electrode body 202 abuts the corresponding surface 218 of the power contact 206, a current path is established such that at least a portion of a current passes directly between the power contact 206 and the electrode body 202. When the arc has been transferred to the workpiece, a cutting current is supplied to the torch 240 (e.g., during transferred arc mode).

In some embodiments, the resilient element 204 is conductive. The resilient element 204 can be configured to pass an electrical current between the power contact 206 and the electrode body 202 during pilot arc operation, but does not carry a substantial amount of electrical current during transferred arc operation. More particularly, the current path directly between the power contact 206 and the electrode body 202 has lower resistance and/or higher conductance than the current path from the power contact 206 through the resilient element 204 to the electrode body 202. That is, when the electrode body 202 is in the blown-back state (e.g., surface 216 of the electrode body 202 is in physical contact and electrical communication with surface 218 of the power contact 206), substantially all of the electrical current for sustaining a plasma arc (in transferred arc mode) is passed directly between the surface 216 and the surface 218. The design of FIGS. 2A, 2B, and 2C thus combines dual functions, namely biasing the electrode body 202 toward the nozzle 244 and providing an electrical current path between the power contact 206 and the electrode body 202, into a single component to reduce the number of consumable components and to simplify torch design.

In some embodiments, the resilient element 204 carries at least a portion of an electric current during transferred arc mode. For example, the resilient element 204 can carry a substantial amount of a transferred arc current such that no or relatively low current is passed from the power contact 206 to the electrode body 202 as the two components come into contact during transferred arc mode. This can be accomplished, for example, by placing an insulating material on surface 216 of the electrode body 202 and/or surface 218 of the power contact 206. In addition, the resilient element 204 can be appropriately sized or otherwise configured to carry the transferred arc current.

The resilient element 204 can be a conductive wire or metal strip for passing electrical current between the power contact 206 and the electrode body 202 during pilot arc operation and/or transferred arc operation. In some embodiments, the resilient element 204 is a conductive sleeve in electrical communication with the power contact 206 and the electrode body 202 for passing electrical current therebetween. For example, such a sleeve can be designed to fit closely over the proximal end 210 of the electrode body 202 and over the portion 220 of the power contact 206. In some embodiments, a second resilient element (not shown), for example a spring, can be used in conjunction with the resilient element 204 to provide the mechanical function of biasing the electrode body 202 toward the nozzle 244.

In some embodiments, the resilient element 204 is not conductive and is mainly employed to provide a separation force for biasing the electrode body 202 toward the nozzle 244. At least one conductive component (e.g., a non-resilient wire) is used to supply electrical current from the power contact 206 to the electrode body 202 for pilot arc operation and/or transferred arc operation. If the conductive component passes mainly pilot arc current, the component can be capable of reliably conducting, in one embodiment, about 31 amps of electric current for up to about 5 seconds or longer for pilot arc operation without melting or otherwise changing the mechanical properties of the component. If the conductive component serves as the primary current path during both the pilot arc mode and the transferred arc mode, the component can conduct electrical current, in one embodiment, of up to about 200 amps during transferred arc operation without changing the properties of the component.

In some embodiments, both the power contact 206 and the resilient element 204 are mounted to the torch body 242 and are relatively secured with respect to the moveable electrode body 202. For example, when the nozzle 244 is removed from the torch body 242, the resilient element 204 urges the electrode body 202 out of the torch body 242 (e.g., the electrode body 202 is ejected). In such an embodiment, the electrode body 202 is a consumable component of the torch 240. In other embodiments, the combination of the electrode body 202 and the resilient element 204 is a consumable component of the torch 240, e.g., the pieces can be sold or purchased together as a package.

FIG. 3A is a cross section of an exemplary embodiment of an electrode for use in a contact start plasma arc torch. The electrode 300 includes an elongated electrode body 302 oriented along a longitudinal axis A. The electrode body 302 can be formed of an electrically conductive material such as tellurium copper, silver, silver copper alloys, or other alloys. The electrode body 302 includes a distal end 304 that includes a bore 306 for housing an emissive element (not shown) and a proximal end 308. The emissive element can be made from, for example, hafnium and is used to increase the operational life of a plasma arc torch (not shown) and to reduce wear on the electrode body 302. During operation of the plasma arc torch and workpiece processing, the distal end 304 of the electrode body 302 is positioned near the workpiece (not shown), and the proximal end 308 is positioned remotely from the workpiece. The electrode body 302 is movable along the longitudinal axis A when the electrode 300 is mounted within the torch.

The electrode 300 includes an electrically conductive resilient element 310 (also referred to herein as the resilient conductive element 310). The resilient conductive element 310 is configured to pass substantially all of a pilot arc current between a power supply (not shown) and the electrode body 302 during pilot arc operation. The resilient conductive element 310 is depicted as a helical spring that engages a radially extending flange 312 (e.g., a shoulder) disposed on the proximal end 306 of the electrode body 302. The flange 312 can be a reaction surface for the resilient conductive element 310. The physical contact between the resilient conductive element 310 and the flange 312 of the electrode body 302 provides a current path.

In some embodiments, the resilient conductive element 310 is secured to the flange 312 (e.g., by soldering or welding) such that the resilient conductive element 310 is retained by the electrode body 302. The resilient conductive element 310 can be retained by a diametral interference fit or other type of friction fit. In some embodiments, the resilient conductive element 310 is formed integrally with the electrode body 302 (e.g., the electrode body 302 and the resilient conducting element 310 are fabricated from the same piece of material). The resilient conductive element 310 can be secured with respect to the electrode body 302 to hinder disengagement of the resilient conductive element 310 from the electrode body 302 during processing or maintenance operations.

As illustrated, the electrode body 302 includes a series of fins 314 that are formed integrally with the electrode body 302. The fins 314 increase the surface area of the electrode body 302 and function as heat transfer surfaces to cool the electrode body 302 during torch operation. The fins 314 also form a type of seal that allows a plasma gas introduced in the plasma chamber (e.g., the plasma chamber 254 of FIG. 2B) to build sufficient gas pressure to move the electrode body 302 longitudinally along axis A toward the proximal end 308. As discussed above, movement of the electrode body 302 toward the proximal end 308 initiates the pilot arc when a pilot arc current is passed between the resilient conductive element 310 and the electrode body 302.

The placement of the fins 314 provides a spiral groove axially along the electrode body 302. Exemplary fins 314 are illustrated in U.S. Pat. 4,902,871 assigned to Hypertherm, Inc. of Hanover, N.H., the contents of which are hereby incorporated herein by reference. The fins 314 are depicted as radially extending from the longitudinal axis A. Other configurations of fins 314 are possible, for example, extending longitudinally along the axis A, such as illustrated in U.S. Pat. 6,403,915 also assigned to Hypertherm, Inc. of Hanover N.H., the contents of which are hereby incorporated herein by reference. Some embodiments of the electrode 300 do not include the fins 314, and the gas pressure exerts a force against a different surface of the electrode body 302 to move the electrode body during initiation of a pilot arc.

The electrode 300 includes a contact element 316 that includes a first surface 318 and a second surface 320. The first surface 318 is configured for electrical communication with a power supply (not shown). For example, the first surface 318 can abut a corresponding surface of a power contact (e.g., the power contact 206 of FIG. 2A, not shown in FIG. 3A). The power supply can provide electrical current to the contact element 316 through the power contact. The second surface 320 is configured for electrical communication with a corresponding contact surface 322 of the electrode body 302 after initiation of the pilot arc and during transferred arc mode. In some embodiments, the first surface 318 of the contact element 316 is substantially stationary when the electrode 300 is mounted within the torch (e.g., the first surface 318 maintains physical engagement or contact with the power contact). The contact element 316 can be made from a relatively hard and electrically conductive material, for example, stainless steel, chromium copper, nickel, or beryllium copper. In some embodiments, the contact element 316 is made from a material harder than the material that forms the electrode body 302. In some embodiments, the contact element 316 is coated with a relatively hard and electrically conductive material.

As depicted, the resilient conductive element 310 circumscribes the proximal end 308 of the electrode body 302 and engages the second surface 320 of the contact element 316. Other configurations for providing a current path from the contact element 316 through the resilient conductive element 310 to the electrode body 302 are within the scope of the invention. In some embodiments, a second conductive element (not shown) provides a current path between the contact element 316 and the electrode body 302 having lower resistance and/or higher conductivity than the resilient conductive element 310. In such embodiments, the resilient conductive element 310 biases the electrode body away from the contact element 316 (e.g., performs a mechanical function) but does not carry a substantial amount of pilot current. In some embodiments, the resilient conductive element 310 is secured to the contact element 316 (e.g., by soldering or welding) or formed integrally with the contact element 316. In some embodiments, the resilient conductive element 310 can be disposed between the second surface 320 of the contact element 316 and the corresponding contact surface 322 of the electrode body. In some embodiments, the first surface 318 of the contact element 316 engages the resilient conductive element 310.

The illustrated electrode body 302 includes a receptacle 324 disposed at the proximal end 308 of the electrode body 302 and separated from the bore 306 at the distal end 304 by the electrode body 302 (e.g., neither the bore 306 nor the receptacle 324 is a through-hole). In some embodiments, the receptacle 324 is substantially aligned with the axis A and defines an inner surface 326. The contact element 316 includes a connective member 328 that extends from the second surface 320. In some embodiments, the connective member 328 slideably engages the electrode body 302. For example, the connective member 328 includes an aligning portion 330 that is substantially coaxial with the longitudinal axis A. The aligning portion 330 can slideably engage the inner surface 326 of the receptacle 324. In some embodiments, the engagement between the aligning portion 330 and the inner surface 326 restrains radial motion of the electrode body 302 or the contact element 316 within the torch.

The receptacle 324 can be configured to hinder disengagement of the contact element 316 from the electrode body 302. The electrode body 302 includes a restraint surface 332 disposed at the proximal end of the receptacle 324 for reacting against a portion of the contact element 316 to hinder disengagement. In some embodiments, the restraint surface 332 reacts against the connective member 328 or the aligning portion 330 of the contact element 316 (e.g., by a diametral interference fit). In some embodiments, the restraint surface 332 includes an annular or ring-like configuration. The restraint surface 332 can be disposed within the receptacle 324 such that the restraint surface does not interfere with or prevent the second surface 320 of the contact element 316 from physically contacting the contact surface 322 of the electrode body 302 in a substantially planar manner.

In some embodiments, the first surface 318, the second surface 320, or both can be coated with silver or a silver alloy to improve the electrical current flow between the power supply and the electrode body 302 (e.g., by reducing the electrical resistance at the surfaces 318 and 320 of the contact element 316. In some embodiments, the slideable engagement between the contact element 316 and the electrode body 302 provides a current path of lower resistance and/or higher conductivity than the resilient conductive element 310. In such embodiments, the resilient conductive element 310 biases the electrode body away from the contact element 316 (e.g., performs a mechanical function) but does not carry a substantial amount of pilot current. More specifically, the connective member 328 or the aligning portion 330 can be fabricated to relatively tight tolerances sufficient to form a low-resistance path for electrical current to pass to the electrode body 302, for example, via the receptacle 324. Relatively tight tolerances are required to prevent ionization or formation of an arc in the space between the connective member 328 or aligning portion 330 and the receptacle 324.

FIG. 3B is a more detailed illustration of the components of the electrode of FIG. 3A prior to assembly. FIG. 3B illustrates a close-up view of the proximal end 308 of the electrode body 302. In the illustrated embodiment, the electrode body 302, resilient conductive element 310, and the contact element 316 do not form an integral assembly. More particularly, the contact element 316 (e.g., the connective member 128 and aligning portion 130) can be freely disengaged from the resilient conductive element 310 and the electrode body 302 (e.g., the receptacle 324). In some embodiments, the length of the connective member 328 and the aligning portion 330 does not exceed the depth of the receptacle 324 such that the contact element does not "bottom out" against the bottom surface 334 of the receptacle 324.

The proximal end 308 of the electrode body 302 can define a lip 336 adjacent the receptacle 324 that extends axially along the longitudinal axis A. The lip 336 can be formed from the same piece of material as the electrode body 302. In some embodiments, the contact element 316 may be retained with respect to the electrode body 302 (e.g., a portion of the electrode body 302 hinders disengagement of the contact element 316 from the electrode body 302). For example, the connective member 328 and the aligning portion 330 can be positioned within the receptacle 324. The contact element 316 is pressed against the electrode body 302 such that the second surface 320 of the contact element 316 engages the lip 336 as the second surface 320 advances into physical contact with the contact surface 322 of the electrode body 302.

The engagement between the second surface 320 and the lip 336 deforms the lip 336 into the adjacent receptacle 324 to enable facing physical contact between the second surface 320 of the contact element 318 and the contact surface 322 of the electrode body 302. The deformed lip 336 can form the restraint surface 332 of FIG. 3A. In some embodiments, the contact element 316 is pressed against the electrode body 302 at the same time the emissive element is disposed within the bore 306. For example, during a process known as swaging, a force along the longitudinal axis A (e.g., toward the proximal end 308 of the electrode body 302) is applied with respect to the emissive element to secure the emissive element within the bore 306. During swaging, an oppositely-oriented force (e.g., toward the distal end 304 of the electrode body 302) is applied to press the contact element 316 against the proximal end 308 of the electrode body 302 to deform the lip 336. In some embodiments, the applied force is about 4,450 N of force (e.g., approximately 1000 lbs. of force). In some embodiments, after swaging, the restraint surface 332 can withstand about 356 N of force (e.g., about 80 lbs. of force) before failing (e.g., permitting the contact element 316 to be disengaged from the electrode body 302).

In some embodiments, the resilient conductive element 310 is disposed between the electrode body 302 (e.g., in physical contact with the flange 312) and the contact element 316 (e.g., in physical contact with the second surface 320) prior to deforming the lip 336. The resilient conductive element 310 can be "captured" between the contact element 316 and the electrode body 302. The restraint surface 332 can hinder disengagement of the slideably mounted contact element 316 from the electrode body 302. In some embodiments, the electrode 300 is assembled prior to use within a plasma arc torch and can be packaged as an integral assembly.

In some embodiments, the restraint surface 332 has an annular configuration (e.g., when the lip 336 axially extends along the longitudinal axis A about the circumference of the receptacle 324). In other embodiments, the restraint surface 332 is formed along a portion of the circumference of the receptacle 324 less than the entire circumference. The connective member 328 or the aligning portion 330 can be freely inserted into the receptacle 324 without interference with the restraint surface 336, but, e.g., rotating the contact element 316 about the longitudinal axis A hinders disengagement of the contact element 316 by establishing interference between the restraint surface 332 and the connective member or the aligning portion 330.

Figure 4A:
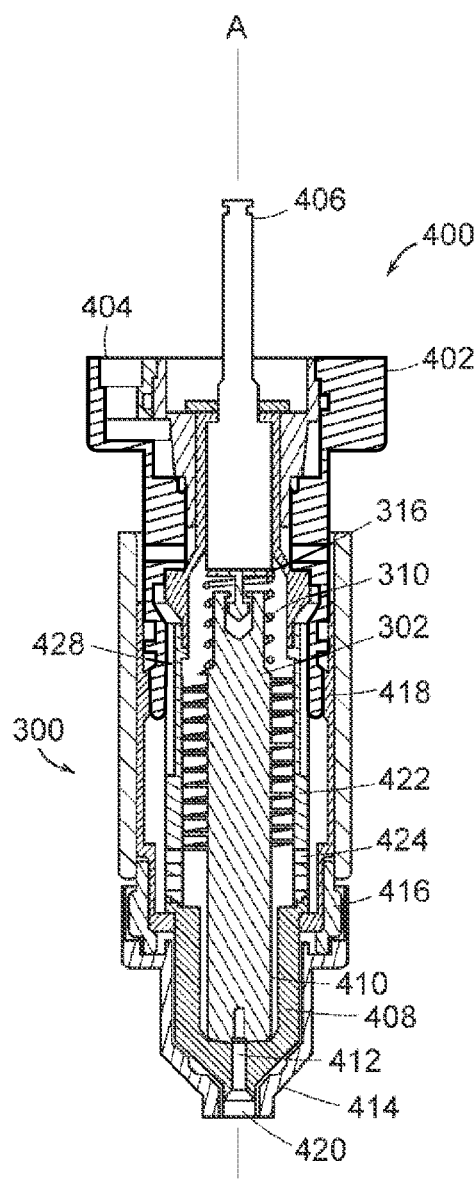
FIG. 4A depicts a cross section of an exemplary contact start plasma arc torch including illustrative components in a configuration prior to pilot arc operation.

FIG. 4A depicts a cross section of an exemplary contact start plasma arc torch. The configuration of FIG. 4A can be referred to as the "forward" configuration or the "start" configuration. The torch 400 includes a torch body 402 that defines a gas inlet 404. The torch 400 includes a power contact 406 in electrical communication with a power supply (not shown) that provides an electrical current to the power contact 406. The torch 400 includes the electrode 300 of FIG. 3A. The first surface 318 of the contact element 316 is configured for physical contact and electrical communication with the power contact 406. The resilient conductive element 310 urges the electrode body 302 away from the power contact 406 and into physical contact and electrical communication with a nozzle 408. The electrode body 302 (e.g., the distal end 304 of the electrode body 302) cooperates with the nozzle 408 to form a portion of a plasma chamber 410. The nozzle 408 includes an exit orifice 412 that permits the plasma arc or jet (not shown) to exit the plasma chamber 410 for transferring to a workpiece (not shown). A shield 414 is mounted to a retaining cap 416 that is mounted on a portion 418 of the torch body 402. The shield 414 includes an exit port 420 that is adjacent the exit orifice 412 of the nozzle 408. The exit port 420 permits the plasma jet to be transferred from the torch 400 to the workpiece. The shield 414 prevents material that is spattered during workpiece processing from accumulating on the nozzle 408 and reducing the useful life of the nozzle 408 or the electrode 300. The torch 400 also includes a swirl ring 422 that defines one or more ports 424 that permit a gas (not shown) to flow into and out of the plasma chamber 410.

Pilot arc operation begins with initiation of a pilot arc. A pilot current is passed between the power supply and the power contact 406. The power contact 406 passes the pilot current to the contact element 316 across the interface between the power contact 406 and the first surface 318 of the contact element 316. The pilot current passes between the contact element 316 (e.g., the second surface 320) and the resilient conductive element 310. The current then passes between the resilient conductive element 310 and the electrode body 302 and the nozzle 408. An exemplary current suitable for use as a pilot arc current is between about 22 and 31 amps. In some embodiments, the power contact 406 is fabricated from tellurium copper, brass, copper, or other materials suitable for passing current both during pilot arc operation and transferred arc operation.

During pilot arc operation, gas enters the torch 400 through the inlet 404 defined by the torch body 402. The gas is directed along a passageway 426 defined by the torch body 402. The swirl ring 422 defines one or more channels 428 that allow the gas to pass from the passageway 426 to a space 430 defined by the exterior of the swirl ring 422 and the portion 418. The gas flows through the ports 424 into the plasma chamber 410. Gas pressure in the plasma chamber 410 builds until the pressure is sufficient to overcome the force provided by the resilient conductive element 310 and move the electrode body 302 away from the nozzle 408 thereby creating a space or gap between the electrode body 302 and the nozzle 408. In some embodiments, gas in the plasma chamber 410 acts on the fins 314 of the electrode body 302, exerting a pressure along the longitudinal axis A toward the proximal end 310 of the electrode body 302. The electrode body 302 moves with respect to the torch 400 substantially along the longitudinal axis A. In some embodiments, the contact element 316 aligns the electrode body 302 by restraining radial motion of the electrode body 302 both during pilot arc operation and during transferred arc mode. As the electrode body 302 is moved away from the nozzle 408, a relative electric potential develops between the electrode body 302 and the nozzle 408. The potential difference causes an arc (not shown) to be generated in the now-present gap between the electrode body 302 and the nozzle 408 (e.g., by ionizing a path of least resistance between the electrode body 302 and the nozzle 408). The arc ionizes the gas in the plasma chamber 310 to form the plasma jet used in workpiece processing.

Figure 4B:
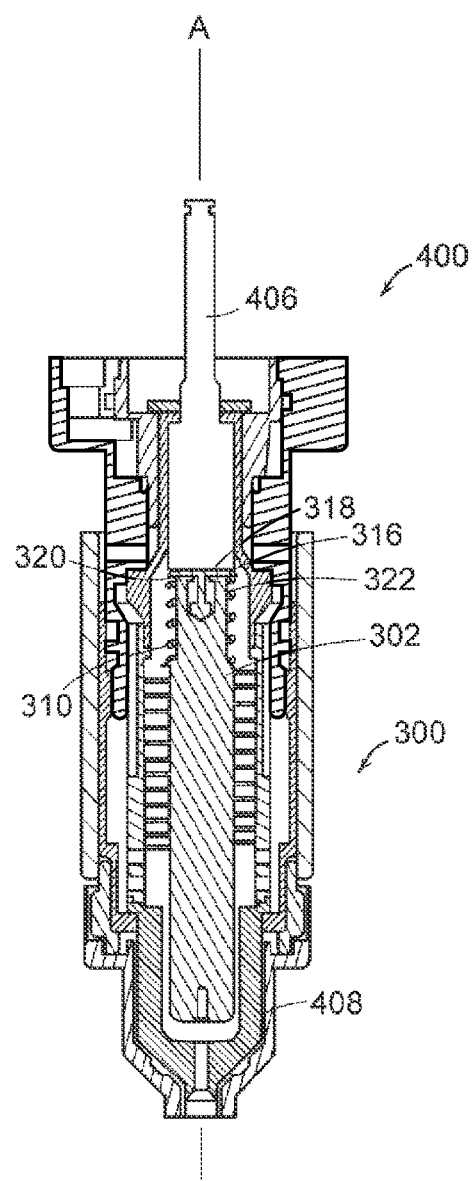
FIG. 4B illustrates a cross section the plasma arc torch of FIG. 4A including illustrative components in a configuration during transferred arc mode.

FIG. 4B illustrates a cross section the plasma arc torch of FIG. 4A including illustrative components after pilot arc initiation. The configuration of FIG. 4B can be referred to as the "blown-back" configuration because the electrode body 302 has been separated from the nozzle 408. The electrode body 302 is moved along the axis A until the contact surface 322 of the electrode body 302 contacts the second surface 320 of the contact element 316. The first surface 318 of the contact element 316 maintains physical contact and electrical communication with the power contact 406 that is relatively stationary with respect to the electrode body 302. In some embodiments, the duration of time during which the electrode body 302 moves along the axis A is less than or equal to about 0.3 seconds. In some embodiments, the resilient conductive element 310 carries electrical current in the blown-back configuration (e.g., during pilot arc operation after pilot arc initiation). In some embodiments, the resilient conductive element 310 carries electrical current only during pilot arc initiation.

In general, the arc is transferred from the nozzle 408 to the workpiece (not shown) for workpiece processing by positioning the torch 400 near the workpiece. The workpiece is maintained at a relatively lower electric potential than the nozzle 408. In some embodiments, the arc is transferred during pilot arc initiation (e.g., before the blown-back configuration of FIG. 4B). An electrical lead (not shown) in communication with the workpiece can provide a signal to the power supply (not shown) based on the transfer of the arc to the workpiece. When the electrode body 302 is in the blown-back configuration, the power supply provides an increased electrical current (e.g., a cutting current) to the torch 400. One example of a method for increasing the electrical current to the torch is known as "dual-threshold" and is described in U.S. Pat. No. 6,133,543 and assigned to Hypertherm, Inc. of Hanover, N.H., the disclosure of which is hereby incorporated herein by reference.

The cutting current can be, for example, approximately 100 to approximately 150 amps. The cutting current is associated with operation of the torch 400 in transferred arc mode. In some embodiments, the amount of cutting current that is provided is dependent on the composition of the workpiece or on physical properties of the workpiece (e.g., thickness of the workpiece or the depth of a cut). In some embodiments, transferred arc mode refers to both the arc being transferred to the workpiece and the power supply providing the cutting current. In other embodiments, transferred arc mode refers to the arc being transferred to the workpiece.

When the electrode body 302 is in the blown-back configuration, the power supply provides electrical current to the power contact 406, to the contact element 316, and to the electrode body 302. The contact element 316 remains relatively stationary with respect to the electrode body 302 and power contact 406. More particularly, the first surface 318 of the contact element 316 can be designed to remain in physical contact and electrical communication with the power contact 406 after the electrode 300 is installed in the torch 400. In some embodiments, the contact element 316 is secured relative to the power contact 406, for example by a friction fit, e.g., such that the earth's gravitational force acting on the electrode body 302 is insufficient to remove the electrode 300 from the torch 400. Most of the wear on the electrode 300 occurs at the interface between the second surface 320 of the contact element 316 and the contact surface 322 of the electrode body 302 due to the repeated contact and separation of the electrode body 302 and the contact element 316 during operation (e.g., starting and stopping) of the torch 400. The design of the electrode 300 reduces the amount of wear on the power contact 406 because the first surface 318 of the contact element 316 remains in contact with the power contact 406 to reduce the formation of an arc between the power contact 406 and the first surface 318. Formation of an arc between the power contact 406 and the first surface 318 can create surface imperfections that reduce the operational life of the power contact 406 and the electrode 300.

In some embodiments, the resilient conductive element 310 is configured to pass substantially all of an electrical current during both pilot arc operation and transferred arc operation. In a transferred arc operation, the power supply passes an electrical current to the power contact 406. The power contact 406 then passes the electrical current to the contact element 316, which passes the electrical current to the resilient conductive element 310, from which the current is passed to the electrode body 302 and the nozzle 408. Suitable mechanisms can be employed to prevent electrical current from passing directly between the electrode body 302 and the contact element 316 in the "blown-back" configuration. In some embodiments, the contact surface 322 of the electrode body 302 and/or the second surface 320 of the contact element 316 is coated with an insulating material to prevent the current from passing between the electrode body 302 and the contact element 316 as they make contact during the transferred arc mode. In some embodiments, a physical gap is maintained between the contact surface 322 of the electrode body 302 and the second surface 320 of the contact element 316 during the transferred arc mode to prevent current transfer. This can be accomplished, for example, by ensuring that the resilient conductive element 310 is sufficiently long along the longitudinal axis and/or the electrode body 302 is sufficiently short along the longitudinal axis such that the contact surface 322 of the electrode body 302 and the second surface 320 of the contact element 316 do not make physically contact in the "blown-back" configuration. In general, the resilient conductive element 310 can provide a current path of least resistance between the contact element 316 and the electrode body 302 during both the pilot arc operation and transferred arc operation. In some exemplary embodiments, the resilient conductive element 310 is capable of conducting electrical current for up to about 200 amps.

Figure 5A:
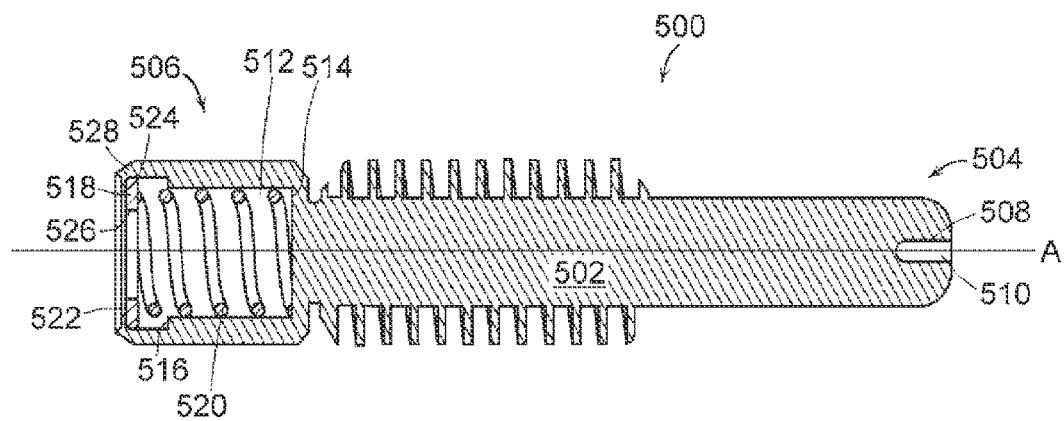
FIG. 5A depicts a cross section of an exemplary electrode including a contact element and a resilient conducting element disposed within a receptacle of the electrode body.

FIG. 5A depicts a cross section of an exemplary electrode including a contact element and a resilient conducting element disposed within a receptacle of the electrode body. The electrode 500 includes an electrode body 502 defining a distal end 504 and a proximal end 506 oppositely disposed along the longitudinal axis A. The distal end 504 defines a bore 508 for receiving an emissive element 510. The proximal end 506 of the electrode body 502 defines a receptacle 512 in a cylindrical configuration centered about the longitudinal axis A. In some embodiments, a non-cylindrical configuration for the receptacle 512 can be used. The receptacle 512 is separated from the bore 508 by the electrode body 502 (e.g., the electrode body 502 does not have a through-hole). The receptacle 512 defines a first contact surface 514 disposed at the bottom of the receptacle 512. The contact surface 514 is configured for electrical communication and/or physical contact with a power contact (depicted in FIG. 5B). The receptacle 512 also defines a second contact surface 516.

The electrode 500 includes a contact element 518 and a resilient conductive element 520 that are disposed within the receptacle 512. The contact element 518 defines a first surface 522 and a second surface 524. The second surface 524 is configured to react against the resilient conductive element 520 and against the second contact surface 516 of the receptacle 512. The resilient conductive element 520 reacts against the first contact surface 514 to urge the electrode body 502 into abutting relation with a nozzle (not shown) when installed within a plasma torch. In some embodiments, the resilient conductive element 520 can react against a third surface (not shown) within the receptacle 512.

The contact element 518 defines an annular configuration designed to surround a power contact. The annular configuration provides an aligning portion 526 to restrain radial motion of the electrode body 502 by reacting against the power contact. The contact element 518 and resilient conductive element 520 are retained with respect to the receptacle 512 by a tapered portion 528 of smaller diameter than the diameter of the contact element 518. In some embodiments, the tapered portion 528 is a restraint surface that hinders disengagement of the contact element 518 and the resilient conductive element 520 from disengaging the electrode body 502 (e.g., the receptacle 512). For example, the combination of the tapered portion 528 and the contact element 518 hinder the resilient conductive element 520 from disengaging the electrode body 502 by a diametral interference fit. In some embodiments, the tapered portion 528 defines an annular configuration. In some embodiments, the receptacle 512 does not include a tapered portion 528, and the contact element 518 and the resilient conductive element 520 are not retained with respect to the receptacle 512.

Figure 5B:
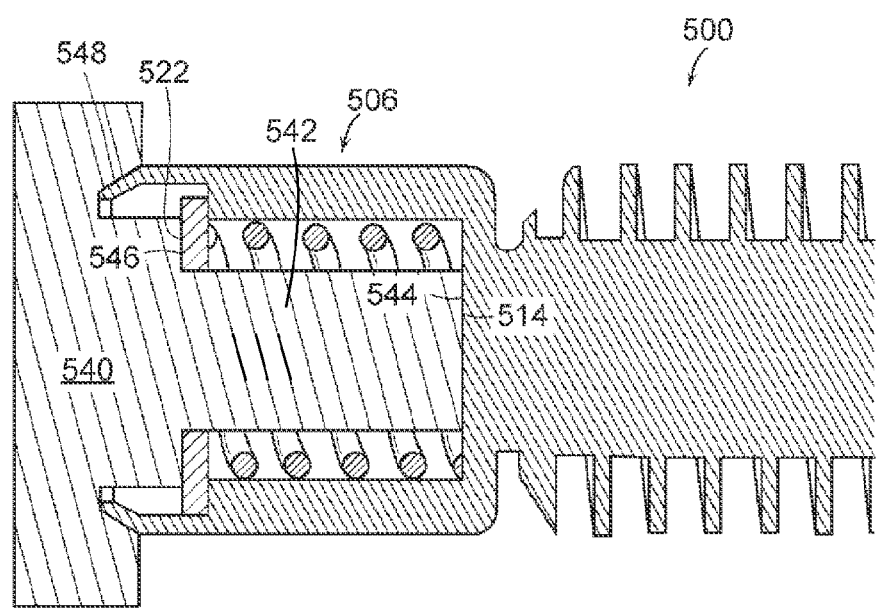
FIG. 5B depicts the electrode of FIG. 5A disposed in a transferred arc mode.

FIG. 5B depicts the electrode of FIG. 5A disposed in a transferred arc mode. FIG. 5B illustrates a close-up of a cross-section of the proximal end 506 of the electrode body 502 and a power contact 540. The power contact 540 defines an axially extending portion 542 configured to interact with the receptacle 512 and the contact element of the electrode 500. The axially extending portion 542 defines a first corresponding surface 544 and a second corresponding surface 546 for electrical communication and/or physical contact with the first contact surface 514 of the electrode body 502 (e.g., as defined by the receptacle 512) and the first surface 522 of the contact element 518, respectively. The power contact 540 also defines a seat portion 548 configured to correspond to the tapered portion 528 of the electrode body 502 to restrain radial motion of the electrode body 502.

In some embodiments, the electrode 500 is positioned within a torch such that the first surface 522 of the contact element 518 is in electrical communication and/or physical contact with the second corresponding surface 546 of the power contact 540 to form an interface that remains relatively stationary with respect to the electrode body 502 during torch operation. The second surface 524 of the contact element 518 is initially remote from the second contact surface 516 of the receptacle 512, and the first corresponding surface 544 of the power contact is remote from the contact surface 514 of the electrode body 502.

During pilot arc operation, a pilot current passes between the power supply (not shown) and the power contact 540. The pilot current passes from the power contact 540 to the contact element 518 and from the contact element 518 through the resilient conductive element 520 to the electrode body 502, such that the resilient conductive element 518 carries substantially the entire pilot arc current. As the electrode body 502 is moved away from the nozzle (not shown) to generate an arc, the second contact surface 516 moves into contact with the second surface 524 of the contact element 516, and the first contact surface 514 moves into contact with the first corresponding surface 544 of the power contact 540. Substantially all of the cutting current is passed from the power contact 540 through the contact element 516 to the electrode body 502 and directly to the electrode body. During transferred arc operation, the resilient conductive element 520 does not carry a substantial amount of current.

In some embodiments, the first corresponding surface 544 or the second corresponding surface 546 pass substantially all of the electrical current during transferred arc operation to the electrode body 502. Multiple corresponding surfaces 544, 546 can reduce physical wear on the first contact surface 514 of the electrode body 502 or the first surface 522 of the contact element 518. Such a configuration results in reduced wear by reducing the mechanical load associated with physical contact between the power contact 540 and each of the contact element 518 and the electrode body 502. Reduced wear can prolong the life of the electrode 500.

Figure 6A:
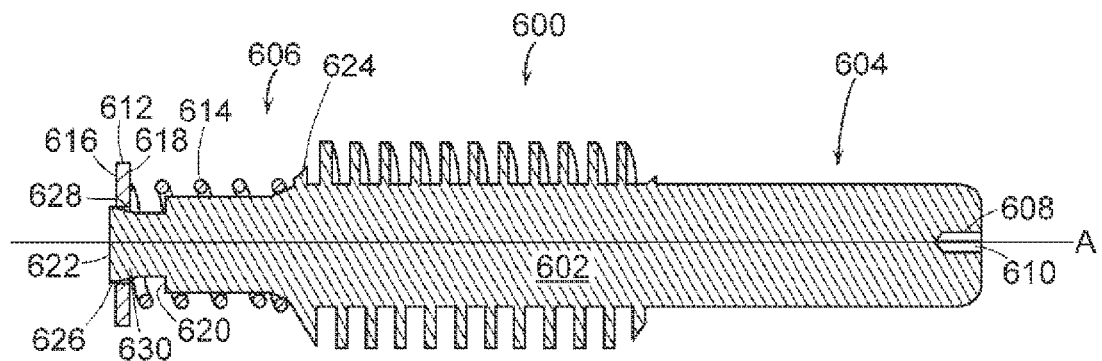
FIG. 6A depicts a cross section of an exemplary electrode including a contact element and resilient conducting element disposed at a proximal end of the electrode body.

FIG. 6A depicts a cross section of an exemplary electrode including a contact element and resilient conducting element disposed at a proximal end of the electrode body. The electrode 600 includes an electrode body 602 defining a distal end 604 and a proximal end 606 oppositely disposed along the longitudinal axis A. The distal end 604 defines a bore 608 for receiving an emissive element 610. The electrode 600 includes a contact element 612 and a resilient conductive element 614. The contact element 612 defines a first contact surface 616 configured for electrical communication and/or physical contact with a power contact (see FIG. 6B) and a second contact surface 618 for electrical communication and/or physical contact with a corresponding surface 620 of the electrode body 602. The proximal end 606 of the electrode body 602 defines a contact surface 622 for electrical communication and/or physical contact with the power contact. The electrode body 602 defines a reaction surface 624 for reacting against the resilient conductive element 614 to provide a biasing force against the reaction surface 624 and the electrode body 602. The proximal end 606 of the electrode body 602 defines a first restraint surface 626 for hindering disengagement of the contact element 612 and the resilient conductive element 614 (e.g., by a diametral interference fit). In some embodiments, the electrode body 602 does not include the restraint surface 624, and the contact element 612 and/or the resilient conductive element 614 are disengageable with respect to the electrode body 602. In some embodiments, the resilient conductive element 614 is secured to one of the electrode body 602 or the contact element 612 or both.

The contact element 614 defines an annular configuration and includes an aligning portion 628 that restrains radial motion of the electrode body 602. For example, the aligning portion 628 can interact with an axially extensible portion 630 of the proximal end 606 of the electrode body 602. The portion 630 defines a diameter slightly less than the diameter of the aligning portion 628 such that the portion 630 can slidingly engage the aligning portion 628 along the longitudinal axis A without a significant radial perturbation.

Figure 6B:
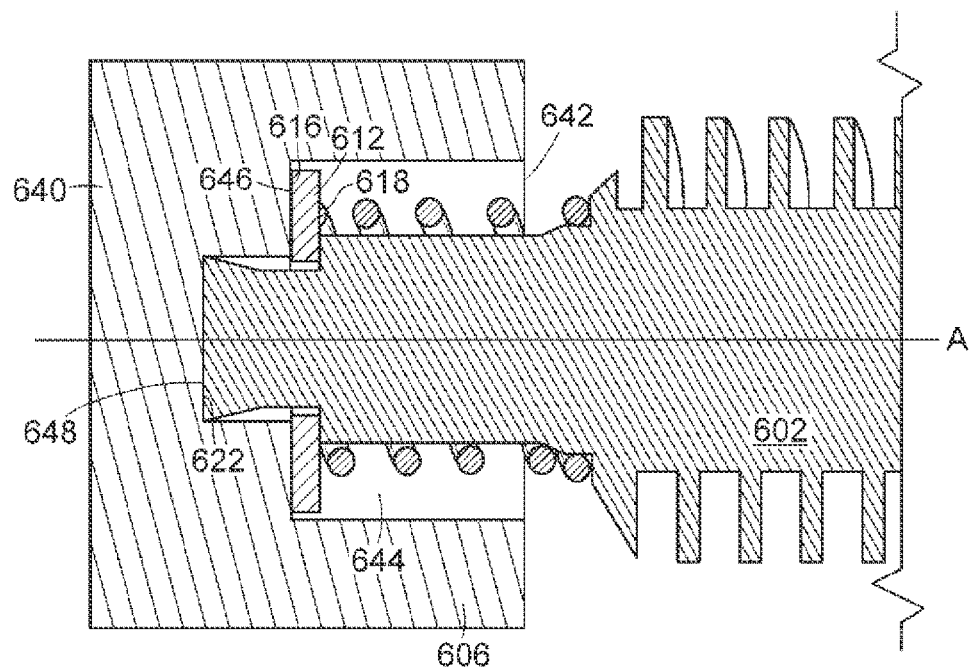
FIG. 6B depicts the electrode of FIG. 6A disposed in a transferred arc mode.

FIG. 6B depicts the electrode of FIG. 6A disposed in a transferred arc mode. The configuration of FIG. 6B includes a power contact 640 positioned relative to the proximal end 606 of the electrode body 602. The power contact 640 defines an opening 642 into which the proximal end 606 of the electrode body 602 advances as the electrode body 602 moves away from the nozzle (not shown) under gas pressure. The opening 642 is adjacent a receptacle portion 644 that is substantially centered about the longitudinal axis A. The receptacle portion 644 defines a first contact surface 646 for electrical communication and/or physical contact with the contact element 612 and a second contact surface 648 for electrical communication and/or physical contact with the contact surface 622 of the electrode body 602. The receptacle portion 644 is dimensioned to receive the contact element 612 and the resilient conductive element 614 in addition to a portion of the proximal end 606 of the electrode body 602. In some embodiments, the receptacle portion 644 is dimensioned to only receive the proximal end 606 of the electrode body 602.

During installation, the electrode 600 is positioned such that the first surface 616 is in electrical communication and/or physical contact with the first contact surface 646 of the power contact 640 to form an interface that is relatively stationary with respect to the electrode body 602 during torch operation. The second surface 618 of the contact element 612 is initially physically remote from the corresponding surface 620 of the electrode body, and the contact surface 622 of the electrode body 602 is initially physically remote from the second contact surface 648 of the power contact 640.

During pilot arc operation, a pilot current passes between the power supply (not shown) and the power contact 640. The pilot current passes from the power contact 640 to the contact element 612 and from the contact element 612 through the resilient conductive element 614 to the electrode body 602, such that the resilient conductive element 614 carries substantially the entire pilot arc current. As the electrode body 602 is moved away from the nozzle (not shown) to generate an arc, the corresponding surface 620 moves into electrical communication and/or physical contact with the second surface 618 of the contact element 612, and the contact surface 622 moves into electrical communication and/or physical contact with the second contact surface 648 of the power contact. Substantially all of the cutting current is passed from the power contact 640 through the contact element 612 to the electrode body 602 and directly to the electrode body 602. During transferred arc operation, the resilient conductive element 614 does not carry a substantial amount of the current.

In some embodiments, the first corresponding surface 646 or the second corresponding surface 648 pass substantially all of the electrical current during transferred arc operation to the electrode body 602. Multiple corresponding surfaces 646, 648 can reduce physical wear on the first contact surface 622 of the electrode body 602 or the first contact surface 616 of the contact element 612. Such a configuration results in reduced wear by reducing the mechanical load associated with physical contact between the power contact 640 and each of the contact element 612 and the electrode body 602. Reduced wear can prolong the life of the electrode 600.

FIG. 7A depicts a partially exploded view of an exemplary contact element, resilient element, and power contact that embody principles of the invention. The two-piece power connection 700 includes a power contact 702, a contact element 704, and a resilient element 706, substantially aligned along the longitudinal axis A. The power contact 702 defines an aperture 708 adjacent a cavity 710 for receiving an axially extensive portion 712 of the contact element 704. The diameter of the portion 712 is slightly smaller than the diameter of the cavity 710. A second resilient element 714 is radially dimensioned along an axial extent of the portion 712 to provide sufficient friction with respect to the cavity 710 to hinder the portion 712 and the contact element 704 from disengaging the power contact 702 (e.g., a friction fit) and to restrain radial motion of the contact element 704. In some embodiments, the second resilient element 714 is a Louvertac™ spring, for example, fabricated with beryllium copper and sold by Tyco Electronics Corp., of Harrisburg, Pa. Other copper alloys are also within the scope of the invention. In some embodiments, the second resilient element 714 is plated with a conductive metal, for example, gold, silver, nickel or tin. In some embodiments, the second resilient element 714 is electrically conductive and passes a portion of the electrical current supplied by a power supply (not shown) between the power contact 702 and the contact element 704. The resilient element 706 can pass a pilot arc current between the power supply and the electrode body during initiation of a pilot arc.

The power contact 702 defines a surface 716 adjacent the aperture 708 for passing electrical current to a first corresponding surface 718 of the contact element 704 where the first surface 718 is adjacent the extensive portion 712. The contact element 704 also includes a second surface 720 opposite the first surface 718 for reacting against the first resilient element 706. The contact element 704 includes a portion 722 axially protruding from the second surface 720 and defines a smaller diameter than an inside diameter of the resilient element 706 such that the resilient element 706 surrounds the portion 722. The portion 722 is configured for electrical communication with a proximal end of a torch electrode body (not shown). The portion 722 defines a perimeter surface 724 and an end surface 726. In some embodiments, the perimeter surface 724, the end surface 726, or both engage corresponding surfaces of the electrode body. The resilient element 706 is coupled to a component 728. The component 728 is designed for reacting against a corresponding surface (not shown) of the electrode body to provide an axial force directed toward the distal end (not shown) of the electrode body (e.g., away from the power contact 700). Gas pressure reacts against a gas reaction surface of the electrode body and overcomes the axial force to move the electrode body axially toward the proximal end until the perimeter surface 724, the end surface 726 or both react against corresponding portions of the electrode body during transferred arc operation.

In some embodiments, the component 728 is formed integrally and of the same material as the resilient element 706. In some embodiments, the component 728 is a separate component and/or formed from a different material that is secured to the resilient element 706. The component 728 is depicted as an annular washer coupled to the resilient element 706. Other configurations of the component 728 can be used, for example, a circular plate or a thimble design that circumscribes an adjacent axial outer portion of the resilient element 706 (e.g., a design similar to the contact element 904 discussed below with respect to FIG. 9). Such configurations permit the resilient element 706 to be hidden from the perspective of the electrode body, such that the electrode body and the component 728 move substantially together relative to the power contact 702. More specifically, the component 728 is stationary relative to the electrode body and movable relative to the contact element 704 and the power contact 702.

In some embodiments, a first surface (not shown) of the component 728 faces a corresponding surface of the electrode body and a second surface (not shown) of the component 728 faces the end surface 726 of the contact element 704. During transferred arc operation, the second surface of the component 728 is in physical contact with the end surface 726 of the contact element 704, and the first surface of the component 728 is in physical contact with the electrode body to provide an electrical current path from the power supply to the electrode body through the power contact 702 and the contact element 704.

In some embodiments, the resilient element 706 is not electrically conductive, and a conductive element (not shown) provides an electrical current path to the component 728 during pilot arc operation. The conductive element can be a wire or a conductive strip positioned to electrically connect the component to the contact element 704 or the power contact 702, for example, by soldering, welding or otherwise establishing electrical contact between the contact element 704 or the power contact 702 and the conductive element.

During transferred arc operation, a transferred arc current can be passed via physical contact between the contact element 704 (e.g., via the perimeter surface 724, the end surface 726, or both) and the electrode body. Such a configuration allows a conductive element with a relatively low current rating to be used to pass the pilot current to the electrode body, which allows a relatively small conductive element to be used. A small conductive element is beneficial to reduce physical interference between the conductive element and the moving parts of the torch system (e.g., the resilient element 706 and the electrode body). Substantially all of the operating current (e.g., pilot current and transferred arc current) is passed to the electrode body via the component 728.

FIG. 7B depicts the components of FIG. 7A disposed in a plasma arc torch operation. The portion 712 of the contact element 704 is advanced into the cavity 710, and the second resilient element 714 reacts against an inside surface (not shown) of the cavity 710 to hinder disengagement of the contact element 704 using friction. The first corresponding surface 718 of the contact element 704 seats against or is in physical contact with the surface 716 adjacent the cavity 710 to provide a current path from the power contact 702 to the contact element 704. In some embodiments, the contact element 704 or the resilient element 706 can be replaced without replacing the power contact 702. Because the interface between the power contact 702 and the contact element 704 (e.g., the interface between the surface 716 and the corresponding surface 718) is stationary relative to the power contact 702, the power contact 702 does not wear as quickly as in configurations in which the current path and the physical interface coincide. In some embodiments, the contact element 704, and the power contact 702 can form a unitary body (e.g,. fabricated from the same piece of material) rather than as two separate pieces. The configuration of FIGS. 7A and 7B can be employed in existing contact start plasma arc torches, for example, as shown in FIG. 1, by replacing the unitary power contact 108 with the two-piece power connection 700 and by replacing the cathode block 116 to facilitate the power connection 700. The power connection 700 can be fastened relatively stationary with respect to the electrode body, for example, by a clip or a pin as discussed above.

FIG. 8A depicts a cross section of another embodiment of an electrode body, resilient conductive element, and contact element prior to installation within a plasma arc torch. The electrode 800 includes an electrode body 802, a contact element 804 and a resilient conductive element 806 substantially aligned with respect to the longitudinal axis A. FIG. 8A illustrates a proximal end 808 of the electrode 800 that can be disposed within a plasma arc torch body (not shown). The electrode body 802 features a shoulder 810 that extends radially from the electrode body 802. The shoulder 810 defines a first surface 812 and a second surface 814. In some embodiments, the first surface 812 acts as a restraint surface configured to contact a corresponding surface 816 of the contact element 804 and prevent disengagement of the contact element 804 from the electrode body 802 in the presence of an axially directed force (e.g., provided by the resilient conductive element 806, gas pressure, or in some cases gravity). The second surface 814 of the shoulder 810 is configured to engage a surface 818 of the resilient conductive element 806 to form a reaction interface.

The contact element 804 defines a first surface 820 and a second surface 822. The first surface 820 is designed or configured to seat against or mate with a corresponding surface (not shown) of a power contact (not shown) to establish physical contact and electrical communication. The second surface 822 of the contact element 804 is designed or configured to correspond a surface 826 defined by the electrode body 802. In some embodiments, the resilient conductive element 806 engages the second surface 822 of the contact element 804 to provide axially directed forces. The contact element 804 defines a receptacle 828. The receptacle 828 is sized to allow the resilient conductive element 806 to be disposed about a portion 830 of the electrode body 802 and disposed within the receptacle 828 of the contact element.

In some embodiments, during pilot arc operation, the first surface 820 of the contact element 804 is in electrical communication (and/or physical contact) with the power contact. The power contact provides an electrical current to the first surface 820 that is transferred across the contact element 804 to the second surface 822. Current can pass between the contact element 804 and the resilient conductive element 806 via the interface between the resilient conductive element 806 and the second surface 822. The resilient conductive element 806 provides a current path for passing current between the power contact and the electrode body 802. For example, current passes between the electrode body 802 and the resilient conductive element 806 at the interface between the surface 818 and the corresponding second surface 814 of the shoulder 810. In general, the receptacle 828, the resilient conductive element 806 and/or the surface 812 cooperate to restrain radial motion of the electrode body 802 when the electrode 800 is mounted with the plasma arc torch.

FIG. 8B illustrates the configuration of the components of FIG. 8A during transferred arc mode. During pilot arc mode, gas pressure reacts against the electrode body 802 to overcome the urging of the resilient conductive element 806 in a direction axially away from the proximal end 808 to move the electrode body 802, specifically the surface 826 into contact with the corresponding second surface 822 of the contact element 804. In this configuration, electrical communication can be established directly between the contact element 804 and the electrode body 802, and the electrical current can be increased for transferred arc operation. In some embodiments, the contact element 804 defines an end surface 840 that is remote from a surface 842 of the electrode body 802. In some embodiments, the end surface 840 contacts or "bottoms out" by reacting against the surface 842 to provide a second current path between the contact element 804 and the electrode body 802.

FIG. 9 depicts a cross section of another embodiment of an electrode that embodies the invention. The electrode 900 includes an electrode body 902, a contact element 904 and a resilient conductive element 906 substantially aligned along the longitudinal axis A. The electrode body 902 defines a radially extending surface 908 that can react against a surface 910 of the resilient conductive element 906 to hinder disengagement (e.g., capture) of the resilient conductive element 906 from the electrode body 902. The resilient conductive element 906 or the surface 910 can be advanced axially along the longitudinal axis A and forced or pressed over the surface 908 to form a diametral interference fit. Other types of fits may be used to hinder disengagement of the resilient conductive element 906 from the electrode body 902.

The contact element 904 defines a receptacle 912, a first surface 914 for electrical communication and/or physical contact with a corresponding surface of a power contact of a plasma arc torch (not shown), and a second surface 916 for electrical communication and/or physical contact with a corresponding surface 918 of the electrode body 902. The receptacle 912 can be dimensioned such that an inside diameter of the receptacle is slightly less than an outside diameter of the resilient conductive element 906. The contact element 904 and the receptacle 912 can be pressed or forced over the resilient conductive element 906 to establish a friction or other type of fit between a portion of the resilient conductive element 906 and the receptacle 912. In some embodiments, alternative or additional joints or fits can be used to secure the contact element 904 to the resilient conductive element 906 and the electrode 900. In general, the receptacle 912 cooperates with the resilient conductive element 906 to radially restrain the electrode body 902 when the electrode 900 is mounted within the plasma arc torch.

FIG. 10A is a perspective view of an exemplary contact element and resilient conductive element that embody principles of the invention. The system 1000 includes a contact element 1002 and a resilient conductive element 1004 disposed within a receptacle 1006 of the contact element 1002. The contact element 1002 includes a flange 1008 that defines one or more through-holes 1010 to facilitate gas passage about the system 1000. In some embodiments, the through-holes 1010 impart a swirling motion to gas as the gas moves about an electrode body, for example, to cool the electrode body or a plasma arc torch. In some embodiments, the resilient conductive element 1004 is secured or fastened (e.g., by bonding) to the contact element 1002. In some embodiments, the resilient conductive element 1004 is formed integrally with the contact element 1002.

FIG. 10B is a cross-sectional view of a portion of a plasma arc torch employing the components of FIG. 10A during pilot arc operation. The torch 1020 includes the contact element 1002, the resilient conductive element 1004, an electrode body 1022, and a power contact 1024 substantially aligned along the longitudinal axis A. In some embodiments, the power contact 1024 is in electrical communication with a power supply (not shown). The power contact 1024 is surrounded by a torch component 1026 that cooperates with an exterior surface 1028 of the contact element 1004 to define a gas passageway 1030. Gas can be supplied for generating the plasma arc and for workpiece processing as discussed above with respect to FIG. 2A. Gas pressure within the torch 1020 is relieved by flowing around the electrode body 1022 (e.g., by swirling around the electrode body 1022 guided by the fins 1032) towards the power contact 1024. Gas can flow through the holes 1010 in the contact element 1004 and along the gas passageway 1030 away from the electrode body 1022.

In the illustrated embodiment, the flange 1008 is disposed between a surface 1034 of the torch component 1026 and a surface 1036 of the swirl ring 1038. In some embodiments, the system 1000 of FIG. 10A is a consumable component and is installed within the torch 1020, and the electrode body 1022 is replaced more frequently than the system 1000. This allows, for example, the electrode body 1022 to be consumed and changed easily and without disassembling the torch 1020. In some embodiments, the system 1000 is secured with respect to the power contact 1024 by an interference fit. For example, the system 1000 is located within the torch 1020, and the swirl ring 1038 is secured (e.g., by threading) relative to an outside surface 1040 of the torch component 1026 to axially and/or radially secure the flange 1008 with respect to the torch component 1026, power contact 1024 and/or the torch 1020. In some embodiments, the flange reacts with or seats against other components of the torch 1020.

One or more components of the system 1000 can be integrated with the swirl ring 1038. For example, the flange 1008 can be bonded or otherwise secured to the swirl ring 1038 to form a unitary component. In some embodiments, the contact element 1002 is formed of the same material as the swirl ring 1038 during the machining or manufacturing process. The resilient element 1004 can be secured to the contact element 1002-swirl ring 1038 combination, for example by a diametral interference fit or other securing methods. In some embodiments, the resilient element 1004 is not secured to either the contact element 1002 or the swirl ring 1038.

The electrode body 1022 can be moved (e.g., by gas pressure) towards the power contact 1024 such that a surface 1042 of the electrode body 1022 engages a corresponding surface 1044 of the contact element 1002 to establish electrical communication and physical contact. Electrical current associated with transferred arc operation of the torch 1020 passes between the electrode body 1022 and the contact element 1002.

FIG. 11A depicts an exemplary contact element for use in a contact start plasma arc torch. The contact element 1100 includes a first surface 1102, a second surface 1104, an extensive portion 1106 and a restraining portion 1108. The first surface 1102 is configured for electrical communication with a power contact of a plasma arc torch (not shown). For example, electrical communication can be established by physical contact with a corresponding surface (not shown) of the power contact. The second surface 1104 is configured for electrical communication with an electrode body (not shown), a resilient conductive element, or both. For example, electrical communication can be established with the electrode body by physical contact between the second surface 1104 and a corresponding surface of the electrode body. In some embodiments, physical contact between the power contact and the first surface 1102 and physical contact between the electrode body and the second surface establishes a path for current to flow between the power contact (e.g., the power supply) and the electrode body.

The extensive portion 1106 of the contact element is adjacent the restraining portion 1108. In some embodiments, the extensive portion and the restraining portion are formed integrally (e.g., from the same material). The extensive portion 1106 protrudes orthogonally from the second surface 1104. As depicted, the extensive portion 1106 defines a circular cross-section having a diameter, but other geometries are possible. The width w of the restraining portion 1108 exceeds the diameter of the extensive portion 1106, and the thickness t of the restraining portion 1108 is less than the diameter.

FIG. 11B depicts the contact element of FIG. 11A rotated 90° about a vertical axis. In some embodiments, the restraining portion 1108 and the extensive portion 1106 are advanced into a receptacle of an electrode body (not shown) in a first orientation such as that of FIG. 11B. An opening adjacent the receptacle is dimensioned to permit the restraining portion 1108 and the extensive portion 1106 to enter the receptacle. However, rotating the contact element 1100 about a vertical axis (e.g., as depicted in FIG. 1A), positions the contact element 1100 such that the restraining portion 1108 reacts against a portion of the receptacle to hinder disengagement of the contact element from the electrode body. The contact element 1100 can be secured to an electrode body in other ways, for example, by threading or by an interference fit.

Figure 12:
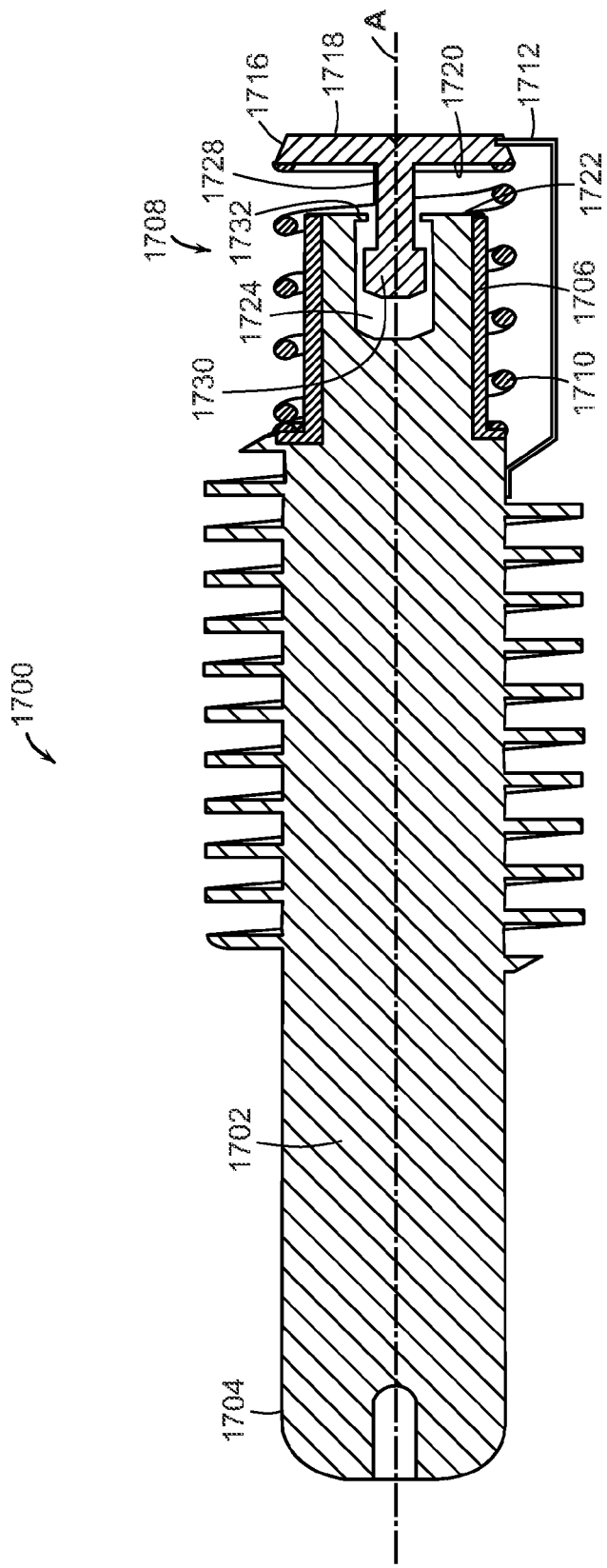
FIG. 12 shows an embodiment of an electrode for use in a contact start plasma arc torch.

In some embodiments of the present invention, the resilient element has minimal or no electrical current conduction between the contact element and the electrode body. The resilient element provides mainly a mechanical function for biasing the electrode body toward the nozzle. For example, FIG. 12 shows a cross section of an embodiment of an electrode including such a resilient element. The electrode 1700 includes an electrode body 1702 defining a distal end 1704 and a proximal end 1708 oppositely disposed along the longitudinal axis A. The proximal end 1708 of the electrode body 1702 defines a receptacle 1724 centered about the longitudinal axis A.

The electrode 1700 includes a contact element 1716 having a first surface 1718 in electrical communication with a power supply (not shown), a second surface 1720 adapted to contact a contact surface 1722 of the electrode body 1724, and a connective member 1728 extending from the second surface 1720 into the receptacle 1724. The connective member 1728 is configured to slideably engage the electrode body 1702. For example, the connective member 1728 includes an aligning portion 1730 that is substantially coaxial with the longitudinal axis A. In some embodiments, the electrode body 1702 includes a restraint 1732 disposed at the proximal end of the receptacle 1724 for reacting against the connective member 1728 or the aligning portion 1730 of the contact element 1716 to hinder disengagement of the contact element 1716.

The electrode 1700 includes a resilient element 1710 and a conductive element 1712, such as a wire or a conductive strip, electrically connecting the electrode body 1702 to the contact element 1716 or the power supply (not shown). The resilient element 1710 serves a substantially similar separation function as the conductive resilient element 312 described above with reference to FIGS. 3A and 3B. However, the resilient element 1710 is designed to pass minimal or no electrical current between the contact element 1716 and the electrode body 1702.

However, in some embodiments, the resilient element 1710 is constructed from a conductive material, such as tellurium copper, silver, silver copper alloys, or other alloys. In such cases, an insulating material 1706 can be disposed between the resilient element 1710 and a surface of the electrode body 1702 where the resilient element 1710 contacts the electrode body 1702. This insulating material is adapted to substantially prevent electrical current from being passed between the resilient element 1710 and the electrode body 1702. In some embodiments, an insulating material (not shown) can be inserted between the resilient element 1710 and a surface of the contact element 1716 where the resilient element 1710 contacts the contact element 1716. The insulating material is adapted to substantially prevent electrical current from being passed between the contact element 1716 and the resilient element 1710. In some embodiments, the resilient element 1710 is constructed from a material with no or low conductivity, such as a dielectric material.

The conductive element 1712 can be designed to pass substantially all of a pilot arc current during a pilot arc operation or substantially all of an electrical current during a transferred arc operation, or a combination thereof. In some embodiments, the conductive element 1712 passes substantially all of a pilot arc current. More specifically, during a pilot arc operation, a pilot current passes between the power supply and the contact element 1716 through the conductive element 1712 to the electrode body 1702, such that the conductive element 1712 carries substantially the entire pilot arc current.

In some embodiments, the conductive element 1712 passes substantially all of a cutting current between the power supply and the electrode body 1702 during a transferred arc mode, e.g., as high as 20, 50 or 100 amps, depending upon the setting of the torch system. In these cases, mechanisms can be employed to prevent electrical current from being passed directly between the second surface 1720 of the contact element 1716 and the contact surface 1712 of the electrode body 1702 as the electrode body 1702 moves away from the nozzle (not shown) to generate an arc. For example, an insulating material (not shown) can be inserted between the second surface 1720 of the contact element 1716 and the contact surface 1722 of the electrode body to substantially prevent current transfer. The conductive element 1712 thus provides a path of least resistance and/or highest conductance between the contact element 1716 and the electrode body 1702 in a transferred arc operation.

In other embodiments, during a transferred arc operation, the conductive element 1712 passes no or minimal electrical current. Instead, as the contact surface 1722 of the electrode body 1702 moves into physical contact with the second surface 1720 of the contact element 1716, the resulting interface provides a direct electrical path from the power supply to the electrode body 1702 that passes substantially all of the electrical current during the transferred arc mode. Specifically, the interface provides a path of least resistance and/or highest conductance between the contact element 1716 and the electrode body 1702.

In some embodiments, during a transferred arc operation, electrical current is passed between the contact element 1716 and the electrode body 1702 via both the conductive element 1712 and the physical interface created when the second surface 1720 of the contact element 1716 meets the contact surface 1722 of the electrode body 1702. Multiple electrical paths can reduce physical wear on the electrode body 1702 and the contact element 1716 by reducing the mechanical load associated with physical contact, which prolongs the life of the electrode 1700.

Figure 13:
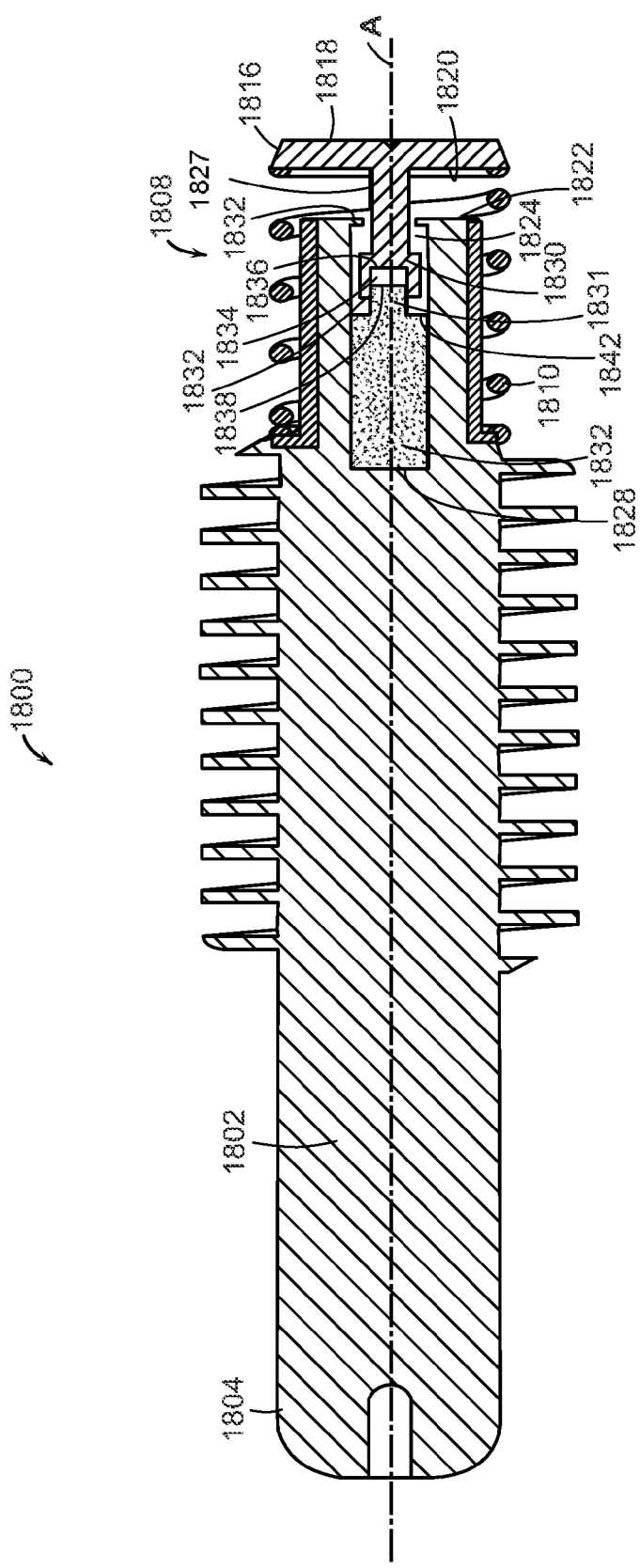
FIG. 13 shows another embodiment of an electrode for use in a contact start plasma arc torch.

FIG. 13 illustrates another embodiment of an electrode 1800 that includes a resilient element 1810 configured to pass minimal or no electrical current to the electrode body 1802. The resilient element 1810 serves a substantially similar biasing function as the conductive resilient element 312 described above with reference to FIGS. 3A and 3B. Various mechanisms for preventing the resilient element 1810 from conducting electrical current are described above with reference to FIG. 12.

The electrode 1800 includes an electrode body 1802 defining a distal end 1804 and a proximal end 1808 oppositely disposed along the longitudinal axis A. The proximal end 1808 of the electrode body 1802 defines a receptacle 1824 centered about the longitudinal axis A. The electrode 1800 also includes a contact element 1816 having a first surface 1818 configured for electrical communication with a power supply (not shown), a second surface 1820 configured for physical contact with a contact surface 1822 of the electrode body 1802 and a connective member 1827 extending from the second surface 1820 into the receptacle 1824. The connective member 1827 is configured to slideably engage the electrode body 1802. For example, the connective member 1827 includes an aligning portion 1830 that is substantially coaxial with the longitudinal axis A. In some embodiments, the electrode body 1802 includes a restraint 1832 disposed at the proximal end of the receptacle 1824 for reacting against the connective member 1827 or the aligning portion 1830 of the contact element 1816 to hinder disengagement. In some embodiments, the aligning portion 1830 defines an opening 1834 configured to receive a first portion 1831 of a probe 1828 partially embedded in the electrode body 1802. As shown, the opening 1834 is substantially centered about the longitudinal axis A.

The probe 1828 includes a first portion 1831 extending into the receptacle 1824 and a second portion 1832 embedded in the electrode body 1802. The first portion can be fabricated to relatively tight tolerance within the opening 1834 and remains in constant contact with at least a portion of an inner surface of the opening 1834. During a transferred arc operation, the first portion 1831 of the probe 1828 further advances into the opening 1834 as the electrode body 1802 moves away from the nozzle under gas pressure until a surface 1838 of the first portion 1831 contacts a first surface 1836 of the opening 1834 and/or a surface 1842 of the second portion 1832 contacts a second surface 1840 of the opening 1834.

The probe 1828 can be an electrically conductive probe fabricated from copper alloys and/or plated with a conductive metal, for example, gold, silver, nickel or tin. In some embodiments, the probe 1828 is configured to pass substantially all of a pilot arc current. For example, during a pilot arc operation, a pilot arc current passes from the power supply (not shown) to the contact element 1816 and from the contact element 1816 to the first portion 1831 of the conductive probe 1828, which constitutes a low resistance path for the pilot arc current to pass therethrough. The probe 1828 then passes the pilot arc current to the electrode body 1802.

In some embodiments, the probe 1828 passes substantially all of a cutting current between the power supply and the electrode body 1802 during the transferred arc mode. More specifically, the contact between the surface 1838 of the first portion 1831 and the first surface 1836 of the opening 1834 and/or between the surface 1842 of the second portion 1832 and the second surface 1840 of the opening 1834 provides a path of least resistance between the contact element 1816 and the electrode body 1802 during the transferred arc mode. In some embodiments, mechanisms similar to the designs described above with reference to FIG. 12 are employed to prevent electrical current from being directly passed between the second surface 1820 of the contact element 1816 and the contact surface 1812 of the electrode body 1802 as the electrode body 1802 moves away from the nozzle during a transferred arc operation.

In some embodiments, during a transferred arc operation, electrical current is passed between the contact element 1816 and the electrode body 1802 via both the probe 1828 and the current path created when the second surface 1820 of the contact element 1816 meets the contact surface 1822 of the electrode body 1802. Multiple electrical paths can reduce physical wear on the electrode body 1802 and the contact element 1816 by reducing the mechanical load associated with physical contact, which prolongs the life of the electrode 1800.

Figure 14:
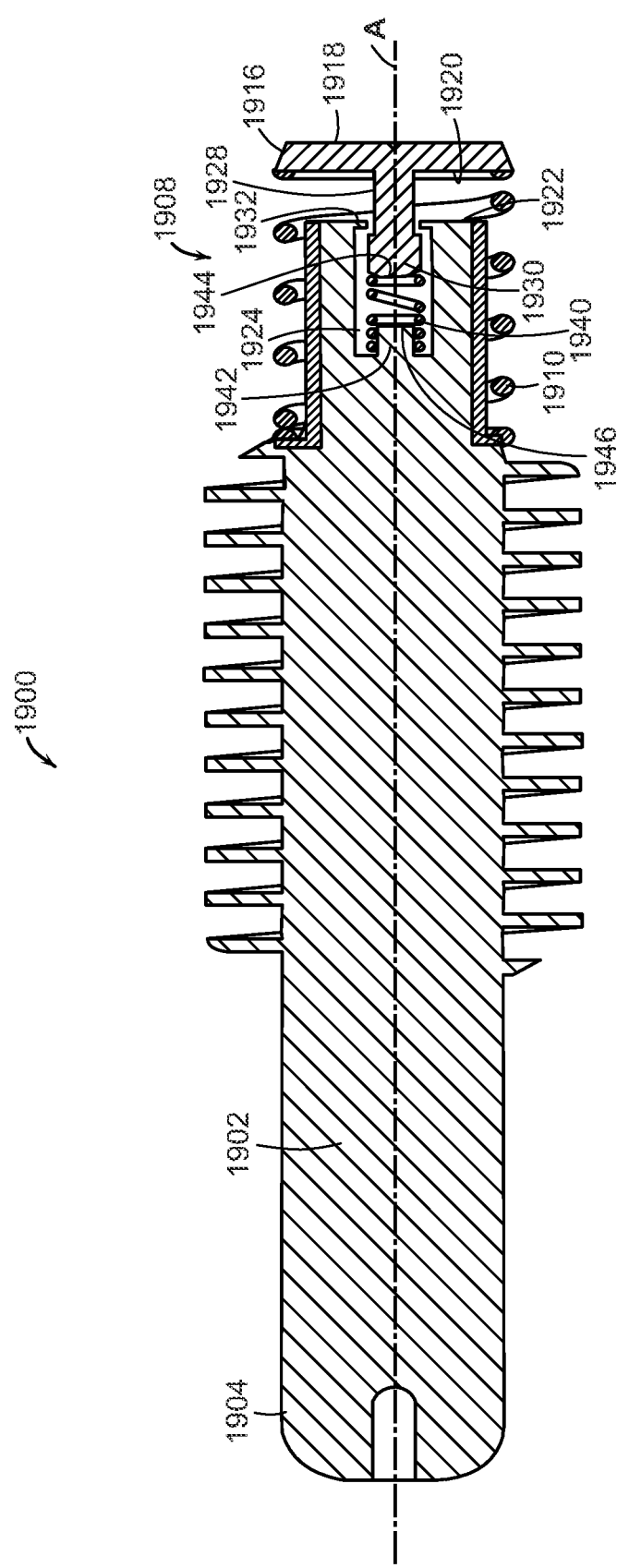
FIG. 14 shows another embodiment of an electrode for use in a contact start plasma arc torch.

FIG. 14 shows yet another embodiment of an electrode 1900 including a resilient element 1910 configured to pass minimal or no electrical current to the electrode body 1902. The resilient element 1910 serves a substantially similar biasing function as the conductive resilient element 312 described above with reference to FIGS. 3A and 3B. Various mechanisms for preventing the resilient element 1910 from conducting electrical current are described above with reference to FIG. 12.

The electrode 1900 includes an electrode body 1902 defining a distal end 1904 and a proximal end 1908 oppositely disposed along the longitudinal axis A. The proximal end 1908 of the electrode body 1902 defines a receptacle 1924 centered about the longitudinal axis A. The electrode 1900 also includes a contact element 1916 having a first surface 1918 configured for electrical communication with a power supply (not shown), a second surface 1920 configured for physical contact with a contact surface 1922 of the electrode body and a connective member 1928 extending from the second surface 1920 into the receptacle 1924. The connective member 1928 is configured to slideably engage the electrode body 1902. For example, the connective member 1928 includes an aligning portion 1930 that is substantially coaxial with the longitudinal axis A. In some embodiments, the electrode body 1902 includes a restraint 1932 disposed at the proximal end of the receptacle 1924 for reacting against the connective member 1928 or the aligning portion 1930 of the contact element 1916 to hinder disengagement.

The electrode body 1902 includes a portion 1942 axially extending into the receptacle 1924 and defining a smaller diameter than an inside diameter of a second resilient element 1940 such that the second resilient element 1940 surrounds the portion 1942. The second resilient element 1940 is configured to react against a surface 1944 of the aligning portion 1930 of the contact element 1916 to provide a separation force. During a transferred arc operation, gas pressure pushes the electrode body 1902 away from the nozzle (not shown) and overcomes the separation force of the resilient element 1910 and the second resilient element 1940 to move the electrode body 1902 axially toward the proximal end 1908 until the surface 1944 of the aligning portion 1930 physically contacts the corresponding surface 1946 of the portion 1942.

The second resilient element 1940 can be an electrically conductive element fabricated with beryllium copper, for example. Other conductive metal are also within the scope of the invention. In some embodiments, the second resilient element 1940 is configured to pass substantially all of a pilot arc current between the contact element 1916 and the electrode body 1902 during initiation of a pilot arc. In some embodiments, during a transferred arc operation, electrical current is passed between the contact element 1916 and the electrode body 1902 through the second resilient element 1940 and the current path created when the surface 1944 of the aligning portion 1930 contacts the corresponding surface 1946 of the portion 1942. In addition, mechanisms similar to the designs described above with reference to FIG. 12 can be employed to prevent electrical current from being directly passed between the second surface 1920 of the contact element 1916 and the contact surface 1922 of the electrode body 1902 as the electrode body 1902 moves away from the nozzle (not shown) to generate an arc.

As shown in FIGS. 12-14, the resilient element can be non-conductive and can be configured to mainly facilitate movement of the electrode body for contact starting a plasma arc torch. Instead, one or more conductive elements can be used to pass a pilot arc current from the power supply to the electrode body during a pilot arc operation or a cutting current from the power supply to the electrode body during a transferred arc operation, or a combination thereof. For example, the conductive element 1712 of FIG. 12, the probe 1828 of FIG. 13 or the second resilient element 1940 of FIG. 14 can be appropriately sized and designed to conduct one or both types of current for a contact start plasma arc torch. These designs can be used in various combinations that would be known and apparent to a person of ordinary skill in the part after reading the present disclosure.

Figure 15A:
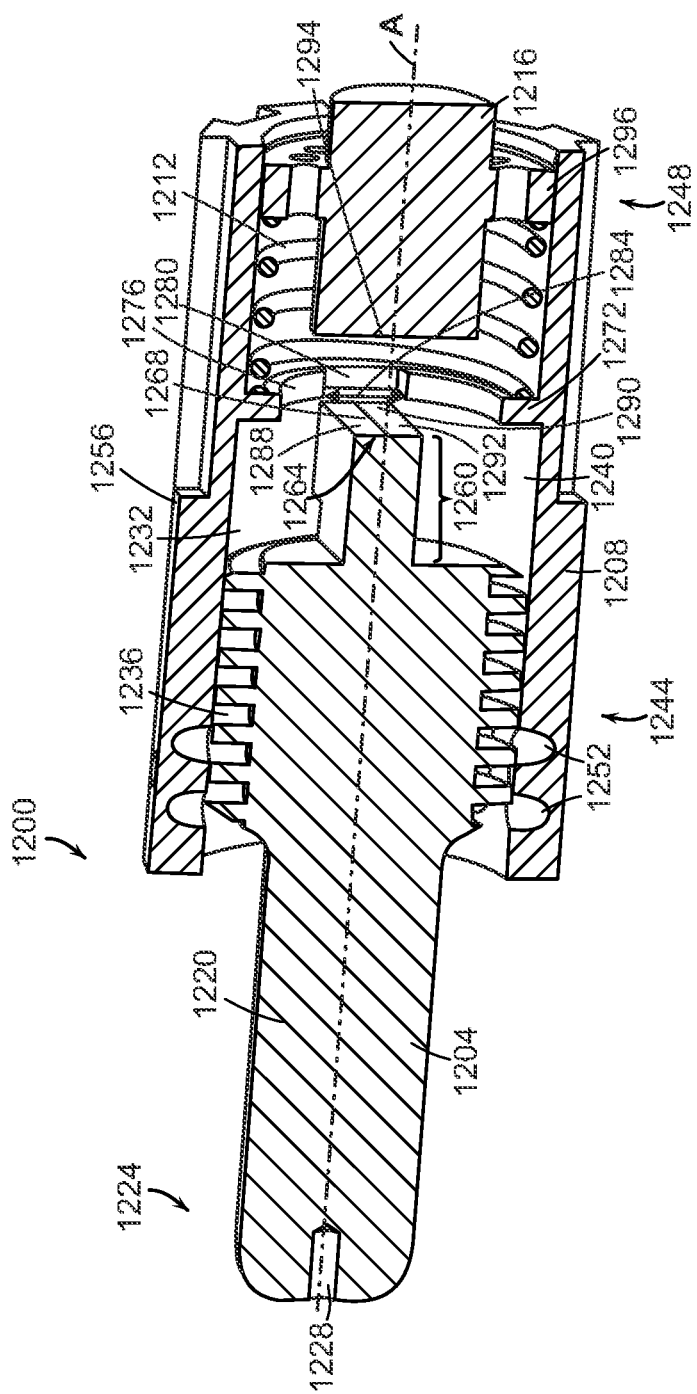
FIG. 15A is a cross-sectional partial perspective view of an assembly for a contact start plasma arc torch.

FIG. 15A is a cross-sectional partial perspective view of an assembly 1200 for a contact start plasma arc torch. The assembly 1200 includes an electrode 1204, a hollow body 1208, a resilient element 1212, and a power contact 1216. The electrode 1204 includes an electrode body 1220 including a distal end 1224 for housing an emissive element 1228. The electrode 1204 also includes an end 1232 positioned remotely from the distal end 1224. The end 1232 is positioned relative to the distal end 1224 (e.g., adjacent the electrode body 1220). The electrode body 1220 includes a set of spiral-shaped grooves 1236 for directing gas flow or facilitating cooling of the assembly 1200. The electrode 1204 can move along axis A when the assembly 1200 is installed within a torch (not shown), for example, to slideably engage an interior surface 1240 of the hollow body 1208. The hollow body 1208 includes a front portion 1244 and a rear portion 1248. In one embodiment, the front portion 1244 includes one or more holes 1252 from an exterior surface 1256 to the interior surface 1240. The holes 1252 can impart a swirling motion relative to the axis A to a gas flowing through the assembly 1200. A hollow body 1208 having such holes 1252 for generating a swirl gas flow is commonly referred to as a swirl ring. It should be recognized that a swirl ring is simply a variation of a hollow body 1208 and the system disclosed herein is capable of function in the hollow body 1208 or swirl ring configuration.

It should also be recognized that the hollow body may be an integrally formed portion of a torch.

The end 1232 of the electrode 1204 includes a portion 1260 that extends axially along axis A. The portion 1260 includes a first length 1264 (or distance) along a first direction (e.g., radially away from the axis A) and a second length 1268 (or distance) along a second direction (e.g., radially away from the axis A and perpendicular to the first direction). The hollow body 1208 includes a shoulder 1272 disposed relative to the interior surface 1240 (e.g., defined on the interior surface 1240). The shoulder 1272 can also be referred to as a contour, step, or flange and can have various geometries relative to the interior surface 1240 (e.g., semi-circular, triangular, rectangular, or non-regular polygonal geometries). The shoulder 1272 defines a first portion 1276 and a second portion 1280. The first portion 1276 and the second portion 1280 cooperate to form a contoured opening through which the portion 1260 of the electrode 1240 can move. More specifically, the second portion 1280 is located at a distance from the axis A sufficient to facilitate slideable passage of the second length 1268 therethrough. The first portion 1276 cooperates with the second portion 1280 to define an opening having a slot 1284 of sufficiently greater size than the first length 1264 to facilitate slideable passage of the first length 1264 therethrough. The electrode 1204 is installed within the torch in the hollow body 1208 such that the portion 1260 can move axially along axis A and reciprocatingly through the opening defined by the first portion 1276 and the second portion 1280.

The portion 1260 also includes a surface 1288 that includes a first region 1290 for electrical communication with the resilient element 1212 and a second region 1292 for electrical communication with the power contact 1216, e.g., via physical contact with a corresponding surface 1294 of the power contact 1216. The resilient element 1212 resiliently urges the electrode 1204 toward the distal end 1224. The electrode 1204 is hindered from being ejected from the torch by a nozzle (not shown) that is in physical contact with the distal end 1224 when the nozzle is installed. The nozzle is secured to the torch so that the portion 1260 (e.g., via the first region 1290) is in physical contact with the resilient element 1212. For example, installing the nozzle urges the portion 1260 through the slot 1284 and positions the first region 1290 in physical contact with the resilient element 1212. When the nozzle is installed, the resilient element is compressed.

The resilient element 1212 is positioned between the shoulder 1272 and a flange 1296 of the power contact 1216. The resilient element 1212 is retained or captured between the hollow body 1208 (e.g., via the shoulder 1272) and the power contact 1216 (e.g., via the flange 1296). The shoulder 1272 thus retains the resilient element 1212 and facilitates access by the electrode 1204 to the resilient element 1212 and the power contact 1216.

The power contact 1216 is in electrical communication with a power supply (not shown). During pilot arc initiation, the power supply provides a pilot arc current to the power contact 1216, and the current flows from the flange 1296 through the resilient element 1212 to the first region 1290 of the electrode 1204. A plasma gas (not shown) flows about the electrode during pilot arc initiation, and the plasma gas increases fluid pressure on the electrode 1204. The pressure moves the electrode 1204 axially toward the power contact 1216 and into physical contact. Physical separation of the electrode 1204 and the nozzle generates a pilot arc in a plasma chamber (not shown) formed between the nozzle and the electrode 1204. Pressure moves the electrode 1204 into physical contact and electrical communication with the power contact 1216 for transferred arc operation. When the electrode 1204 is in contact with the power contact, the portion 1260 is disposed within the slot 1284.

During transferred arc operation, transferred arc current flows from the power supply through the power contact 1216 to the electrode 1204 via the physical contact between the second region 1292 of the surface 1288 of the portion 1260 and the corresponding surface 1294 of the power contact 1216. Gas pressure is increased during transferred arc operation to form a plasma jet for processing a workpiece (not shown).

Although the assembly 1200 is illustrated for the first region 1290 to physically contact the resilient element 1212 directly, other configurations are possible. For example, the resilient element 1212 can include a separate contact surface (not shown), such as an annular, washer-like plate, secured to the resilient element 1212 for physical contact and electrical communication with the electrode 1204. Similarly, the corresponding surface 1294 of the power contact 1216 can be plated or coated with a material such that the electrode 1204 is in contact with the plate or coating rather than the power contact 1216 itself. Such configurations are within the scope of the invention.

In some embodiments, the front portion 1244 and the rear portion 1248 of the hollow body 1208 are integrally formed (e.g., manufactured from the same piece of material). In some embodiments, the front portion 1244 and the rear portion 1248 are formed of different materials, for example, the front portion 1244 can be made from an insulative material, and the rear portion 1248 can be made from a conductive material.

In some embodiments, the slot 1284 has a dimension or size that is substantially greater than the first length 1264 to facilitate some angular displacement of the electrode 1204 about the axis A within the hollow body 1208 (e.g., while the portion 1260 is disposed within the slot 1284). The slot 1284 can also resist angular displacement of the electrode 1204 about the axis A, for example, by reacting against the portion 1260 to hinder angular displacement. In some embodiments, the first region 1290 and the second region 1292 of the surface 1288 are not co-planar or do not form regions of the same surface. For example, the first region 1290 can be positioned axially remote from the second region 1292, such that the portion 1260 of the electrode 1204 includes an axial step, flange, or shoulder (not shown).

Figure 15B:
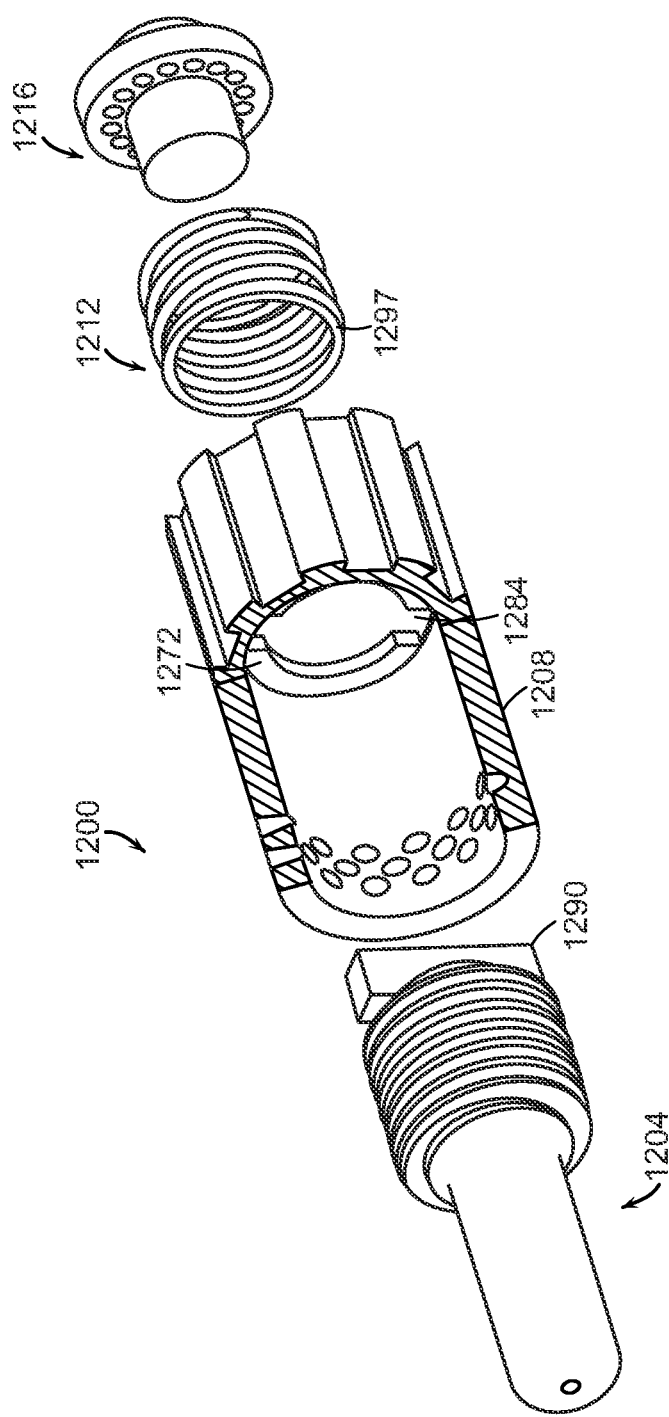
FIG. 15B is an exploded perspective view of the assembly of FIG. 15A.
Figure 18A:
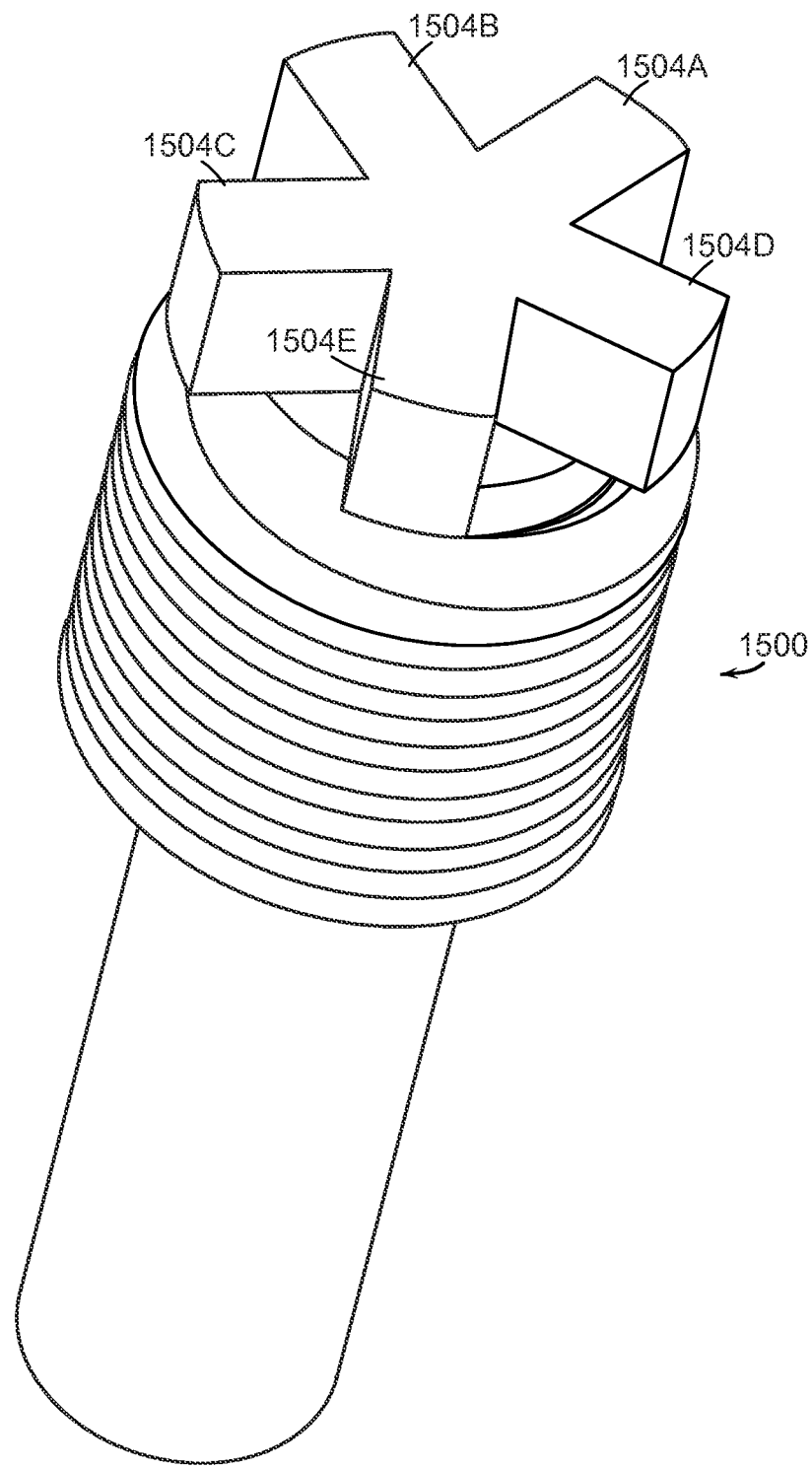
FIG. 18A is a perspective view of an electrode for a contact start plasma arc torch.
Figure 18B:
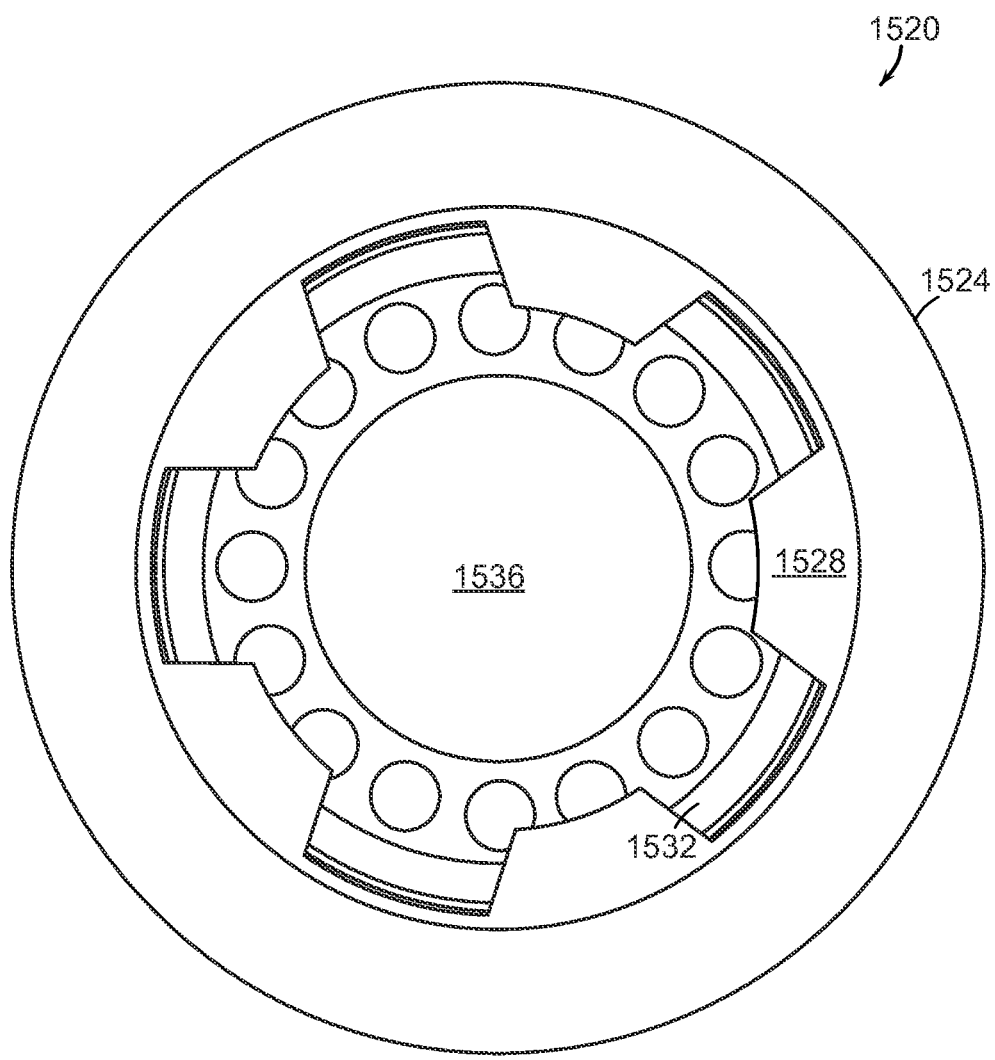
FIG. 18B is an elevational view of an assembly for use with the electrode of FIG. 18A.

FIG. 15B is an exploded perspective view of the assembly 1200 of FIG. 18A with a portion of the hollow body 1208 cut away. The view of FIG. 18B illustrates the electrode 1204, the hollow body 1208, the resilient element 1212, and the power contact 1216 in an unassembled configuration before installation in a plasma arc torch (not shown). During assembly, the electrode 1204 slideably engages the hollow body 1208, such that no threads are needed to attach the electrode 1204 to the hollow body 1208. A surface 1297 of the resilient element 1212 is illustrated. The surface 1297 is in contact with the shoulder 1272 of the hollow body 1208 when the resilient element 1212 is positioned within the torch. The first region 1290 is moved through the slot 1284 and into physical contact and electrical communication with at least a portion of the surface 1297 of the resilient element 1212.

Figure 15C:
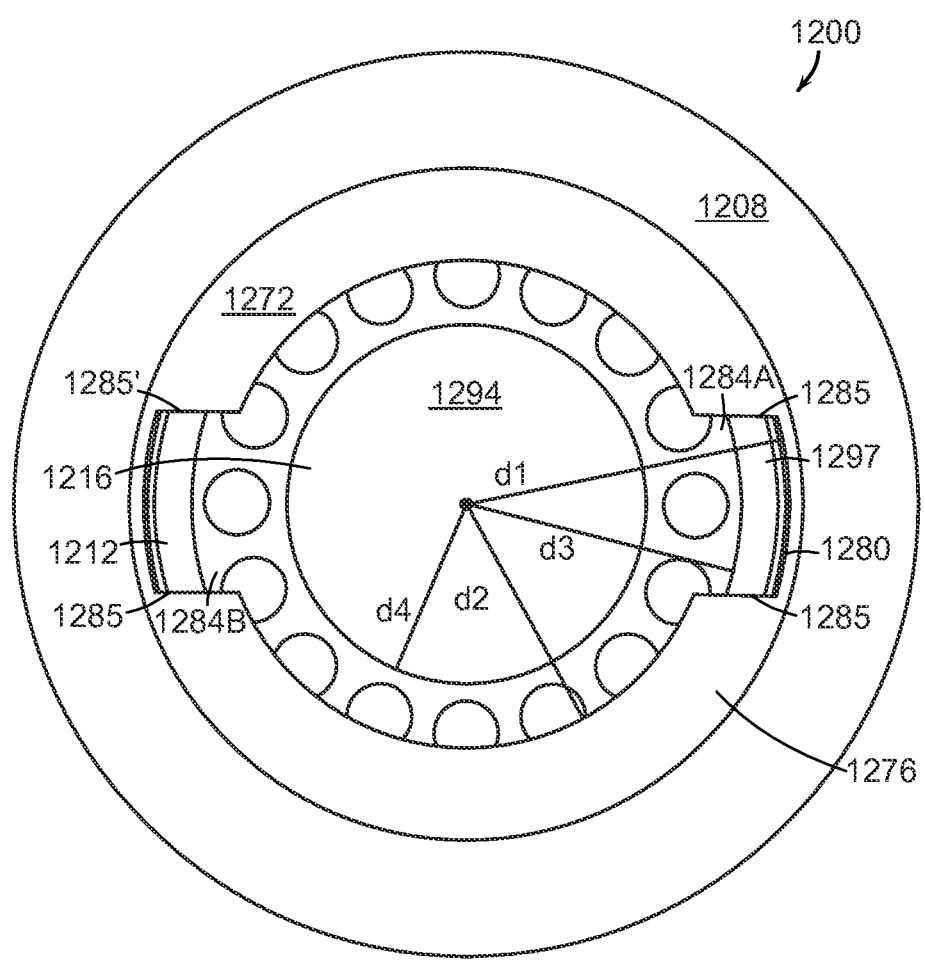
FIG. 15C is an elevational view of a portion of the assembly of FIG. 15A.

FIG. 15C is an elevational view of a portion of the assembly 1200 of FIG. 18A. FIG. 15C depicts the hollow body 1208, the power contact 1216, and the surface 1297 of the resilient element 1212. The electrode 1204 is not shown, but reference is made to various features of the electrode 1204 as depicted in FIG. 18A. The hollow body 1208 includes the shoulder 1272. The shoulder 1272 defines a first portion 1276 and a second portion 1280 that cooperate to form a contoured opening through which the portion 1260 of the electrode 1204 can move. As depicted, the first portion 1276 and second portion 1280 cooperate to form the slots 1284A and 1284B in the opening through which the portion 1260 of the electrode 1204 can move (e.g., by reciprocatingly sliding) when the electrode 1204 is installed in the torch. In such a configuration, the slots 1284A and 1284B in the hollow body 1208 have a complimentary shape to the shape of the portion 1260 of the electrode. The shape of the slots 1284A and 1284B are complimentary in that they are shaped to receive the portion 1260 of the electrode. However, the shape of the slots 1284A and 1284B need not match the shape of the portion 1260 of the electrode. Instead, the shape of the slots 1284A and 1284B need only be capable of allowing clearance of the portion 1260 of the electrode.

In some embodiments, the first portion 1276 and the second portion 1280 cooperate to form a contoured opening having one slot 1284A or 1284B, but not both. Each of the slots 1284A and 1284B are defined by two portions 1285 that are parallel to each other. The portions 1285 can also define other geometries or orientations, for example, the portions 1285 can be radially directed relative to the axis A (e.g., to form a triangular slot 1284). The portions 1285 can also be circular, semicircular, or otherwise curved. In general, the portions 1285 can define any geometry that permits the portion 1260 of the electrode to pass through the shoulder 1272 (e.g., through the opening defined by the first portion 1276 and the second portion 1280).

The distance $d_1$ from the axis A to the second portion 1280 is greater than the distance $d_2$ from the axis A to the first portion 1276. The distance $d_3$ from the axis A to the resilient element 1212 is greater than the distance $d_2$ and less than the distance $d_1$. In some embodiments, the distance $d_3$ can be less than the distance $d_2$ (e.g., when an annular plate (not shown) is secured to the resilient element 1212). The distance $d_4$ from the axis A to the power contact 1216 is less than the distance $d_3$ to facilitate passage of the second region 1292 through the resilient element 1212 and into physical contact and electrical communication with the corresponding surface 1294 of the power contact 1216.

In some embodiments, the electrode 1204 does not move past the shoulder, for example, when the portion 1260 and the slots 1284A and 1284B are not aligned. In such configurations, the portion 1260 contacts the shoulder 1272, which resists passage of the portion 1260 therethrough. In some embodiments, the electrode 1204 can be securely positioned within the torch. For example, the portion 1260 can be passed entirely through the shoulder 1272 into contact with the resilient element 1212 (e.g., via the first region 1290). The portion 1260 compresses the resilient element 1212. The resilient element 1212 urges the electrode 1204 toward the distal end 1224. Upon angular displacement of the portion 1260 about the axis A, a proximal surface (not shown) of the shoulder 1272 resists distal movement of the electrode 1204. The interaction between the portion 1260 and the proximal surface of the shoulder 1272 prevents the resilient element 1212 from ejecting the electrode 1204 from the hollow body 1208 and/or the torch.

In some embodiments, the portion 1260 has a circular configuration centered about the axis A. In such embodiments, the portion 1260 includes a first region 1290 (e.g., an annular outer perimeter of the circular configuration) for physical contact and electrical communication with the resilient element 1212 and a second region 1292 (e.g., a region disposed within the annular outer perimeter) for electrical communication and physical contact with the power contact 1216. As discussed above, the first region 1290 and the second region 1292 can be co-planar (e.g., portions of the same surface) or non-co-planar (e.g., portions of different surfaces). In an alternative embodiment, the first region 1290 can be a separate radial extensive portion (not shown) positioned along the length of the longitudinal axis A of the electrode 1204, such as a pin extending radially through the electrode 1204. The radial extensive portion functions in the same manner as the first region 1290, by providing a mechanism for electrically coupling the electrode 1204 to a resilient element 1212 for conducting a pilot arc. In one embodiment, the radial extensive portion is an elongated shoulder or a pin that can pass through shoulder 1272, while still allowing the resilient element 1212 to be maintained within the hollow body 1208. In such an embodiment, the shoulder 1272 is positioned further down the axial length of the hollow body 1208 towards the distal end of the electrode.

Figure 16A:
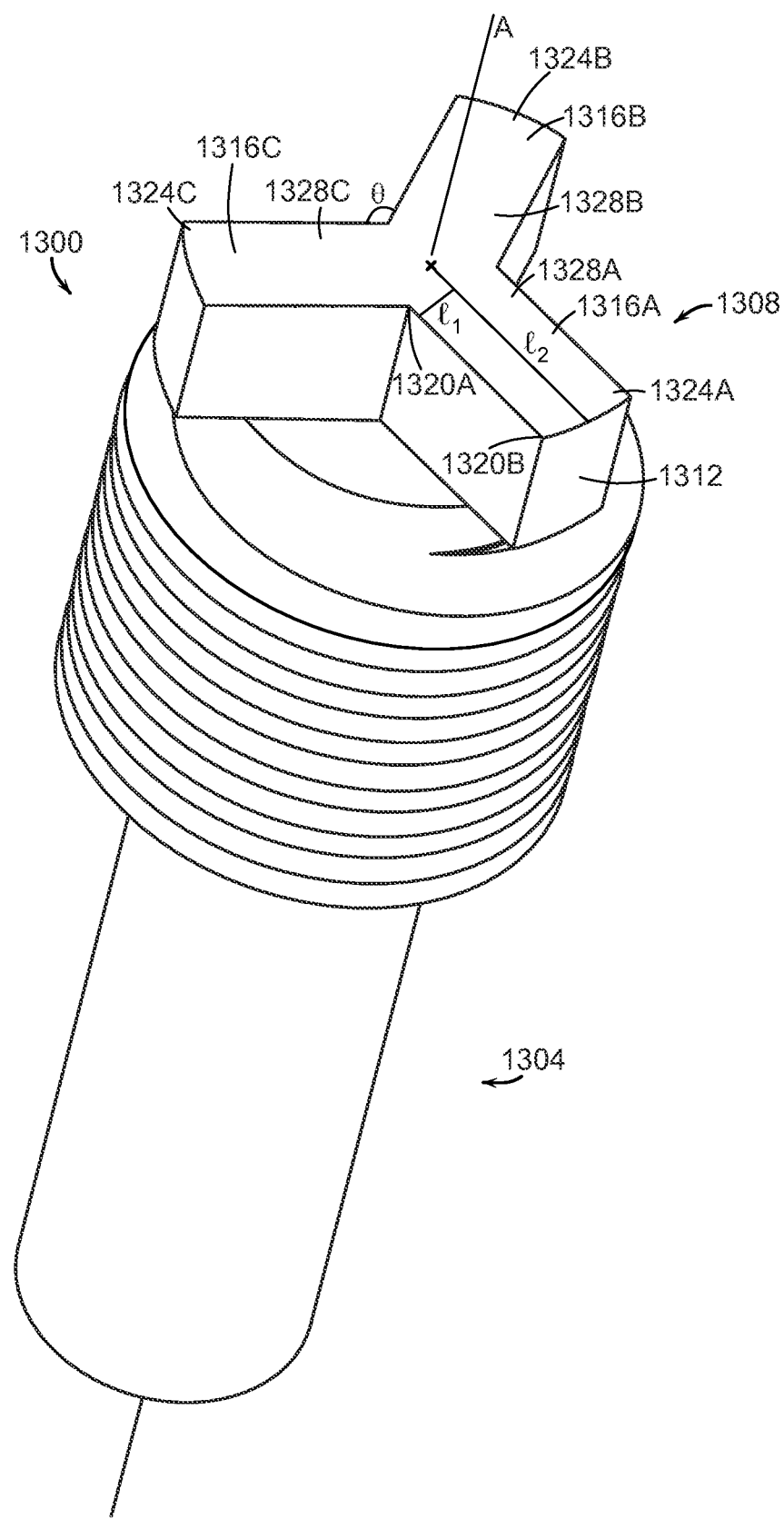
FIG. 16A is a perspective view of an electrode for a contact start plasma arc torch.

FIG. 16A is a perspective view of an electrode 1300 for a contact start plasma arc torch. The electrode 1300 is similar to the electrode 1204 depicted in FIG. 18A. The electrode includes a distal end 1304 and a second end 1308. The second end 1308 includes an extensive portion 1312 that extends axially along the axis A. The extensive portion 1312 defines three portions 1316A, 1316B, and 1316C (also called "fins"), all of which extend away from the axis A. Each of the three portions 1316A, 1316B, and 1316C define a first length $l_1$ and a second length $l_2$ that is greater than the first length $l_1$. In some embodiments, the values for the first length $l_1$ and second length $l_2$ of each of the three portions 1316A, 1316B, and 1316C are the same. The values for the first length $l_1$ and the second length $l_2$ can also be different for each of the three portions 1316A, 1316B, and 1316C. The lengths $l_1$ and $l_2$ are depicted as directed perpendicularly to each other. In some embodiments, the lengths $l_1$ and $l_2$ can be directed in other configurations, for example, radially away from the axis A towards points 1320A and 1320B respectively. Other directions for the lengths $l_1$ and $l_2$ are also possible.

As depicted, each of the three portions 1316A, 1316B, and 1316C are disposed about the axis A in an equiangular configuration (e.g., an angle θ between each of the portions 1316A, 1316B, and 1316C is about 120°). However, the three portions 1316A, 1316B, and 1316C can be disposed in other angular configurations about the axis A that are not equiangular.

Each of the three portions 1316A, 1316B, and 1316C include a respective first region 1324A, 1324B, and 1324C for electrical communication and/or physical contact with a corresponding surface (not shown) of a resilient element (not shown). Each of the three portions 1316A, 1316B, and 1316C include a respective second region 1328A, 1328B, and 1328C for electrical communication and/or physical contact with a corresponding surface (not shown) of a power contact (not shown).

As depicted, the first region 1324A, 1324B, and 1324C of each portion 1316A, 1316B, and 1316C is depicted as coplanar with the respective second portion 1328A, 1328B, and 1328C. In some embodiments, the first region 1324A, 1324B, and 1324C is not coplanar with the respective second region 1328A, 1328B, and 1328C. In some embodiments, the second regions 1328A, 1328B, and 1328C are not coplanar with each other second region. In some embodiments, a subset of the three portions, e.g., 1316A and 1316B, are in electrical communication with the resilient element, and the other portions, e.g., 1316C, is not in electrical communication with the resilient element. The portions, e.g., 1316C, not in electrical communication with the resilient element can provide aligning features or increased surface area to improve cooling the electrode. The portion 1316C can still be moved into physical contact and electrical communication with the power contact during transferred arc operation. In some embodiments, the first region 1324A, 1324B, and 1324C or the second region 1328A, 1328B, and 1328C, or both, can coincide with the extensive portion 1312. For example, pilot current and/or transferred arc current can flow between a power supply and the electrode 1300 via electrical communication with the extensive portion 1312 (e.g., via a sliding electrical contact discussed above).

Figure 16B:
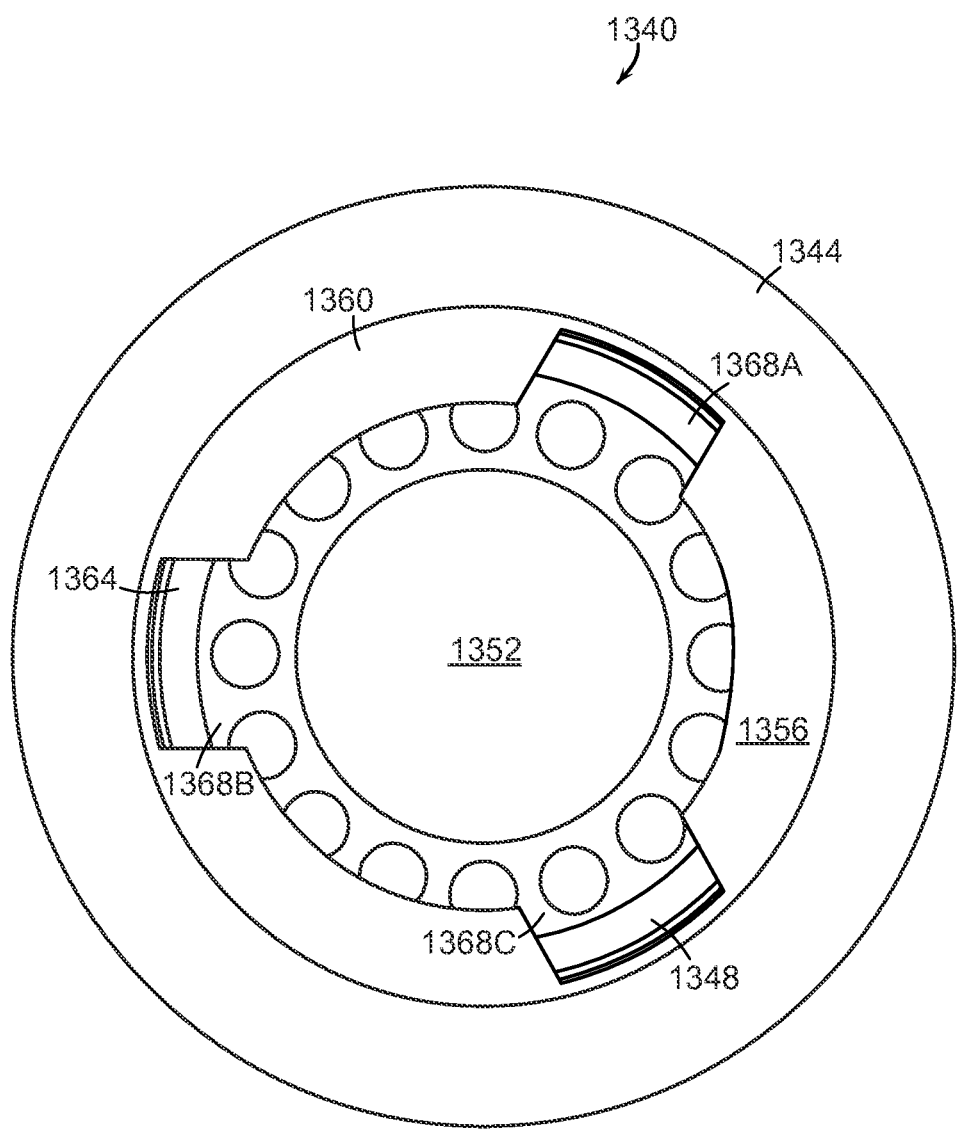
FIG. 16B is an elevational view of an assembly for use with the electrode of FIG. 16A.

FIG. 16B is an elevational view of an assembly 1340 for use with the electrode 1300 of FIG. 16A. The assembly 1340 includes a hollow body 1344, a resilient element 1348, and a power contact 1352. The assembly is similar to the assembly 1200 depicted in FIG. 15C. The assembly 1340 is configured for use with the electrode 1300 of FIG. 16A. More specifically, hollow body 1344 includes a shoulder 1356 that has a first portion 1360 and a second portion 1364 that cooperate to form a contoured opening having three slots 1368A, 1368B, and 1368C. The opening and the three slots 1368A, 1368B, and 1368C facilitate movement of the corresponding portions 1316A, 1316B, and 1316C through the opening and into physical contact and electrical communication with the resilient element 1348. As discussed above, the size of slots 1368A, 1368B, and 1368C is depicted as approximately the same size as the portions 1316A, 1316B, and 1316C; however, the slots 1368A, 1368B, and 1368C can be larger (e.g., circumferentially larger) than the corresponding portions 1316A, 1316B, and 1316C.

FIGS. 17A-17B, 18A-18B, and 19 depict alternative embodiments of electrodes and assemblies that operate similarly to those described above.

Figure 17A:
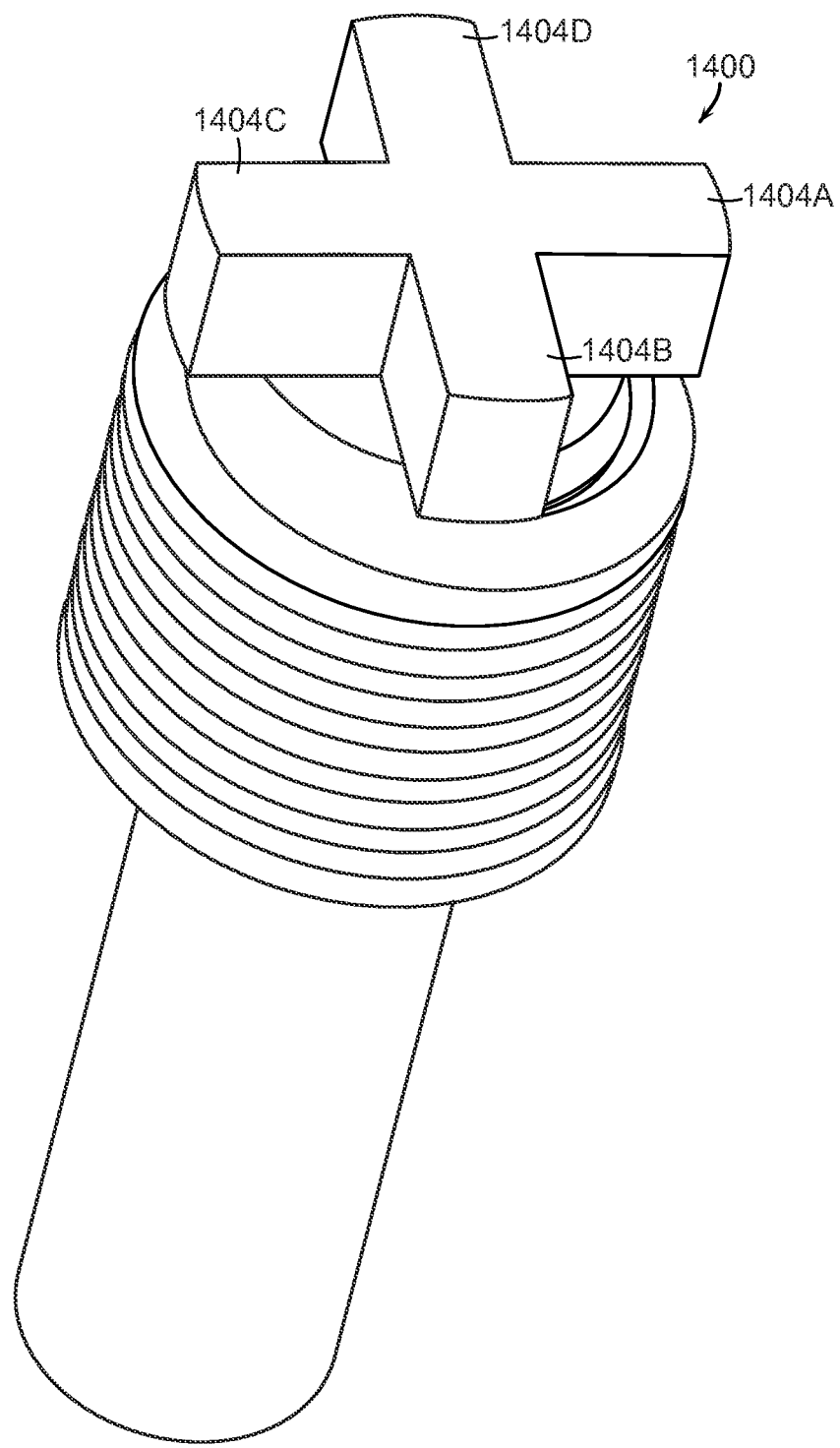
FIG. 17A is a perspective view of an electrode for a contact start plasma arc torch.

FIG. 17A is a perspective view of an electrode 1400 for a contact start plasma arc torch. The electrode 1400 includes four portions 1404A, 1404B, 1404C, and 1404D.

Figure 17B:
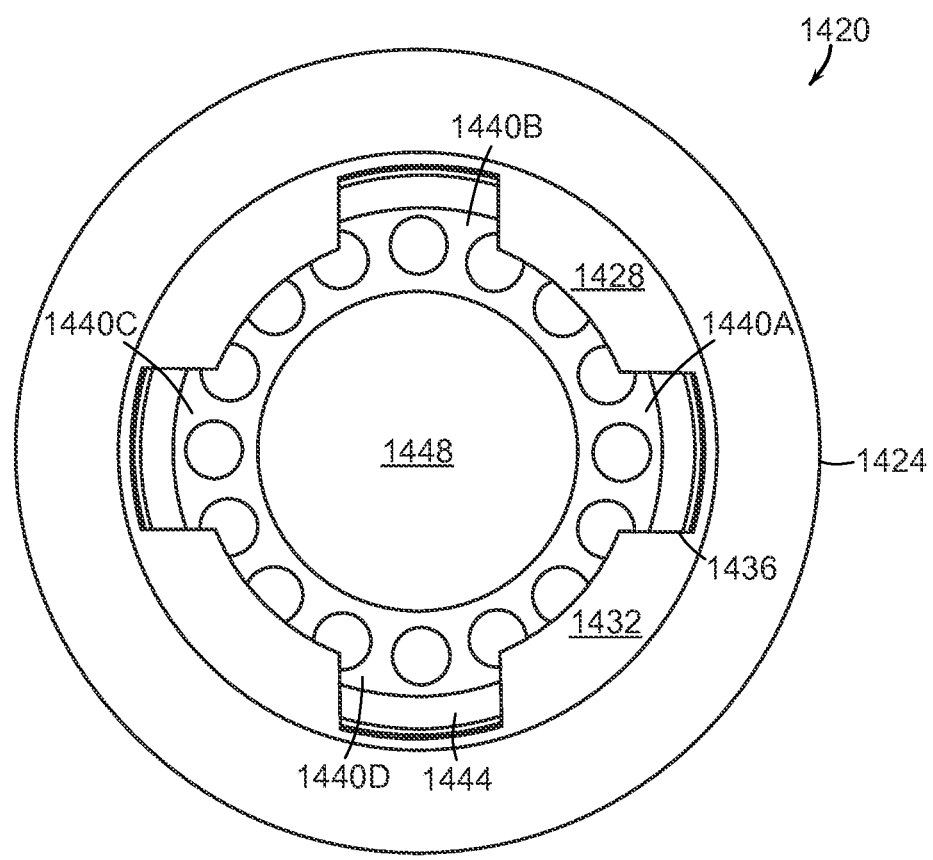
FIG. 17B is an elevational view of an assembly for use with the electrode of FIG. 17A.

FIG. 17B is an elevational view of an assembly 1420 for use with the electrode 1400 of FIG. 17A. The assembly 1420 includes a hollow body 1424 including a shoulder 1428 with a first portion 1432 and a second portion 1436 defining an contoured opening with four slots 1440A, 1440B, 1440C, and 1440D to facilitate passage of the four corresponding portions 1404A, 1404B, 1404C, and 1404D through the contoured opening and into physical contact and/or electrical communication with the resilient element 1444 and the power contact 1448.

FIG. 18A is a perspective view of an electrode 1500 for a contact start plasma arc torch. The electrode 1500 includes five portions 1504A, 1504B, 1504C, 1504D, and 1504E.

FIG. 18B is an elevational view of an assembly 1520 for use with the electrode 1500 of FIG. 18A. The assembly 1520 includes a hollow body 1524 including a shoulder 1528 defining a contoured opening to facilitate passage of the five corresponding portions 1504A, 1504B, 1504C, 1504D, and 1504E through the contoured opening and into physical contact and/or electrical communication with a resilient element 1532 and power contact 1536. The electrode 1500 can be used in a manner similar to that described above for the electrode 1204 of FIG. 18A, electrode 1300 of FIG. 16A, and the electrode 1400 of FIG. 17A.

A value for the operational current of the plasma arc torch can be related or associated with the number of portions (e.g., the three portions 1316A-1316C of FIG. 16A, the four portions 1404A-1404D of FIG. 17A, or the five portions 1504A-1504E of FIG. 18A) that a particular electrode includes. For example, an electrode with the three portions 1316A-1316C can be used in a torch operating at about 60 Amps during transferred arc operation. An electrode with four portions 1404A-1404D can be used in a torch operating at about 80 Amps during transferred arc operation. An electrode with five portions 1504A-1504E can be used in a torch operating at about 100 Amps during transferred arc operation. Electrodes employing the designs depicted in FIGS. 16A, 17A, and 18A can be used in torches configured with a contoured opening as depicted in FIGS. 16B, 17B, and 18B, respectively. In some embodiments, an electrode can include more than five portions.

By correlating the number of fins to the torch operating current, the usage of the correct electrode for a given operating current of the torch can be assured. By way of example, in the operation of a 60-Amp torch, the use of a hollow body 1344 with three slots 1368A, 1368B, and 1368C will receive a 60-Amp electrode with a corresponding number of portions (or "fins"), e.g., the three portions 1316A-1316C. On the other hand, if a user attempts to use a 100-Amp electrode, e.g., an electrode 1500 with five portions 1504A-1504E, in an 60-Amp torch configured with the three slots 1368A, 1368B, and 1368C, the electrode 1500 and the hollow body 1344 would not mate. The five portions 1504A-1504E are hindered from passing through the three slots 1368A-1368C. By employing such a system, the particular torch can be optimized for a particular electrode. In some embodiments, a user is thus prevented from using an electrode with five fins (e.g., the electrode 1500) with a torch that is not optimized for that electrode (e.g., a torch having three slots 1368A-1368C). Moreover, an electrode (e.g., the electrode 1300) having fewer fins (e.g., three portions 1316A-1316-C) is hindered from use with a torch employing more slots (e.g., the five slots of the hollow body 1524), which increases the operational of life of the electrode by optimizing the amount of current flowing through the electrode.

Figure 19:
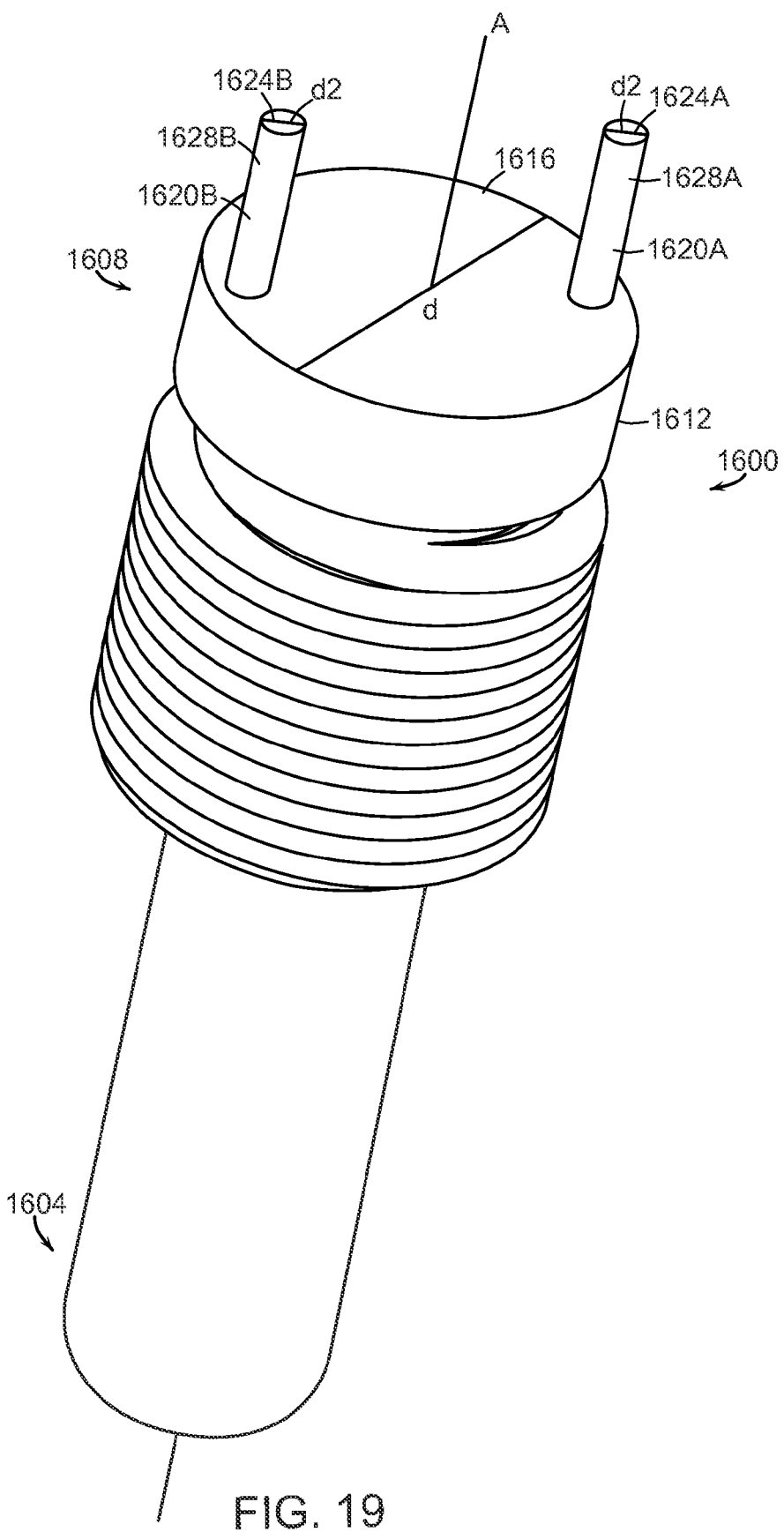
FIG. 19 is a perspective view of an electrode for a contact start plasma arc torch.

FIG. 19 is a perspective view of an electrode 1600 for a contact start plasma arc torch. The electrode 1600 includes a distal end 1604 and a second end 1608. The second end 1608 includes an extensive portion 1612 that defines a surface 1616 having diameter $d_1$. Two regions 1620A and 1620B extend from the surface 1616 along an axis A. The regions 1620A and 1620B each define a respective end surface 1624A and 1624B. The end surfaces 1624A and 1624B can be used for physical contact and electrical communication with a corresponding surface of a resilient element (e.g., the surface 1297 of the resilient element 1212 of FIG. 15C). Current for pilot arc initiation flows between the resilient element (not shown) and the electrode 1600 via the surfaces 1624A and 1624B and the regions 1620A and 1620B. As the electrode 1600 is moved in a proximal direction (e.g., away from the distal end 1604) during pilot arc initiation, the regions 1620A and 1620B compress the resilient element. The surface 1616 is moved into physical contact and electrical communication with a corresponding surface (not shown) of a power contact (not shown), such as the surface 1294 of the power contact 1216 of FIG. 18A for transferred arc operation.

The regions 1620A and 1620B also define respective extensive surfaces 1628A and 1628B. The regions 1620A and 1620B can pass through the slots 1284A and 1284B of FIG. 15C (e.g., the slots 1284A and 1284B defined by the first portion 1276 and the second portion 1280 of the shoulder 1272). The extensive portions 1628A and 1628B can react against the slots 1284A and 1284B to hinder or resist angular displacement of the electrode 1600 about the axis A within the torch. As depicted, the regions 1620A and 1620B substantially parallel to the axis A. Other configurations or alignments of the regions 1620A and 1620B can be used. Each of the regions 1620A and 1620B defines a diameter $d_2$ that is smaller than the diameter $d_1$.

In some embodiments, a second extensive portion (not shown) extends from the surface 1616 and defines a second surface (not shown). The second surface can be parallel to the surface 1616. The second extensive portion can extend distally (e.g., towards the distal end 1604) to define a cavity (not shown) within the second end 1608 relative to the surface 1616. The second extensive portion can extend proximally (e.g., away from the distal end 1604) to define a cylindrical or pedestal-like portion (not shown). In such embodiments, the second surface can be moved into physical contact and electrical communication with a corresponding surface of the power contact for transferred arc operation.

The regions 1620A and 1620B are disposed diametrally opposite each other and equidistant from the axis A. In some embodiments, the electrode 1600 includes more than two regions 1620A and 1620B (e.g., three, four, or five regions, for use with the assemblies 1340, 1420, and 1520 of FIGS. 16B, 17B, and 18B, respectively). In some embodiments, the electrode 1600 includes only one region 1620A or 1620B. In such embodiments, the region 1620A or 1620B can be parallel or aligned with the axis A. The shoulder (e.g., the shoulder 1272) can define an opening having a substantially continuous circumference (e.g., without the slot 1284) in such an embodiment. The diameter of the opening can be smaller than an outer diameter of the resilient element and larger than an inner diameter of the resilient element to hinder removal of the resilient element from the torch. The region 1620A or 1620B defines a diameter smaller than the diameter of the opening but larger than the inner diameter of the resilient element to facilitate contact between the region 1620A or 1620B and the resilient element.

Figure 20A:
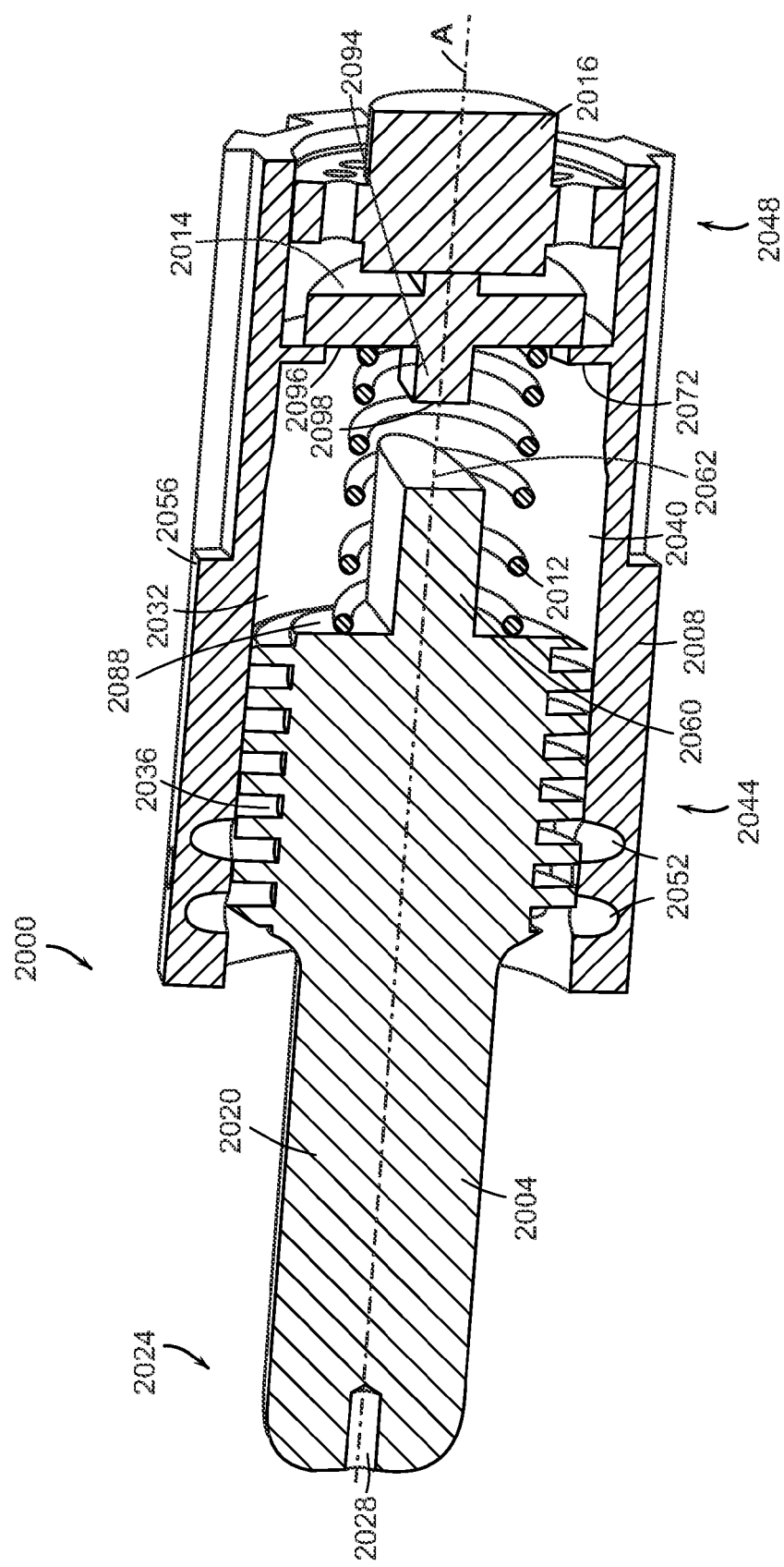
FIG. 20A shows an embodiment of an assembly for a contact start plasma arc torch.

FIG. 20A is an embodiment of an assembly 2000 for a contact start plasma arc torch. The assembly includes an electrode 2004, a hollow body 2008, a resilient element 2012, a contact element 2014, and a power contact 2016. The electrode 2004 includes an electrode body 2020 having a distal end 2024 for housing an emissive element 2028. The electrode body 2020 can include a set of spiral-shaped grooves 2036 for directing gas flow or facilitating cooling of the assembly 2000. The electrode 2004 can move along a longitudinal axis A when the assembly 2000 is installed within a torch, for example, to slidably engage an interior surface 2040 of the hollow body 2008. The hollow body 2008 includes a front portion 2044 and a rear portion 2048. In one embodiment, the front portion 2044 of the hollow body 2008 can include a swirl ring, which has one or more holes 2052 extending from an exterior surface 2056 to the interior surface 2040. The holes 2052 can impart a swirling motion relative to the axis A to a gas flowing through the holes 2052 and the assembly 2000. The swirl ring can be integrally formed with the hollow body 2008. The hollow body 2008 can also be an integrally formed portion of a plasma arc torch. In some embodiments, the interior surface 2040 of the hollow body 2008 is fabricated from or coated with an insulating material.

As shown, the hollow body 2008 includes a shoulder 2072 disposed relative to the interior surface 2040 to restrain the radial movement of the contact element 2014 within the hollow body 2008. The contact element 2014 includes a surface (not shown) in electrical communication with the power contact 2016. The contact element 2014 can also include a portion 2094 that extends axially along axis A. The portion 2094 can extend below the shoulder 2072 in the distal direction to facilitate electrical communication with the portion 2060 of the electrode body 2020. Specifically, the portion 2094 defines a first surface 2096 for physical contact with a proximal surface (not shown) of the resilient element 2012 and a second surface 2098 for physical contact with a second surface 2062 of the portion 2060 of the electrode body 2020. In addition to the second surface 2062, the portion 2060 includes a first surface 2088 for physical contact with a distal surface (not shown) of the resilient element 2012. The resilient element 2012 is thus retained inside of the hollow body 2008 between the contact element 2014 and the electrode 2004. In some embodiments, the resilient element 2012 is secured to the hollow body 2008 by a diametral interference fit. The resilient element 2012 is configured to impart a separation force upon the electrode 2004 and bias the electrode 2004 toward the distal end 2024. The electrode 2004 is hindered from being ejected from the torch by a nozzle (not shown). The nozzle is secured to the torch so that the portion 2060 is in physical contact with the resilient element 2012. For example, installing the nozzle positions the surface 2088 of the electrode 2004 in physical contact with the distal surface of the resilient element 2012 such that when the nozzle is installed, the resilient element 2012 is compressed.

The power contact 2016 is in electrical communication with a power supply (not shown). During pilot arc initiation, the power supply provides a pilot arc current to the power contact 2016 and the current is then passed to the contact element 2014. In some embodiments, the resilient element 2012 is conductive, in which case the pilot arc current passes from the contact element 2014 through the resilient element 2012 to the surface 2088 of the electrode 2004. In other embodiments, the resilient element 2012 is not conductive. In these cases, any one of the means described above with reference to FIGS. 12-14 can be employed to conduct the pilot arc current from the contact element 2014 to the electrode 2004. A plasma gas (not shown) flows about the electrode 2004 during pilot arc initiation, and the plasma gas increases fluid pressure on the electrode 2004. The pressure moves the electrode 2004 axially toward the contact element 2014 by overcoming the separation force exerted by the resilient element 2012. The resulting physical separation between the electrode 2004 and the nozzle initiates a pilot arc in a plasma chamber (not shown), which is defined by the nozzle and the electrode 2004. More specifically, pressure moves the second surface 2062 of the electrode 2004 into physical contact with the second surface 2098 of the contact element 2014 for transferred arc operation. In some embodiments, the contact element 2014 is stationary within the hollow body 2008.

During transferred arc operation, a transferred arc current flows from the power supply to the contact element 2014. In some embodiments, current flows from the contact element 2014 to the electrode 2004 via the physical contact between the surface 2098 of the portion 2094 and the surface 2062 of the portion 2060. In other embodiments, current flows from the contact element 2014 to the electrode 2004 via other means explained above with reference to FIGS. 12-14. Gas pressure is increased during transferred arc operation as current is increased to establish a cutting arc for processing a workpiece (not shown).

Figure 20B:
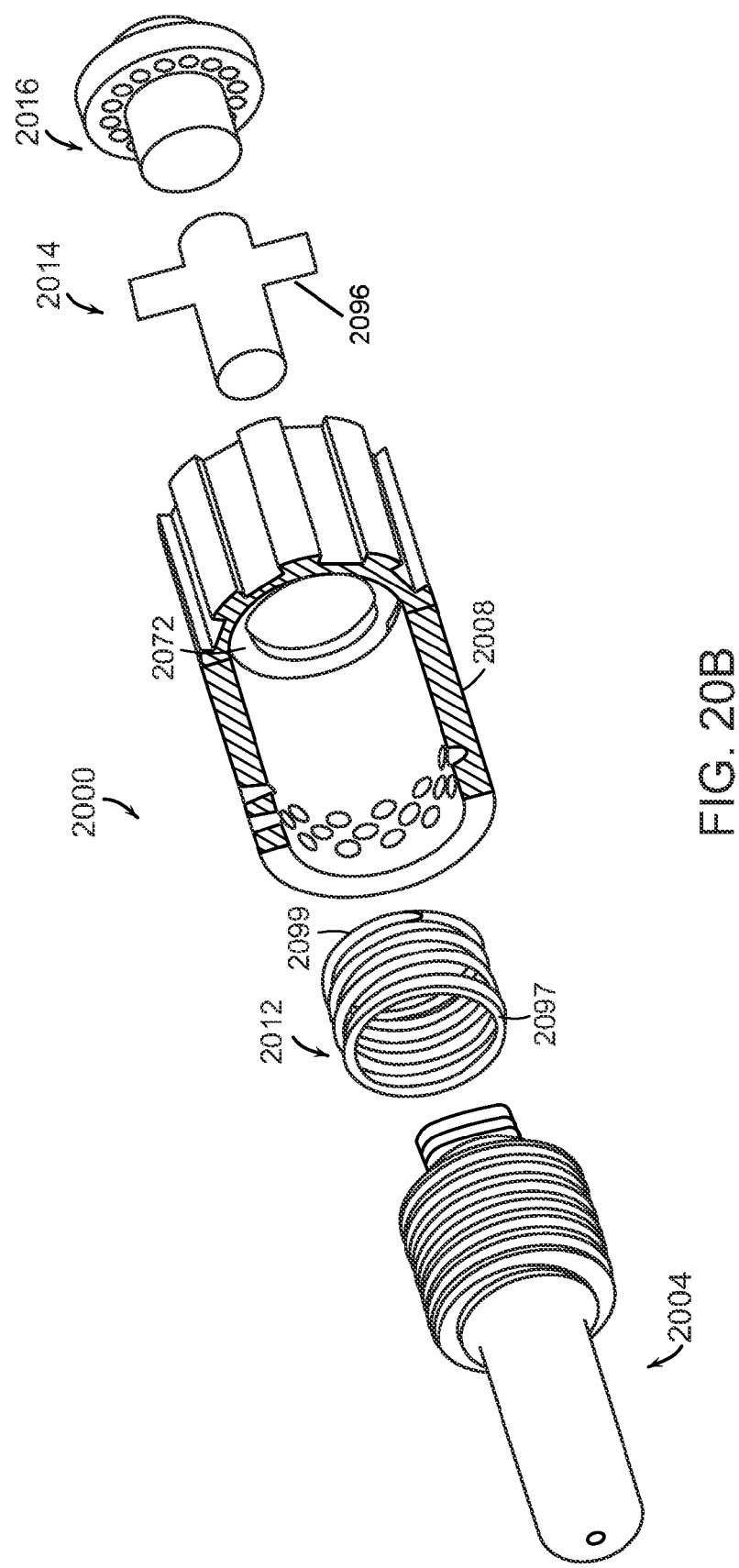
FIG. 20B shows an exploded perspective view of the assembly of FIG. 20A.

FIG. 20B is an exploded perspective view of the assembly 2000 of FIG. 20A, with a portion of the hollow body 2008 cut away. The view of FIG. 20B illustrates the electrode 2004, the resilient element 2012, the hollow body 2008, the contact element 2014 and the power contact 2016 in an unassembled configuration before installation into a contact start plasma arc torch (not shown). During assembly, the contact element 2014 is inserted axially into the hollow body 2008 until it is restrained by proximal surface of the shoulder 2072 of the hollow body 2008. The resilient element 2012 is inserted into the hollow body 2008, until a proximal surface 2099 of the resilient element 2012 contacts the surface 2096 the contact element 2014 within the hollow body 2008. The electrode 2004 slideably engages the hollow body 2008 such that no threads are needed to assemble the electrode 2004 with the hollow body 2008. The electrode 2004 is adapted to contact a distal surface 2097 of the resilient element 2012 within the hollow body. In some embodiments, the resilient element 2012 is connected to or integrally formed with the contact element 2014 prior to assembly. In some embodiments, the resilient element 2012 is integrally formed with or connected to the electrode 2004 prior to assembly.

In some embodiments, at least one of the hollow body 2008, the power contact 2016, the contact element 2014, the resilient element 2012 and the electrode 2004 is a consumable component of a plasma arc torch. In other embodiments, one or more of the body 2008, the power contact 2016, the contact element 2014 and the resilient element 2012 are incorporated into a single consumable component of the plasma arc torch.

Figure 21A:
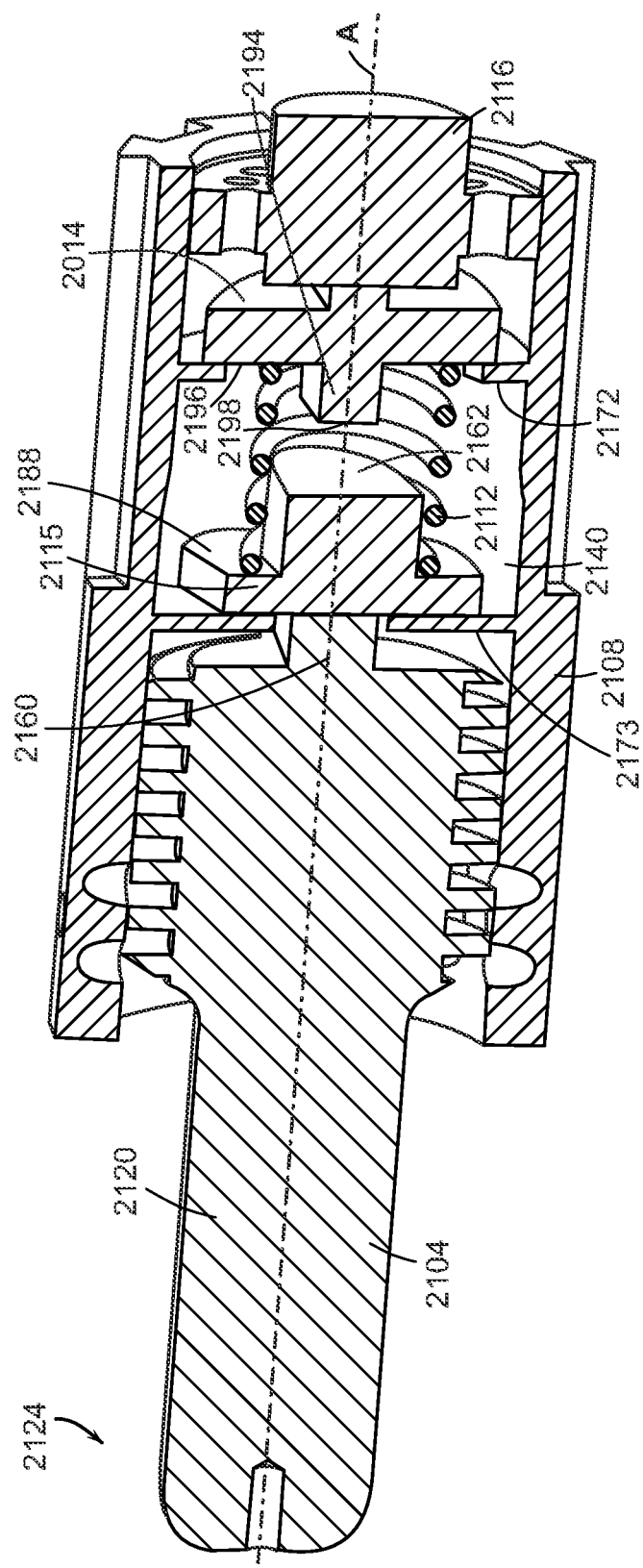
FIG. 21A shows another embodiment of an assembly for a contact start plasma arc torch.

FIG. 21A shows a cross-sectional partial perspective view of another assembly 2100 of a contact start plasma arc torch according to an embodiment of the invention. The assembly shown includes an electrode 2104, a hollow body 2108, a resilient element 2112, a first contact element 2114, a second contact element 2115 and a power contact 2116. The electrode 2104 and the hollow body 2108 can be substantially the same as the electrode 2014 and the hollow body 2008 of FIG. 20A, respectively. The second contact element 2115 can be made from a relatively hard and electrically conductive material such as stainless steel, chromium copper, nickel, or beryllium copper. The second contact element 2115 can be fabricated from the same or different material as the first contact element 2114. This assembly is advantageous because the resilient element 2112 is confined in a specific region of the assembly while it biases various components of the torch into contact with and away from each other as appropriate.

More specifically, the hollow body 2108 includes a first shoulder 2172 disposed relative to the interior surface 2140 of the hollow body 2108 to restrain the radial movement of the first contact element 2114 within the hollow body 2108. The hollow body 2108 also includes a second shoulder 2173 disposed relative to the interior surface 2140 to retrain the radial movement of the second contact element 2115 toward the distal end 2124. The first contact element 2114 includes a surface (not shown) in electrical communication with the power contact 2116. The first contact element 2114 also includes a portion 2194 that extends axially along axis A. The portion 2194 can extend below the first shoulder 2172 in the distal direction 2124. The portion 2194 defines a first surface 2196 for physical contact with a proximal surface (not shown) of the resilient element 2112 and a second surface 2198 for physical contact with a second surface 2162 of the second contact element 2114. In addition to the second surface 2198, the second contact element 2115 includes a first surface 2188 for physical contact with a distal surface (not shown) of the resilient element 2112. The second contact element 2115 further includes a third surface (not shown) opposite of the first surface 2188 for physical contact and electrical communication with a portion 2160 of the electrode 2104. The resilient element 2112 is thus retained inside of the hollow body 2108 between the first contact element 2114 and the second contact element 2115. In some embodiments, the resilient element 2112 is secured to the hollow body 2108 by a diametral interference fit.

The resilient element 2112 is configured to impart a separation force on the second contact element 2115 and urge the second contact element 2115 in the distal direction, which urges the electrode 2114 toward the distal end 2124. The second contact element 2115 is hindered from being ejected from the torch by the shoulder 2173 and the electrode 2104 is hindered from being ejected from the torch by a nozzle (not shown). The nozzle is secured to the torch so that the portion 2160 of the electrode 2104 is in physical contact with the second contact element 2115, which contacts the resilient element 2012. For example, installing the nozzle positions the portion 2160 in physical contact with the second resilient element 2115 such that when the nozzle is installed, the resilient element 2012 is compressed by the second contact element 2115.

The power contact 2116 is in electrical communication with a power supply (not shown). During pilot arc initiation, the power supply provides a pilot arc current to the power contact 2116 and the current is passed to the first contact element 2114. In some embodiments, the resilient element 2112 is conductive, in which case the pilot arc current passes from the first contact element 2114 through the resilient element 2112 to the second contact element 2115, which passes the current to the electrode 2104. In some embodiments, the resilient element 2112 is not conductive. In these cases, any one of the means described above with reference to FIGS. 12-14 can be employed to conduct the pilot arc current from the first contact element 2114 to the electrode 2104 via the second contact element 2115. A plasma gas (not shown) flows about the electrode 2104 during pilot arc initiation, and the plasma gas increases fluid pressure on the electrode 2104. The pressure moves the electrode 2104 axially backward, which translates the second contact element 2115 toward the first contact element 2114 by overcoming the force exerted by the resilient element 2112. The resulting physical separation between the electrode 2104 and the nozzle generates a pilot arc in a plasma chamber (not shown) formed between the nozzle and the electrode 2104. Specifically, pressure moves the electrode 2104 into physical contact with the second contact element 2115, which is urged by the portion 2160 of the electrode 2104 into physical contact with the first contact element 2114 for transferred arc operation. In some embodiments, the first contact element 2114 is stationary within the hollow body 2108 and the second contact element 2115 is translatable relative to the first contact element 2114 between the first shoulder 2172 and the second shoulder 2173.

During transferred arc operation, a transferred arc current flows from the power supply to the first contact element 2114. In some embodiments, current flows from the first contact element 2114 to the second contact element 2115 via a current path created when the surface 2198 of the first contact element 2114 contacts the surface 2162 of the second contact element 2115. This current is then passed from the second contact element 2115 to the electrode 2104.

In some embodiments, current flows from the contact element 2014 to the electrode 2004 via other means explained above with reference to FIGS. 12-14. Gas pressure is increased during transferred arc operation to form a plasma jet for processing a workpiece (not shown).

Figure 21B:
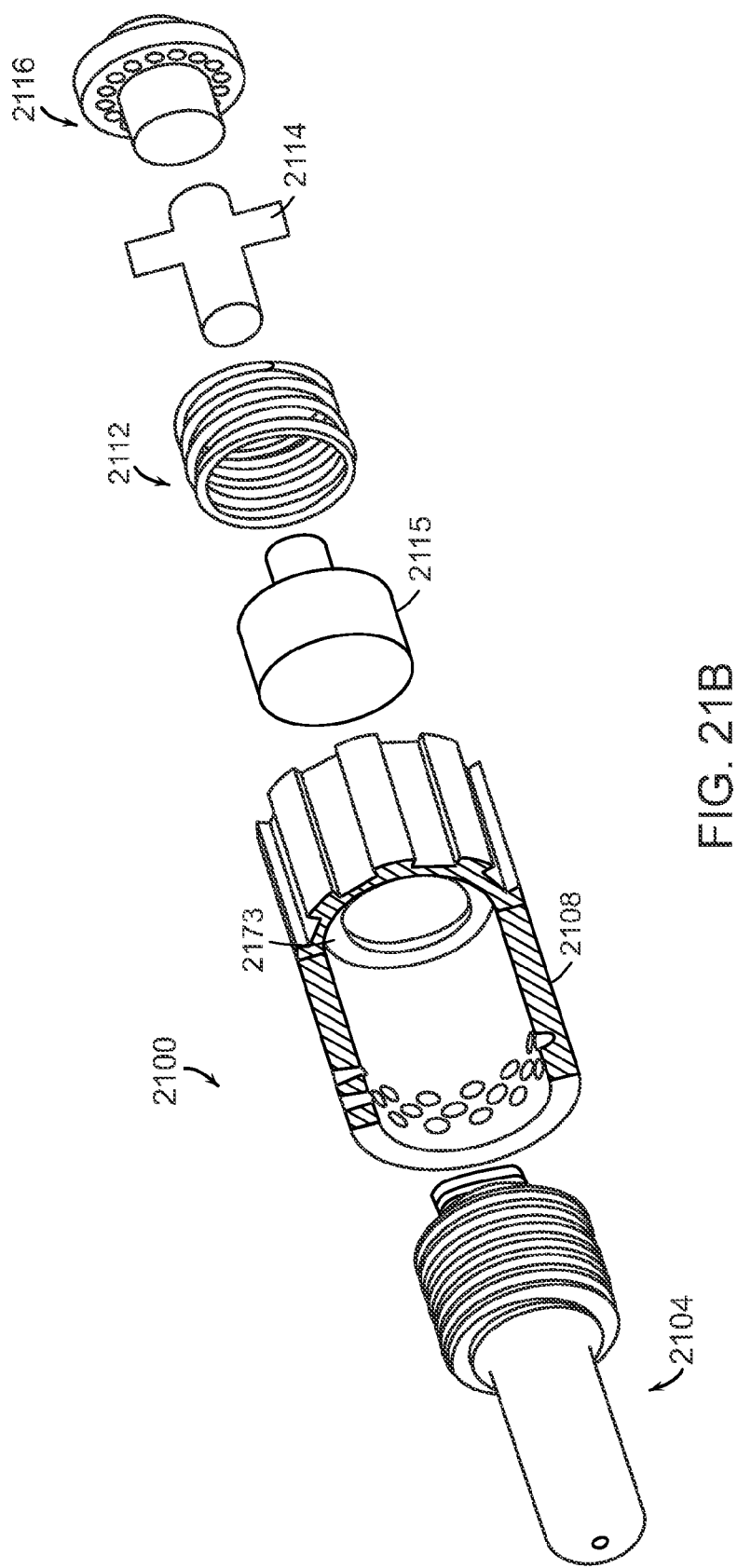
FIG. 21B shows an exploded perspective view of the assembly of FIG. 21A.

FIG. 21B is an exploded perspective view of the assembly 2100 of FIG. 21A, with a portion of the hollow body 2108 cut away. The view of FIG. 21B illustrates the electrode 2104, the hollow body 2008, the second contact element 2115, the resilient element 2112, the first contact element 2114 and the power contact 2016 in an unassembled configuration before installation into a contact start plasma arc torch (not shown). In some embodiments, the second contact element 2115 and the resilient element 2112 are preassembled into the hollow body 2108 between the first shoulder 2172 and the second shoulder 2173 prior to installation of the remaining components.

In some embodiments, at least one of the hollow body 2108, the power contact 2116, the first contact element 2114, the second resilient element 2115, the resilient element 2112 and the electrode 2104 is a consumable component of a plasma arc torch. In other embodiments, one or more of the hollow body 2108, the power contact 2116, the first contact element 2114, the second resilient element 2115 and the resilient element 2112 are integrated into a single consumable component of the plasma arc torch.

While the invention has been particularly shown and described with reference to specific embodiments, it should be understood by those skilled in the art that various changes in form and detail may be made therein without departing from the spirit and scope of the invention as defined by the appended claims. For example, while some surfaces have been depicted as planar, surfaces having other, non-planar geometries, such as, spherical, hemispherical, conical, and/or cylindrical geometries may be used without departing from the spirit and the scope of the invention.

It should also be understood that various aspects and embodiments of the invention can be combined in various ways. For example, the invention of FIG. 12 can be combined with the electrode of FIG. 3A and the invention of FIG. 13 can be combined with the assembly of FIG. 20A. Based on the teachings of this specification, a person of ordinary skill in the art can readily determine how to combine these various embodiments.

What is claimed is:

1. A component for a contact start plasma arc torch, the component comprising:
   a hollow body defining a channel with a longitudinal axis, the channel capable of slideably receiving an electrode body along the longitudinal axis; and
   a contact element disposed in the hollow body and includes a first surface and a second surface, the first surface facilitating electrical communication with a power supply and the second surface physically contacting a surface of the electrode body when the plasma arc torch is operated in a transferred arc mode, wherein the second surface is characterized by the absence of physical contact with the surface of the electrode body when the torch is operated in a pilot arc mode.

2. The component of claim 1 further comprising a swirl ring portion defining an exterior portion, an interior portion and one or more holes passing from the exterior portion to the interior portion for imparting a swirling motion to a fluid.

3. The component of claim 2, wherein the swirl ring portion is formed integrally with the hollow body.

4. The component of claim 1 wherein the hollow body comprises a swirl ring portion.

5. The component of claim 1 further comprising a resilient element contacting the electrode body when the electrode body is inserted into the channel, wherein the resilient element is configured to impart a separation force upon the electrode body.

6. The component of claim 5 wherein the resilient element is secured to the channel by a diametral interference fit.

7. The component of claim 5 wherein the resilient element is coupled to the contact element.

8. The component of claim 1 wherein the contact element is stationary.

9. The component of claim 1 wherein the channel comprises a shoulder for retraining a longitudinal movement of the contact element.

10. The component of claim 1 wherein an interior surface of the channel comprises an insulating material.

11. The component of claim 1 further comprising a power contact in electrical communication with the power supply and the first surface of the contact element.

12. A component for a contact start plasma arc torch, the component comprising:
   a hollow body defining a channel with a longitudinal axis, the channel capable of slideably receiving an electrode body along the longitudinal axis;
   a first contact element disposed in the hollow body and including a first contact element surface and a second contact element surface, the first contact element surface facilitating electrical communication with a power supply; and
   a supplemental contact element disposed in the hollow body and including a first supplemental contact element surface and a second supplemental contact element surface, the first supplemental contact element surface physically contacting the second contact element surface and the second supplemental contact element surface physically contacting a surface of the electrode body when the plasma arc torch is operated in a transferred arc mode.

13. The component of claim 12 further comprising a swirl ring portion defining an exterior portion, an interior portion and one or more holes passing from the exterior portion to the interior portion for imparting a swirling motion to a fluid.

14. The component of claim 13, wherein the swirl ring portion is formed integrally with the hollow body.

15. The component of claim 12 further comprising a resilient element disposed between the second contact element surface and the first supplemental contact element surface in the channel, wherein the resilient element is configured to impart a separation force upon the supplemental contact element.

16. The component of claim 15 wherein the resilient element is secured to the channel by a diametral interference fit.

17. The component of claim 15 wherein the resilient element is coupled to at least one of the first contact element or the supplemental contact element.

18. The component of claim 12 wherein the first contact element is stationary.

19. The component of claim 12 wherein the supplemental contact element is translatable relative to the first contact element.

20. The component of claim 12 wherein an interior surface of the channel comprises an insulating material.

21. The component of claim 12 further comprising a power contact in electrical communication with the power supply and the first contact element surface of the first contact element.

22. An assembly for a contact start plasma arc torch, the assembly comprising:
- a hollow body defining a longitudinal axis, the hollow body capable of slideably receiving an electrode body along the longitudinal axis;
- a contact element disposed in the hollow body and including a first surface and a second surface, the first surface capable of facilitating electrical communication with a power supply; and
- a resilient element connected to the contact element in the hollow body, the resilient element physically contacting the electrode body and imparting a separation force upon a surface of the electrode body when the electrode body is inserted into the hollow body, the resilient element configured to pass substantially all of a pilot arc current to the electrode body when the torch is operated in a pilot arc mode.

23. The assembly of claim 22 wherein the resilient element comprises a spring and a separate contact surface.

24. The assembly of claim 22 further comprising a conductive element for passing substantially all of a pilot arc current to the electrode body when the torch is operated in a pilot arc mode.

25. The assembly of claim 22 wherein the assembly is a consumable component of the plasma arc torch.

26. The assembly of claim 22 wherein the assembly further includes a nozzle, a shield, a swirl ring or a retaining cap, or a combination thereof.

27. The assembly of claim 22 wherein the resilient element is in physical contact with the contact element.

28. The assembly of claim 23, wherein the separate contact surface comprises a washer-like plate.

* * * * *